United States Patent
Fischel et al.

(10) Patent No.: US 6,542,538 B2
(45) Date of Patent: Apr. 1, 2003

(54) METHOD AND APPARATUS FOR TESTING WIRELESS COMMUNICATION CHANNELS

(75) Inventors: Scott Eduard Fischel, Solana Beach, CA (US); Idreas A. Mir, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/757,773

(22) Filed: Jan. 9, 2001

(65) Prior Publication Data

US 2002/0009134 A1 Jan. 24, 2002

Related U.S. Application Data

(60) Provisional application No. 60/175,463, filed on Jan. 10, 2000.

(51) Int. Cl.[7] .................................................. H04B 17/00
(52) U.S. Cl. .......................... 375/224; 370/241; 455/423; 455/67.4
(58) Field of Search ............................... 375/224, 225, 375/226, 367; 370/241, 248, 249, 252–253

(56) References Cited

U.S. PATENT DOCUMENTS

| | | | | |
|---|---|---|---|---|
| 3,840,708 A | * | 10/1974 | Clark | 370/241 |
| 4,245,352 A | | 1/1981 | Karpowycz et al. | |
| 4,611,320 A | | 9/1986 | Southard | |
| 5,590,160 A | * | 12/1996 | Ostman | 375/367 |
| 5,596,570 A | * | 1/1997 | Soliman | 370/252 |
| 5,802,105 A | * | 9/1998 | Tiedemann, Jr. et al. | 375/225 |
| 6,002,714 A | * | 12/1999 | Huscroft | 375/224 |
| 6,028,883 A | * | 2/2000 | Tiemann et al. | 375/150 |
| 6,188,892 B1 | * | 2/2001 | Krishnamurthi et al. | 455/422 |
| 6,304,216 B1 | * | 10/2001 | Gronemeyer | 342/378 |

FOREIGN PATENT DOCUMENTS

| | | |
|---|---|---|
| GB | 1553572 A | 10/1979 |
| WO | 96/16523 | 5/1996 |

* cited by examiner

Primary Examiner—Amanda T. Le
(74) Attorney, Agent, or Firm—Philip R. Wadsworth; Kent D. Baker; Thomas R. Rouse

(57) ABSTRACT

Techniques to test a wireless communication link. A traffic channel is tested via a test data service option (TDSO) that may be negotiated and connected similar to other services. Test parameters values may be proposed, accepted or rejected, and negotiated. Test data for a channel is generated based on a defined data pattern or a pseudo-random number generator. Sufficient test data may be generated based on the generator for a test interval, stored to a buffer, and thereafter retrieved from a particular section of the buffer to form data block(s) for each "active" frame. The traffic channel may be tested using discontinuous transmission. A two-state Markov chain determines whether or not to transmit test data for each frame. The average frame activity and average burst length are defined by selecting the probabilities for transitioning between the ON/OFF states of the Markov chain, which may be driven by a second generator.

72 Claims, 8 Drawing Sheets

METHOD AND APPARATUS FOR TESTING WIRELESS COMMUNICATION CHANNELS

CROSS REFERENCE TO RELATED APPLICATIONS

This application claims the benefit of provisional U.S. application Ser. No. 60/175,463, entitled "IS-2000 TEST DATA SERVICE OPTION," filed Jan. 10, 2000, which is incorporated herein by reference in its entirety for all purposes.

BACKGROUND OF THE INVENTION

I. Field of the Invention

The present invention relates to data communication. More particularly, the present invention relates to novel and improved method and apparatus for testing wireless communication channels.

II. Description of the Related Art

Wireless communication systems such as code division multiple access (CDMA) systems, time division multiple access (TDMA) systems, and others are widely used to provide various types of communication such as voice, data, and so on. For these wireless systems, it is highly desirable to utilize the available resources (i.e., bandwidth and transmit power) as efficiently as possible. This typically entails transmitting as much data to as many users within as short a time period as supported by the conditions of the communication links.

To achieve the above goal, the communication links between a transmitting source (e.g., a base station) and the receiving devices (e.g., "connected" remote terminals) within the system may be characterized. Based on the characterized link conditions for the remote terminals, the system may be better able to select a particular set of remote terminals to serve, allocate a portion of the available resources (e.g., transmit power) to each selected remote terminal, and transmit to each remote terminal at a data rate supported by the allocated transmit power and characterized link conditions.

Conventionally, a communication link is characterized by transmitting (e.g., from a base station) a known data pattern (e.g., generated by a defined pseudo-random number generator), receiving the transmitted data pattern, comparing the received data pattern with a locally generated data pattern to determine transmission errors, and reporting the results back to the transmitting source. This "loop-back" testing is typically performed continuously for a number of frames over the desired test interval. The test results are reflective of the performance of the communication link over that test interval.

Many newer generation wireless communication systems are capable of flexible operation. For example, data may be transmitted in bursts and over one or more traffic channels (or physical channels), the data rate may be allowed to vary from frame to frame, the processing of the data may also vary (e.g., from frame to frame and/or from channel to channel), and so on. The conventional loop-back test technique typically characterizes the communication link (e.g., one traffic channel) based on a defined set of test parameters, and may not provide an accurate assessment of the performance of the communication link when the system operates in this flexible manner.

As can be seen, techniques that can be used to characterize a communication link under various flexible operating conditions supported by a wireless communication system are highly desirable.

SUMMARY OF THE INVENTION

The present invention provides various techniques to test a wireless communication link. In one aspect, the testing of a traffic channel is performed via a test data service option (TDSO), which is a service that may be negotiated and connected using the available service configuration and negotiation procedures defined by a particular (CDMA) system and used for other services (e.g., a voice call, a data call). Values for test parameters may be proposed by an entity (e.g., a remote terminal), accepted or rejected by the other entity (e.g., a base station), and alternative values for rejected values may also be provided by the other entity. The negotiation may be performed for each traffic channel to be tested.

In another aspect, to test a traffic channel, test data is generated based on a defined data pattern or a pseudo-random number generator. Sufficient test data may be generated for a test interval (e.g., 10.24 seconds) based on values from the pseudo-random number generator, and the generated test data may be stored to a (circular) buffer. Test data may thereafter be retrieved, as necessary, from a particular section of the buffer to form one or more data blocks for each "active" frame in the test interval in which test data is to be transmitted. The particular section of the buffer from which to retrieve the test data may be identified by a particular "offset" from a current buffer pointer location, and this offset may be determined based on a number from the pseudo-random number generator. Each data block may be appropriately identified by a header to enable concurrent testing of multiple traffic channels and for testing frames having multiple data blocks per frame. In an embodiment, one pseudo-random number generator and one buffer are provided (at the transmission source and also at the receiving device) for each traffic channel, either on the forward or reverse link, to be tested.

A traffic channel may be tested using discontinuous transmission. In this case, a two-state first-order Markov chain may be used to determine whether or not to transmit test data for each frame in the test interval. By selecting the proper probabilities of transitioning between an ON state (signifying transmission of test data) and an OFF state (signifying no transmission of test data) of the Markov chain, the average frame activity and average burst length (two parameters that define a discontinuous transmission) may be defined. The Markov chain may be driven by a second pseudo-random number generator, which may be different than the one used to generate the test data.

At a receiving device, the transmitted test data is received, processed in a complementary manner, and provided to a controller. The controller further directs local generation of the test data based on a pseudo-random number generator, which is synchronized to the generator at the transmitting source. The locally generated test data is stored in a buffer and thereafter retrieved from the buffer (as necessary) and compared against the received test data. Various performance and statistical data may be collected at the remote terminal based on the results of the comparison between the received and generated test data.

The testing of the reverse link may be achieved in similar manner as that for the forward link. Multiple traffic channels on the forward and reverse links may be tested concurrently. Independent testing of the traffic channels is possible by testing each traffic channel based on a respective set of test parameter values. Thus, the forward link traffic channels and reverse link traffic channels may be tested based on symmetric or asymmetric test parameter values. The traffic channels under test may have different frame lengths.

The invention further provides other methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
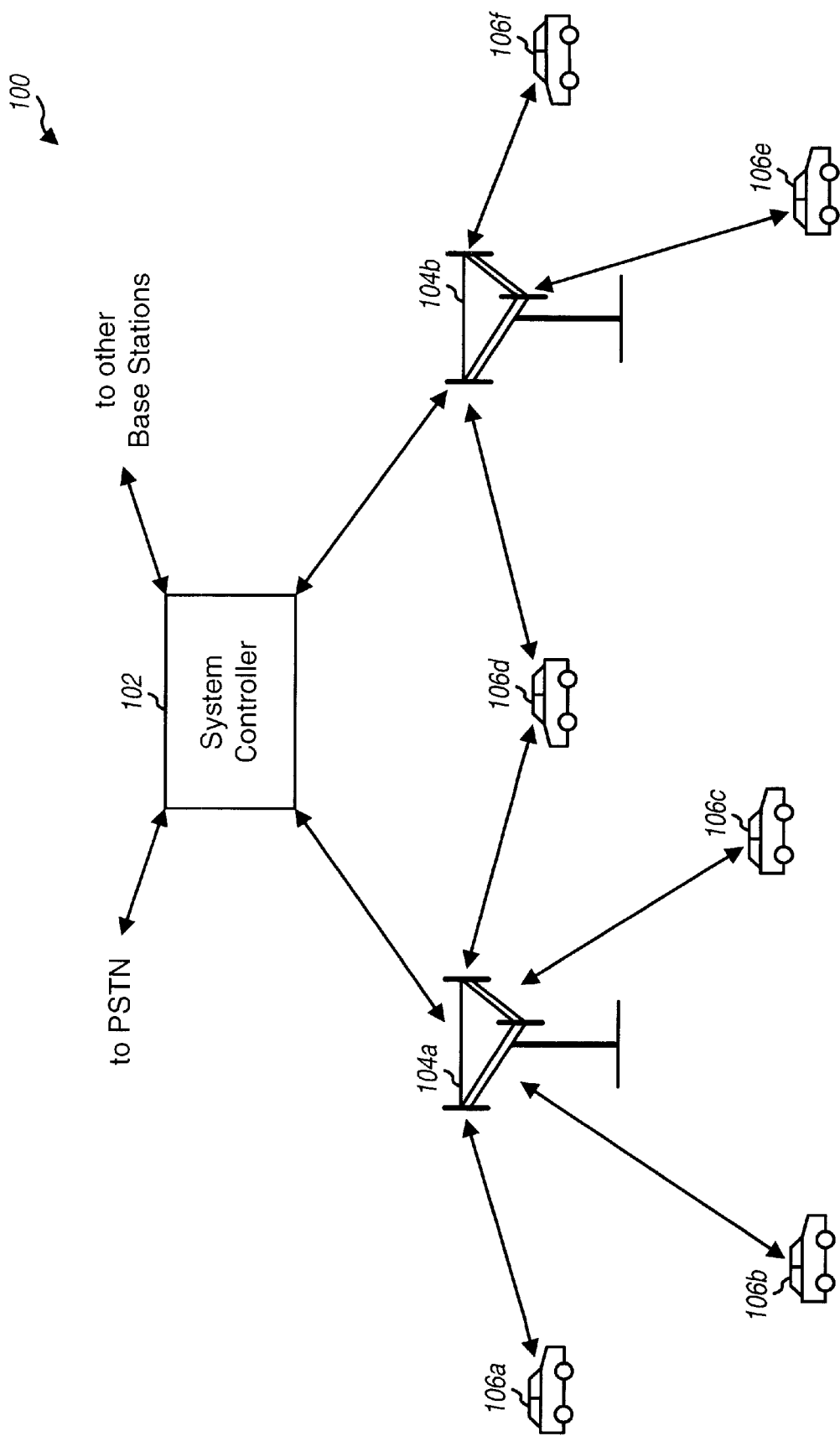
FIG. 1 is a diagram of a spread spectrum communication system that supports a number of users.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. As shown in FIG. 1, base station 104a communicates with remote terminals 106a, 106b, 106c, and 106d and base station 104b communicates with remote terminals 106d, 106e, and 106f.

A system controller 102 couples to base stations 104 and may further couple to a public switched telephone network (PSTN). System controller 102 provides coordination and control for the base stations coupled to it. System controller 102 further controls the routing of telephone calls among remote terminals 106, and between remote terminals 106 and the users coupled to PSTN (e.g., conventional telephones), via base stations 104. For a CDMA system, system controller 102 is also referred to as a base station controller (BSC).

System 100 may be designed to support one or more CDMA standards such as the "TIA/EIA-95-B Mobile Station-Base Station Compatibility Standard for Dual-Mode Wideband Spread Spectrum Cellular System" (the IS95 standard), the "TIA/EIA-98D Recommended Minimum Standard for Dual-Mode Wideband Spread Spectrum Cellular Mobile Station" (the IS98 standard), the "TIA/EIA/IS2000.2-A Physical Layer Standard for cdma2000 Spread Spectrum Systems", the "TIA/EIA/IS2000.5-A Upper Layer (Layer 3) Signaling Standard for cdma2000 Spread Spectrum Systems", the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), the standard offered by a consortium named "3rd Generation Partnership Project 2" (3GPP2) and embodied in a set of documents including Document Nos. C.S0002-A, C.S0005-A, C.S0010-A, C.S0011-A and C.S0026 (the cdma2 000 standard), or some other standards. These standards are incorporated herein by reference.

Some newer generation CDMA systems are capable of concurrently supporting voice and data transmissions, and may further be able to transmit to a particular remote terminal via a number of forward traffic channels. For example, in the cdma2000 system, a fundamental channel may be assigned for voice and certain types of data, and one or more supplemental channels may be assigned for high-speed packet data.

Figure 2A:
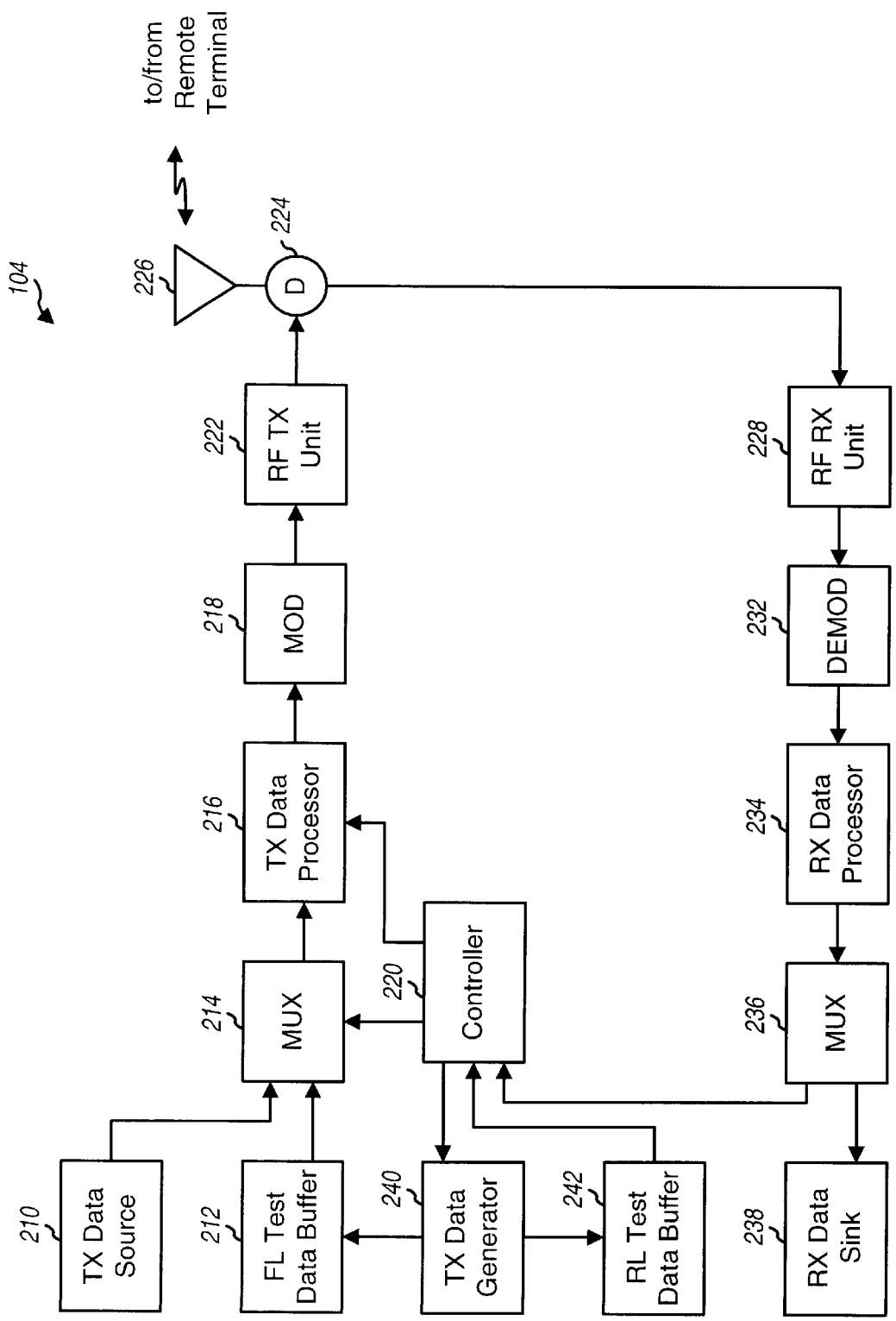
FIGS. 2A and 2B are block diagrams of an embodiment of a base station and a remote terminal, respectively, capable of implementing various aspects and embodiments of the invention.

FIG. 2A is a block diagram of an embodiment of base station 104, which is capable of implementing various aspects and embodiments of the invention. For simplicity, FIG. 2A shows the processing at the base station for a communication with one remote terminal. On the forward link, voice and packet data (collectively referred to herein as "traffic" data) from a transmit (TX) data source 210 and test data from a forward link (FL) test data buffer 212 are provided to a multiplexer (MUX) 214, FL test data buff 212 and RL test data buffer 242 are supplied with test data un TX data generator 240. Multiplexer 214 selects and provides the traffic data to a TX data processor 216 when operating in a normal mode, and provides the test data when operating in a test mode. TX data processor 216 receives and processes (e.g., formats, encodes, and interleaves) the received data, which is then further processed (e.g., covered, spread, and scrambled) by a modulator (MOD) 218. The modulated data is then provided to an RF TX unit 222 and conditioned (e.g., converted to one or more analog signals, amplified, filtered, and quadrature modulated) to generate a forward link signal. The forward link signal is routed through a duplexer (D) 224 and transmitted via an antenna 226 to a remote terminal.

Although not shown in FIG. 2A for simplicity, base station 104 is capable of processing and transmitting data on one or more forward traffic channels to a particular remote terminal. For a cdma2000 system, the forward traffic channels include the fundamental channel (FCH), dedicated control channel (DCCH), supplemental channel (SCH), and supplemental code channel (SCCH). The processing (e.g., encoding, interleaving, covering, and so on) for each forward traffic channel may be different from that of other forward traffic channels.

Figure 2B:
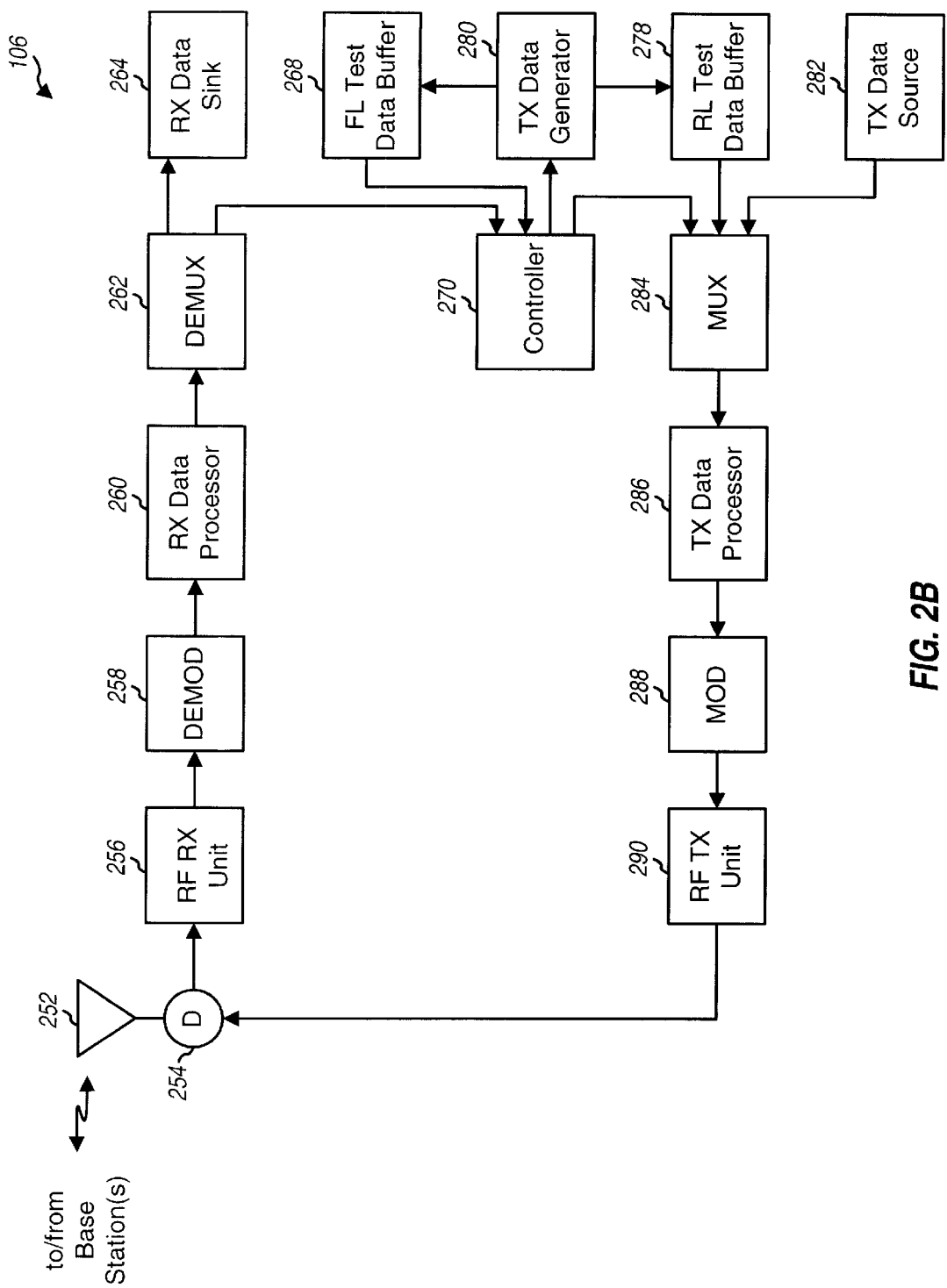

FIG. 2B is a block diagram of an embodiment of remote terminal 106. The forward link signal is received by an antenna 252, routed through a duplexer 254, and provided to an RF receiver unit 256. RF receiver unit 256 conditions (e.g., filters, amplifies, downconverts, and digitizes) the received signal and provides signal samples to demodulator (DEMOD) 258. Demodulator (DEMOD) 258 processes (e.g., despreads, decovers, and pilot demodulates) the demodulated signal samples to provide recovered demodulated symbols to RX data processor 260. Demodulator 258 may implement a rake receiver capable of processing multiple instances of the received signal and generating combined recovered symbols. Receive (RX) data processor 260 decodes the recovered symbols, checks the received frames, and provides decoded traffic data to demultiplexer (DEMUX) 262, which demultiplexes the data decode traffic data to a RX data sink 264 and decoded test data to a controller 270. Demodulator 258 and receive data processor 260 may be operated to process multiple transmissions received via multiple forward traffic channels.

On the reverse link, a multiplexer (MUX) 284 receives results of the forward traffic channel testing from controller 270, test data for testing of the reverse link from a reverse link (RL) test data buffer 278, and traffic data from a TX data source 282. Depending on the operating mode of remote terminal 106, multiplexer 284 provides the proper combination of data and/or results to a TX data processor 286. The data and results are then processed (e.g., formatted, encoded, and interleaved) by TX data processor 286, further processed (e.g., covered, spread) by a modulator (MOD) 288, and conditioned (e.g., converted to analog signals, amplified, filtered, and quadrature modulated) by an RF TX unit 290 to generate a reverse link signal, which is then routed through duplexer 254 and transmitted via antenna 252 to one or more base stations 104.

Referring back to FIG. 2A, the reverse link signal is received by antenna 226, routed through duplexer 224, and provided to an RF receiver unit 228. The reverse link signal is conditioned (e.g., downconverted, filtered, and amplified) by RF receiver unit 228, and further processed by a demodulator 232 and an RX data processor 234 in a complementary manner to recover the transmitted data and test results. The reverse link traffic data is provided to a RX data sink 238, and the forward link test results and reverse link test data are provided to a controller 220 for evaluation by multiplexer (MUX) 236.

As noted above, for efficient utilization of the available system resources, the communication link between the base station and remote terminal may be characterized. The link characterization information may then be used to schedule data transmission, allocate transmit power, determine data rate, and so on, for the remote terminal.

The invention provides various techniques to test a wireless communication link. In an aspect, to test a forward traffic channel, test data is generated at the base station by a test data generator 240 and provided to FL test data buffer 212. The generated test data is thereafter retrieved from buffer 212 (as necessary), processed, and transmitted from the base station to the remote terminal. At the terminal, the transmitted forward link test data is received, processed in a complementary manner, and provided to controller 270. Controller 270 further directs a test data generator 280 to locally generate the test data, which is stored in a FL test data buffer 268. The locally generated test data is thereafter retrieved from buffer 268 (as necessary) and compared against the received test data. Various performance and statistical data may be collected at the remote terminal based on the results of the comparison between the received and generated test data, as described in further detail below. The testing of the reverse link may be achieved in similar manner as that for the forward link.

For clarity, various aspects of the invention are described for a specific implementation for a cdma2000 system.

Channel and Frame Structure

In some CDMA systems, data may be transmitted on one or more traffic channels over the forward and reverse links. (A traffic channel may be akin to a physical channel for some CDMA systems, e.g., a W-CDMA system.) For example, in a cdma2000 system, voice data is typically transmitted over a fundamental channel (FCH), traffic data is typically transmitted over a supplemental channel (SCH), and signaling may be transmitted over a dedicated control channel (DCCH). The FCH, DCCH, and SCH are different types of traffic channel. To receive a high-speed data transmission on the SCH, a remote terminal is also typically assigned a FCH or DCCH. In the cdma2000 system, each assigned traffic channel is associated with a particular radio configuration (RC) that defines the channel's transmission formats, which may be characterized by various physical layer parameters such as the transmission rates, modulation characteristics, spreading rate, and so on.

For many CDMA systems, data is also transmitted in "frames", with each frame covering a particular time interval. For the cdma2000 system, data may be transmitted in frame lengths of 5 msec, 20 msec, 40 msec, or 80 msec on the fundamental and supplemental channels. For each frame of each connected traffic channel, one or more data blocks may be transmitted, depending on the radio configuration of the traffic channel.

In certain embodiments of the invention, the forward and reverse traffic channels are each subdivided into independent "test intervals" (which may also be referred to as "segments"). Each test interval has a duration of 10.24 seconds, which corresponds to 2048 frames for traffic channels (FCH, DCCH) with 5 msec frame length, 512 frames for traffic channels (FCH, DCCH, and SCH) with 20 msec frame length, 256 frames for traffic channels (SCH) with 40 msec frame length, and 128 frames for traffic channels (SCH) with 80 msec frame length. The first frame in the test interval is referred to as a synchronization frame. In an embodiment, the synchronization frame for each of the forward and reverse traffic channels (FCH, DCCH, SCHO, and SCHI) is selected based on (1) a 32-bit public long code mask (PLCM) assigned to the remote terminal and (2) the system frame number (SFN) of the traffic channel's frames, as described in further detail below. Thus, each traffic channel may be associated with synchronization frames that are different (time-wise) from those of other traffic channels.

In an aspect, the CDMA system is designed to support a test data service option (TDSO), which is akin to an operating mode in which the performance of the forward and/or reverse traffic channels for a remote terminal may be tested and/or verified. The initiation and negotiation of the parameters for the TDSO are described in further detail below. While operating in this mode, test data may be transmitted over the forward and/or reverse links and over one or more traffic channels on each link. This allows for independent testing of various traffic channels and further allows for independent testing of the forward and reverse links.

Test Data Generation

In accordance with an aspect of the invention, various types of test data may be used to test a traffic channel. These test data types may include defined data sequences, pseudo-random data, and others. The test data type may be selected via a parameter in the test data service option.

In one test configuration, one or more defined data sequences are used to test a traffic channel. Various schemes may be used to generate these data sequences. In one scheme, a single byte pattern is used to fill up each data block. This byte pattern may be an all ones pattern ("11111111") or some other byte pattern. If a data block includes more than a whole number of octets (e.g., 171 bits), each whole octet may be represented by the byte pattern and the remaining bits may be filled with zeros ("0"). The use of a defined data sequence may simplify the test data generation at the transmission source and receiving device.

In another test configuration, pseudo-random data is used to test a traffic channel. This data may be generated using one or more pseudo-random number generators, as described in further detail below.

Figure 3:
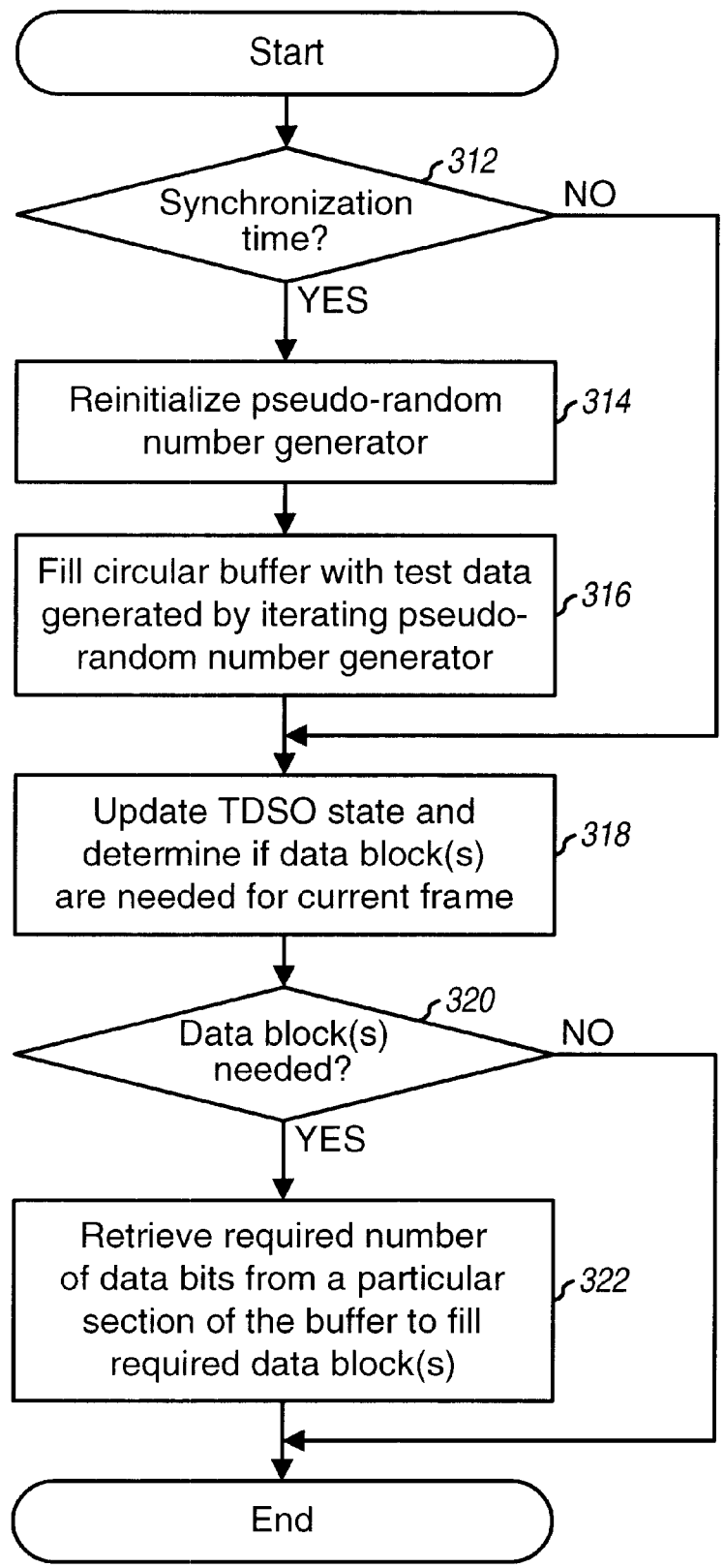
FIG. 3 is a flow diagram of a process for generating test data using a pseudo-random number generator, in accordance with a specific embodiment of the invention.

FIG. 3 is a flow diagram of a process for generating test data using a pseudo-random number generator, in accordance with a specific embodiment of the invention. FIG. 3 presents an overall view of the test data generation process, which is described in greater detail below. Prior to the start of each test interval for a particular traffic channel to be tested, the pseudo-random number generators used at the transmitting source and receiving device to generate the pseudo-random test data for this traffic channel are synchronized at step 312 and initialized, at step 314.

The pseudo-random number generator at the transmitting source is then operated to generate a sufficient number of test data bits for N frames (where N is two or greater), at step 316. These test data bits are stored to a (circular) buffer, which is subsequently used as the data source for bits to be packed into one or more data blocks for each "active" frame period in the test interval. The receiving device similarly generates the test data bits for N frames, which are stored to a corresponding buffer at the receiving device and thereafter retrieved as necessary to verify whether or not the transmitted test data bits are received error free.

In accordance with an aspect of the invention and as described below, the traffic channel may be tested using discontinuous transmission. In this case, for each frame in the test interval, a TDSO state for the current frame is updated, at step 318. A determination is then made whether or not test data is to be transmitted for the current frame based on the updated TDSO state, at step 320. If test data is to be transmitted, one or more blocks of test data are retrieved from a particular section of the circular buffer, at step 322. These steps are described in further detail below.

Figure 4:
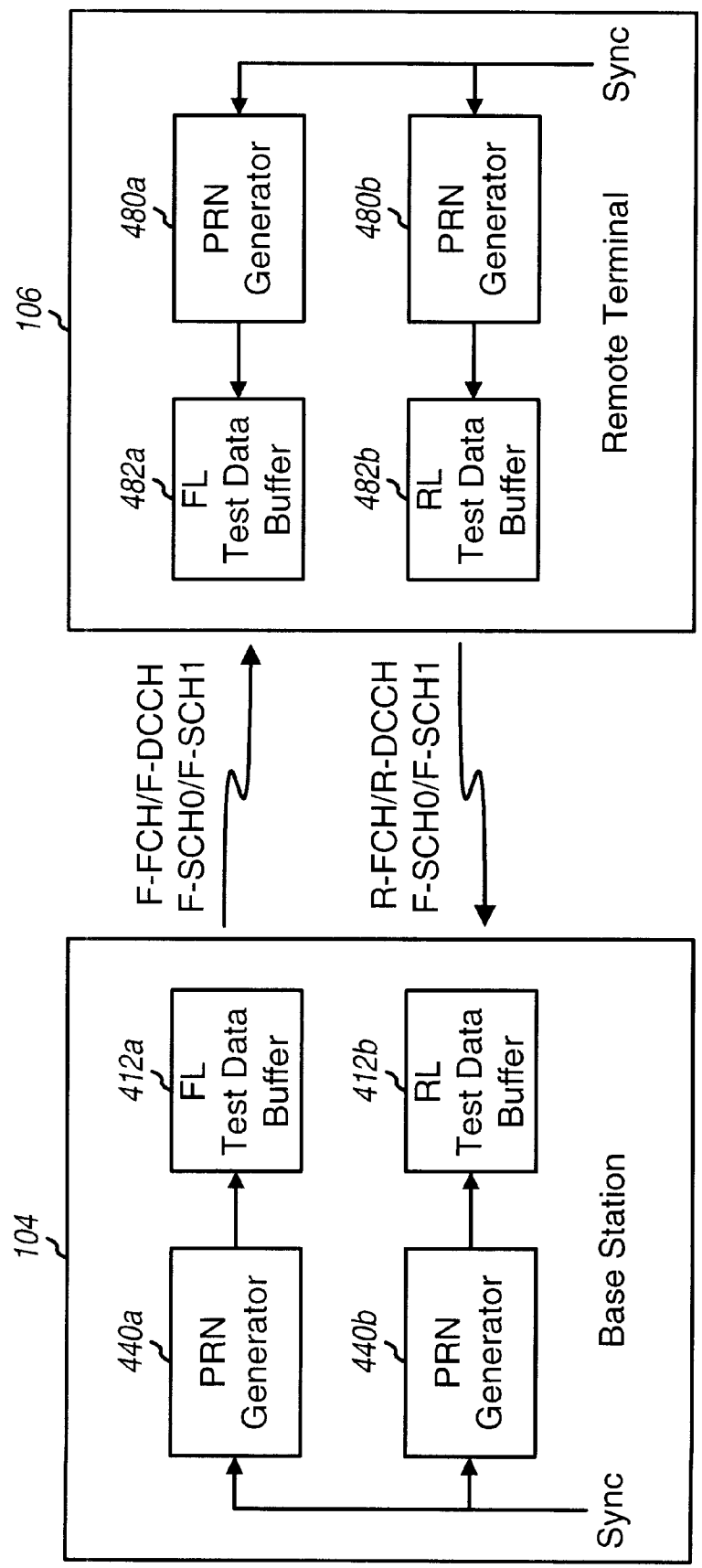
FIG. 4 is a block diagram of the buffers and pseudo-random number generators used for generating pseudorandom test data for two traffic channels.

FIG. 4 is a block diagram of the buffers and pseudo-random number generators used for generating pseudo-random test data for a forward and a reverse traffic channel, in accordance with an embodiment of the invention. In this embodiment, one pseudo-random number generator is associated with each traffic channel to be tested on each of the forward and reverse links. For example, if the TDSO is configured to transmit data over the FCH in the forward and reverse links and over the SCH0 only in the forward link, then three pseudo-random number generators are used at the base station and three pseudo-random number generators are used at the remote terminal (only two generators are shown on each side in FIG. 4).

In the embodiment shown in FIG. 4, base station 104 includes pseudo-random number generators 440a and 440b used to generate pseudo-random data for a traffic channel on the forward and reverse links, respectively. The generated test data from generators 440a and 440b is provided to test data buffers 412a and 412b, respectively. Similarly, remote terminal 106 includes pseudo-random number generators 480a and 480b used to generate pseudo-random data for the traffic channel on the forward and reverse links, respectively, which is provided to test data buffers 482a and 482b, respectively. Additional pseudo-random number generators are used for additional traffic channels to be tested. In an embodiment, pseudo-random number generators 440a, 440b, 480a, and 480b are initialized and synchronized at each synchronization frame (i.e., once every test interval), as described in further detail below.

In an embodiment, each pseudo-random number generator exhibits the following linear congruent relationship:

$$x_x = (a \cdot x_{n-1}) \bmod m. \qquad \text{Eq(1)}$$

In an embodiment, $a = 7^5 = 16807$, $m = 2^{31} - 1 = 2{,}147{,}483{,}647$, and $x_{n-1}$ and $x_n$ are successive outputs of the pseudo-random number generator and are 31-bit integers. Other values may also be used for a and m.

In an embodiment, each pseudo-random number generator is initialized prior to each synchronization frame on the traffic channel associate with the generator. The initialization may be achieved as follows:

```
{
a = 16807
m = 2147483647
PRNGx = seed value              // seed the generator
PRNGx = PRNGx XOR TOGGLE        // toggle some of the bits
PRNGx = PRNGx AND 0x7FFFFFFF    // zero out the MSB
PRNGx = (a • PRNGx) mod m       // iterate the generator
PRNGx = (a • PRNGx) mod m       // four times
PRNGx = (a • PRNGx) mod m
PRNGx = (a • PRNGx) mod m
}
```

In the above pseudo-code, PRNGx denotes the content of the $x^{th}$ pseudo-random number generator. The seed for the pseudo-random number generator may be selected as the system time, in frames, of the synchronization frame (e.g., the system frame number of the synchronization frame may be used as the seed for the pseudo-random generator). TOGGLE is a value used to toggle some of the bits of the seed, and may be selected as 0x2AAAAAAA for a generator used for the forward link and 0x55555555 for a generator used for the reverse link. As used herein, the notation "0x. . ." denotes a hexadecimal number.

Once initiated, the pseudo-random number generator is iterated a number of times to generate the pseudo-random test data to be used for the upcoming test interval. The number of test data bits to be generated is dependent on various factors such as (1) the traffic channel type (i.e., FCH, DCCH, or SCH) (2) the connected radio configuration of the remote terminal, (3) the maximum number of bits to be passed by a multiplex sublayer to the physical layer for each frame period, (4) the size of the available buffer, and (5) possibly other factors. The multiplex sublayer is a protocol layer between a physical layer and a higher layer, and which multiplexes traffic data, test data, signaling, and other types of data received from the TDSO to the assigned traffic channel(s).

In an embodiment, test data bits are generated for N frames at the maximum bit rate possible for the connected radio configuration, as described in further detail below. A default value of two, for example, may be set for N, unless another value for N is negotiated between the base station and remote terminal. A larger value for N may provide test data having better randomness properties but requires a larger-sized buffer.

After initialization, the pseudo-random number generator is used to generate test data bits for N frames. During the test data generation, whenever a pseudo-random number is needed, the current value of the variable PRNGx is retrieved and used, and the variable PRNGx is then updated (i.e., iterated) once as shown in equation (1). In an embodiment, only the most significant 24 bits of the 31-bit number for PRNGx are used because of better randomness properties and ease of usage, and the least significant 7 bits are discarded. Thus, each iteration of the pseudo-random number generator provides a 24-bit pseudo-random number, $y_n(k)$, used to provide three bytes of test data. P(n) iterations are performed to generate the required test data for N frames.

Figure 5:
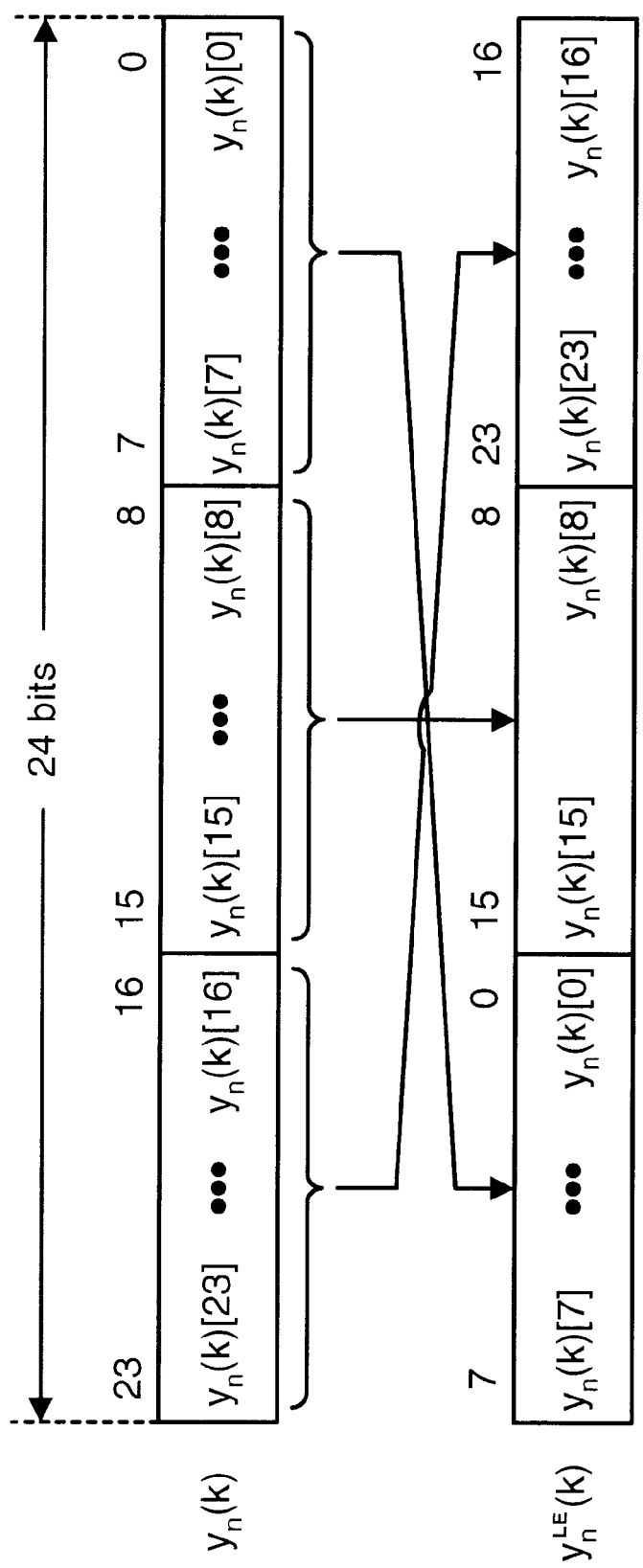
FIG. 5 is a diagram that illustrates the reshuffling of a pseudo-random number to generate a number for the test data.

FIG. 5 is a diagram that illustrates a reshuffling of each pseudo-random number to generate 24 bits of test data. Using the 31-bit number from the pseudo-random number generator to generate test data is inefficient, from an implementation point of view, because the number is not octet aligned. It is easier to build a frame with a number that is octet aligned. The least significant bits of the 31-bit number are "less random" than the most significant bits, and are thus shuffled to the right. In an embodiment, each 24-bit pseudo-random number $y_n(k)$ from the pseudo-random number generator, where $1 \leq k \leq P(n)$, is reshuffled and stored in "little-endian" order. The reshuffling is achieved by swapping the least significant byte in the 24-bit number $y_n(k)$ with the most significant byte to generate the reshuffled number $y_n^{LE}(k)$.

To generate test data for a new test interval for a particular rate R(n), the TDSO generates P(n) pseudo-random numbers corresponding to an actual buffer size B(n), where B(n) $\geq N \bullet R(n)$. As an example, to generate 344 test data bits, the pseudo-random number generator is iterated 15 times (15•24=360, which is the first integer number of iterations that yield at least 344 bits). The buffer is then filled with the following number sequence:

$$y_n^{LE}(1), y_n^{LE}(2), y_n^{LE}(3), \ldots, y_n^{LE}(15).$$

The buffer is filled with test data at the start of each test interval and prior to the synchronization frame. Thereafter, for each "active" frame in the test interval in which test data is to be transmitted, test data bits may be retrieved from the buffer to generate one or more data blocks for the frame. For a particular traffic channel, the bits from the buffer are packed serially into one or more data blocks (e.g., corresponding to the available MUX PDU (Protocol Data Unit), as determined by the connected multiplex option, where each MUX PDU represents encapsulated data communicated between peer layers at the base station and remote terminal).

In an embodiment, the test data buffer is operated as a circular buffer and test data for each frame is retrieved from a particular section of the circular buffer (i.e., starting from a particular location in the circular buffer). Initially, after filling the circular buffer (e.g., with at least two frames of test data), a buffer pointer is set to the first location in the buffer (e.g., address zero). In an embodiment, at the start of each frame, the pseudo-random number generator is iterated once and a 24-bit number is obtained as described above. The least significant 6 bits of this 24-bit number, $O_n$, is then used to determine an offset for the buffer pointer. The buffer pointer is advanced from its current location by $[O_n \bmod B(n)]$ byte positions to the new starting location for the current frame. Bytes of test data are then retrieved from the circular buffer, starting from this starting location, to fill whole octets in a data block. For example, if a data block includes 171 bits, then 21 bytes (i.e., 168 bits) of test data are retrieved from the circular buffer and the remaining three bits in the data block are filled with zeros ("0").

For the next frame, the pseudo-random number generator is iterated once more, the least significant 6 bits of the 24-bit number, $O_{n+1}$, from the generator is used to determine the buffer pointer offset for this frame. The buffer pointer is advanced by $[O_{n+1} \bmod B(n)]$ byte positions from the current location (which is one byte position over from the last test data byte retrieved for the prior frame). This process for generating data blocks is repeated for each active frame in the test interval in which test data is to be transmitted. An example of the test data generation is provided below.

Frame and Buffer Sizes

As noted above, the pseudo-random number generator for a particular traffic channel and (forward or reverse) link to be tested is iterated a number of times (i.e., as often as necessary) to generate the test data to be used for a test interval. The number of test data bits to be generated for each test interval is based on the channel type and radio configuration. Table 1 lists the maximum number of bits for each (5 msec, 20 msec, 40 msec, or 80 msec) frame and the buffer size for the FCH and DCCH for various radio configurations defined by the cdma2000 standard.

TABLE 1

| Reverse Radio Configuration (RC) | Forward Radio Configuration (RC) | Maximum bits/frame | Buffer Size for Two Frames (bits) | Buffer Size for N Frames (bits) |
|---|---|---|---|---|
| 1, 3, 5 | 1, 3, 4, 6, or 7 | 172 | 2 × 172 = 344 | N × 172 |
| 2, 4, 6 | 2, 5, 8, or 9 | 267 | 2 × 267 = 534 | N × 267 |

Table 2 lists the maximum number of bits per frame and the buffer size for a forward supplemental channel (F-SCH0 or F-SCH1) for various radio configurations defined by the cdma2000 standard.

TABLE 2

| Radio Configuration (RC) | Maximum bits/frame | Buffer Size for Two Frames (bits) | Buffer Size for N Frames (bits) |
|---|---|---|---|
| 3 | 3,048 | 2 × 3,048 = 6,096 | N × 3,048 |
| 4 | 6,120 | 2 × 6,120 = 12,240 | N × 6,120 |
| 5 | 4,584 | 2 × 4,584 = 9,168 | N × 4,584 |
| 6 | 6,120 | 2 × 6,120 = 12,240 | N × 6,120 |
| 7 | 12,264 | 2 × 12,264 = 24,528 | N × 12,264 |
| 8 | 9,168 | 2 × 9,168 = 18,386 | N × 9,168 |
| 9 | 20,172 | 2 × 20,172 = 40,344 | N × 20,172 |

Table 3 lists the maximum number of bits per frame and the buffer size for a reverse supplemental channel (R-SCH0 or R-SCH1) for various radio configurations defined by the cdma2000 standard.

TABLE 3

| Radio Configuration (RC) | Maximum bits/frame | Buffer Size for Two Frames (bits) | Buffer Size for N Frames (bits) |
|---|---|---|---|
| 3 | 6,120 | 2 × 6,120 = 12,240 | N × 6,120 |
| 4 | 4,584 | 2 × 4,584 = 9,168 | N × 4,584 |
| 5 | 12,264 | 2 × 12,264 = 24,528 | N × 12,264 |
| 6 | 20,172 | 2 × 20,172 = 40,344 | N × 20,172 |

Discontinuous Transmission Testing

In accordance with an aspect of the invention, the testing of a traffic channel may be performed in a manner to model discontinuous transmission (DTX) supported by some newer generation CDMA systems (e.g., the cdma2000 and W-CDMA systems). This DTX testing may be achieved by transmitting test data on the traffic channel in accordance with a particular ON/OFF frame activity. For each frame period (e.g., each 20 msec, 40 msec, or 80 msec) for the traffic channel, the TDSO may choose to provide to the multiplex sublayer either one or more data blocks corresponding to a full-rate frame on that channel or one or more blank data blocks. Various DTX schemes may be used to provide data to the multiplex sublayer to achieve a particular desired frame activity. Some of these DTX schemes are described in further detail below.

In a first DTX scheme, test data is provided based on a deterministic frame activity. For this DTX scheme, test data is transmitted on the traffic channel for a particular ON duration, followed by blank data transmission for a particular OFF duration, followed by test data transmission for another ON duration, and so on. The ON and OFF durations may be selectable or negotiated between the base station and remote terminal. Also, the ON/OFF cycles may be periodic or non-periodic.

Figure 6:
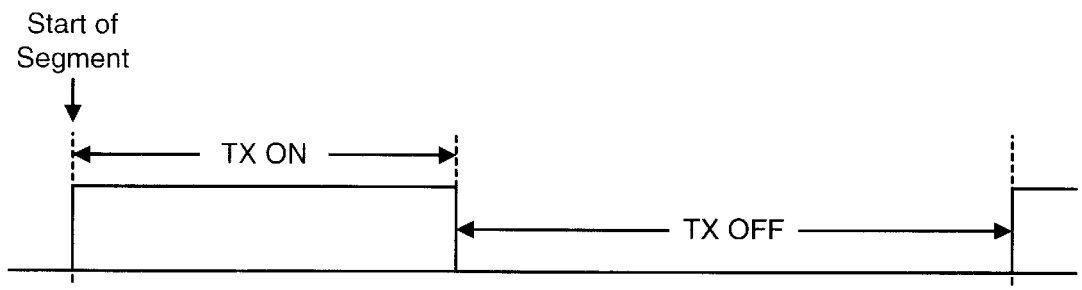
FIG. 6 is a diagram that illustrates test data transmission for a discontinuous transmission (DTX) scheme based on a deterministic frame activity.

FIG. 6 is a diagram that illustrates test data transmission for an embodiment of the first DTX scheme. As shown in FIG. 6, the TDSO sends to the multiplex sublayer test data blocks for a traffic channel for a particular ON duration, and then sends blank data blocks for a particular OFF duration. The ON/OFF cycle may be designated to start at the beginning of a synchronization frame on the traffic channel being tested. The ON and OFF durations may be selected such that (1) each test interval includes one ON/OFF cycle, (2) a test interval includes multiple ON/OFF cycles, or (3) an ON/OFF cycle spans multiple test intervals.

In an embodiment, the ON duration for transmitting test data and the OFF duration for transmitting blank data may be specified by two parameters (e.g., TX_ON_PERIOD and TX_OFF_PERIOD) in a message (e.g., a *Service Option Control Message* in the cdma2000 system) sent or received by the transmitting source.

In a second DTX scheme, test data is provided in a pseudo-random manner based on a particular average frame activity and burst length. This DTX scheme may be used to achieve a particular (desired or selected) long-term average of frame activity (D) and a particular average burst length (B) for a traffic channel. The average frame activity D refers to the average number of frames in each ON duration versus the average number of frames in each ON/OFF cycle. And the average burst length B refers to the average number of frames in each ON duration.

Figure 7:
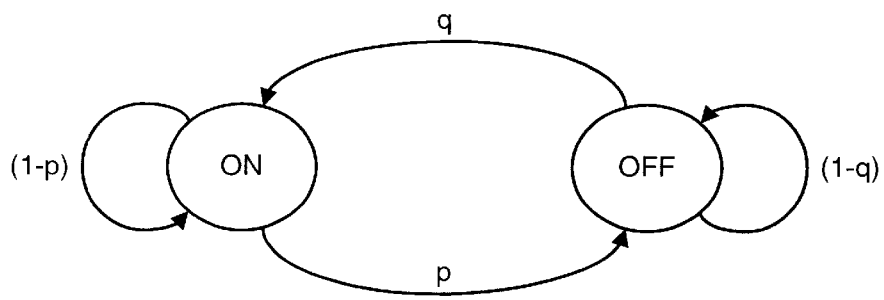
FIG. 7 is a diagram of a two-state first-order Markov chain that may be used to model the ON/OFF states for a DTX scheme based on pseudo-random frame activity.

FIG. 7 is a diagram of a two-state first-order Markov chain that may be used to model the ON/OFF states for the TDSO for the second DTX scheme. In an embodiment, one Markov chain is maintained for each traffic channel being tested. At the start of each frame, the TDSO is either in the ON state or the OFF state. The Markov chain is characterized by a probability p of transitioning from the ON state to the OFF state, and a probability q of transitioning from the OFF state to the ON state. The values of p and q may be specified by two parameters (e.g., ON_TO_OFF_PROB and OFF_TO_ON_PROB) in a message (e.g., a *Service Option Control Message*) sent by the transmitting source (e.g., the base station).

The long-term average frame activity D may be defined as:

$$D = \frac{q}{p+q}. \quad \text{Eq (2)}$$

And the average burst length B may be defined as:

$$B = \frac{1}{p}. \quad \text{Eq (3)}$$

For some testing, it may be desirable to select the average frame activity D and the average burst length B, and then determine the corresponding values for p and q based on the desired D and B. Combining and rearranging equations (2) and (3), the following are obtained:

$$D = \frac{Bq}{1+Bq}. \quad \text{Eq (4)}$$

-continued $$B = \frac{D}{(1-D)q}. \quad \text{Eq (5)}$$

Equation (4) indicates that for a given value of B, D varies from 0 to B(1+B) when q varies from 0 to 1, respectively. Similarly, equation (5) indicates that for a given value of D, B varies from D/(1-D) to infinity when q varies from 0 to 1, respectively. For example, when B is selected as 2, D should be smaller than ⅔, which indicates that the average frame activity D cannot be set higher than ⅔ when B is set to 2. As another example, if D is set to ⁷⁄₁₀, then B is set greater than ⁷⁄₃.

In an embodiment, a (e.g., 24-bit) pseudo-random number is used to drive the transition between the ON and OFF states for each frame period (each 5 msec, 20 msec, 40 msec, or 80 msec). In an embodiment, one pseudorandom number generator is used for all traffic channels having the same frame length. For example, one pseudo-random number generator is used for all traffic channels having 20 msec frame lengths. A second pseudo-random number generator is used for supplemental channels configured for 40 msec or 80 msec frame length, and this generator is updated every 40 msec or 80 msec corresponding to the channel frame length. In an embodiment, the pseudo-random number generator(s) used to drive the TDSO states are different than the ones used to generate the test data.

In an embodiment, the pseudo-random number generator (s) used to drive the transitions between TDSO states are initialized at the start of the first synchronization frame after the TDSO is initialized. Upon initialization, the Markov chain for each traffic channel is set to a particular state (e.g., OFF). The pseudo-random number generator(s) are thereafter maintained throughout the duration of the call, without reinitialization at subsequent synchronization frames. These generators may be reinitialized upon completion of a CDMA-CDMA hard handoff.

Figure 8:
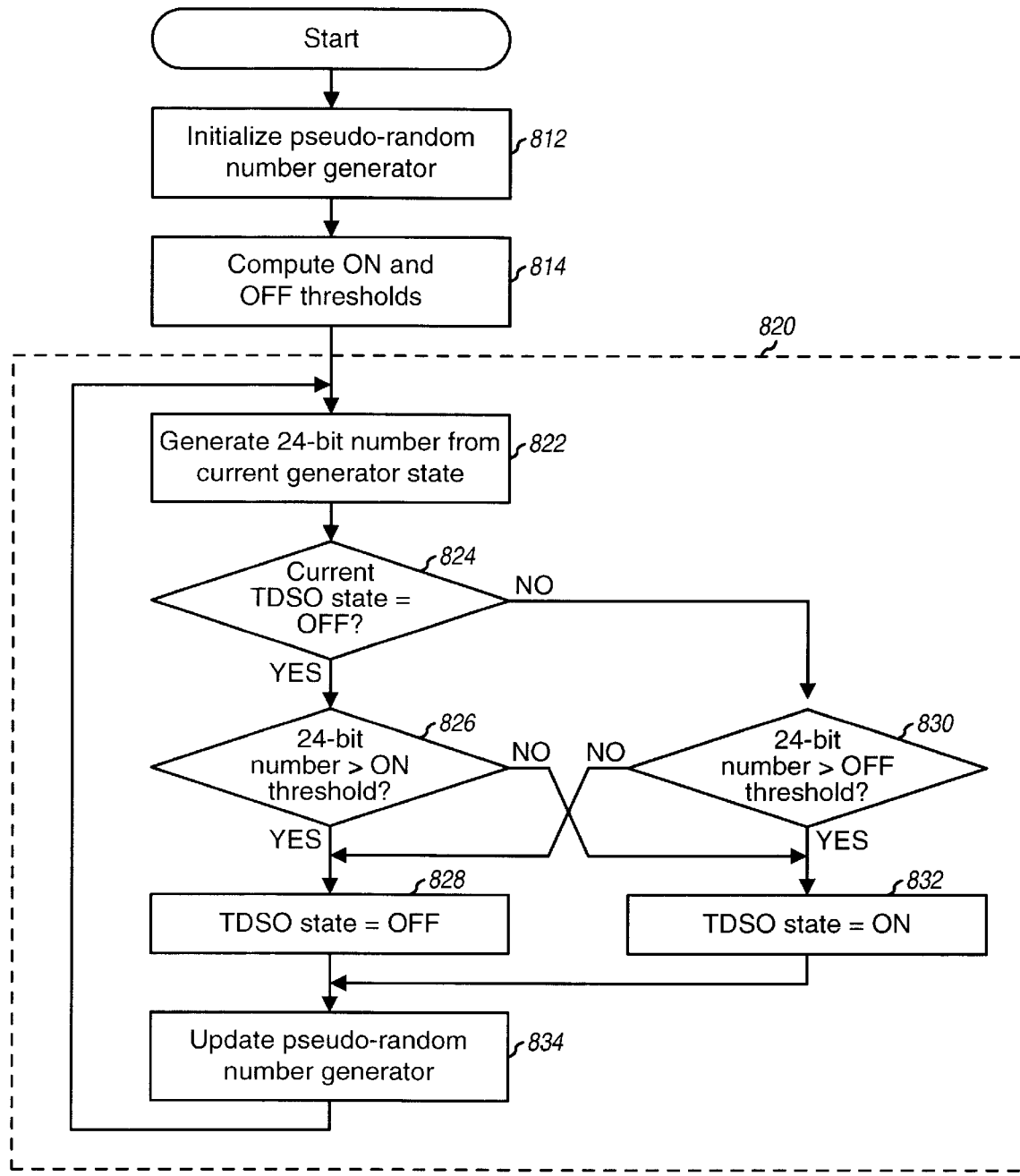
FIG. 8 is a flow diagram of an embodiment of a process for transitioning between the ON and OFF states of the Markov chain for a traffic channel.

FIG. 8 is a flow diagram of an embodiment of a process for transitioning between the ON and OFF states of the Markov chain for a traffic channel. Initially, the pseudo-random number generator used to drive the TDSO states for the traffic channel is initialized, at step 812. This initialization may be achieved, for example, by obtaining a seed for the generator, XORing the seed with the value 0x2AAAAAAA, ANDing the result with the value 0x7FFFFFFF, and iterating the generator four times with the modified seed, as described in the above pseudo-code.

In an embodiment, a 24-bit pseudo-random number from the pseudo-random number generator is used to determine whether or not to transition from one state to another. Thus, 24-bit ON and OFF threshold values are computed, at step 814. These thresholds may be computed as:

ON_THRESHOLD=ROUND (16,777,215•q), and

OFF_THRESHOLD=ROUND (16,777,215•p).

As shown in FIG. 7, the TDSO for the traffic channel transitions from the ON state to the OFF state with a probability of p, and from the OFF state to the ON state with a probability of q. Based on a pseudo-randomly generated 24-bit number, the TDSO transitions from the ON state to the OFF state if this number is less than the OFF_THRESHOLD, and from the OFF state to the ON state if this number is less than the ON_THRESHOLD. Steps 812 and 814 are typically performed once, prior to the first synchronization frame after the TDSO has been initialized.

The steps within box 820 are thereafter performed for each frame period. Initially, a 24-bit pseudo-random number is generated from the current 31-bit state of the pseudorandom number generator, at step 822. A determination is next made whether or not the current TDSO state for the traffic channel is OFF, at step 824.

If the current TDSO state is OFF, a determination is made whether the 24-bit number is greater than or equal to the ON_THRESHOLD, at step 826. If the answer is yes, the TDSO remains in the OFF state, at step 828. Otherwise, the TDSO transitions to the ON state, at step 832. In either case, the process then proceeds to step 834.

If the current TDSO state is ON (determined back at step 824), a determination is then made whether the 24bit number is greater than or equal to the OFF_THRESHOLD, at step 830. If the answer is yes, the TDSO remains in the ON state, at step 832. Otherwise, the TDSO transitions to the OFF state, at step 828.

At step 834, the pseudo-random number generator is iterated once, as shown in equation (1), to update the state of the generator for the next frame.

Data Block Header and Format

In accordance with an aspect of the invention, each test data block is appropriately identified to enable concurrent testing of multiple traffic channels and for frames with multiple data blocks per frame. In an embodiment, the identification is achieved via a header provided in each data block supplied to the multiplex sublayer for each frame.

Figure 9:
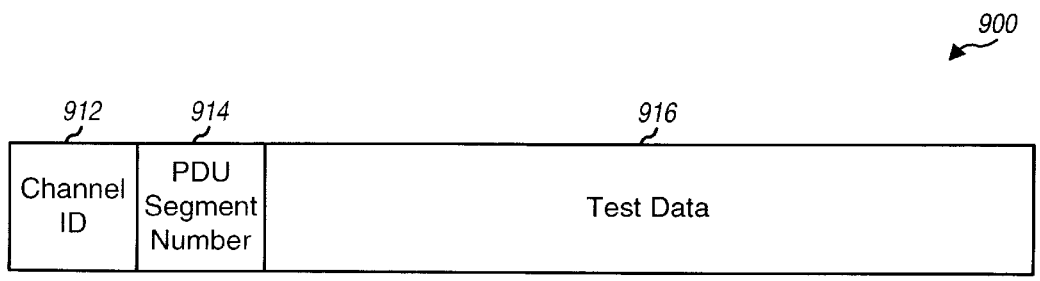
FIG. 9 is a diagram of an embodiment of a test data block.

FIG. 9 is a diagram of an embodiment of a test data block 900, which includes a channel ID field 912, a PDU (data block) sequence number field 914, and a test data field 916. Channel ID field 912 identifies the particular traffic channel used to send this data block. PDU sequence number field 914 identifies the sequence number of this data block within the frame (e.g., within a physical layer service data unit (SDU)). For a FCH or DCCH carrying one data block per frame, this field is set to '0'. And for an SCH capable of carrying multiple data blocks per frame, this field is set to '0' for the first data block in the SCH frame, '1' for the second data block in the SCH frame, and so on. Test data field 916 includes the (defined or pseudo-random) test data generated as described above.

Table 4 lists the fields and their lengths and definitions for an embodiment of test data block 900.

TABLE 4

| Field | Length (bits) | Definition |
| --- | --- | --- |
| Channel ID | 2 | Channel ID of traffic channel used to carry the data block |
| PDU Sequence Number | 3 | Sequence number of the data block within a physical layer SDU |
| Test Data | Variable | Test data bits |

Table 5 shows a specific definition of the Channel ID field for various traffic channel types in the cdma2000 system.

TABLE 5

| Channel ID | Traffic Channel |
| --- | --- |
| 0 | FCH |
| 1 | DCCH |
| 2 | SCH0 |
| 3 | SCH1 |

Example of Test Data Generation

For clarity, the test data generation is now described for a specific example. In this example, the following parameters are used:

The TDSO is configured to transmit primary traffic over the FCH.

The base station and remote terminal are configured to support radio configuration 3, and the frame length is 172 bits.

Multiplex option 0x01 is selected for the FCH, and one data block is passed to the multiplex sublayer for each active (20 msec) frame.

The average frame activity D and average burst length B are based on the probabilities p=0.7 and q=0.3. Thus, D=q/(p+q)=0.3, B=1/p≈1.4, ON_THRESHOLD= ROUND (16,777,215•p)=11,744,051, and OFF_ THRESHOLD=ROUND (16,777,215•q)=5,033,164.

The least significant 32 bits of the remote terminal's Public Long Code Mask (PLCM) is equal to 0x9F000307.

A first pseudo-random number generator used to determine the transitions between the ON/OFF states of the Markov chain for this traffic channel has a current value of 0x682DFF0C.

For this example, the TDSO is about to transmit frame number 0xAB89EFAD on the forward FCH (F-FCH) to the remote terminal. The frame number is XORed with the value 0x2AAAAAAA, and the least significant 9 bits of the XOR result is equal to 0x107, which is equal to the least significant 9 bits of the remote terminal's PLCM. This frame is thus the synchronization frame for the F-FCH, and the test data generation process is resynchronized.

As part of the resynchronization, a second pseudo-random number generator used to generate test data for the F-FCH is reinitialized by (1) seeding it with the frame number 0xAB89EFAD, (2) performing an XOR of the seed with the value 0x2AAAAAAA to generate the value 0x01234507, and (3) iterating the pseudo-random number generator four times, as described in the above pseudo-code.

After reinitialization, the state of the second pseudo-random number generator is 0x3B7E3E68, the most significant 24 bits of this state is 0x76FC7C, and the least significant 6 bits of this 24-bit number is 0x3C. This 6-bit number, $O_n$, is later used to determine the offset for the circular buffer.

The second pseudo-random number generator is then iterated 15 times to generate 360 test data bits for two frames of test data (15 is the smallest number of iterations that will provide at least 344 bits included in two frames for radio configuration 3). The actual buffer size is thus B(n)=45 (i.e., 360 bits=45 bytes).

The generation of the test data proceeds as follows. Prior to each iteration, the current state of the second generator is obtained and the most significant 24 bits are used to form a 24-bit number. The following sequence of 24-bit numbers are generated by the second pseudo-random number generator:

$y_n(1) = 0x76FC7C$    $y_n(6) = 0x4CA46B$    $y_n(11) = 0xD05BFE$
$y_n(2) = 0xBA6678$    $y_n(7) = 0xBE783D$    $y_n(12) = 0x478744$
$y_n(3) = 0x9D7F54$    $y_n(8) = 0xC7EDAF$    $y_n(13) = 0x01A3DE$
$y_n(4) = 0x1279A7$    $y_n(9) = 0xC5BDB3$    $y_n(14) = 0xAD4A7D$
$y_n(5) = 0xF0E8EF$    $y_n(10) = 0x29428D$   $y_n(15) = 0xF58934$

Each 24-bit number $y_n(k)$ is then stored to a circular buffer for the F-FCH in little-endian fashion, as described above. For example, the first 24-bit number 0x76FC7C is stored as 0x7CFC76, where the most and least significant bytes of the number $y_n(k)$ are swapped to generate the reshuffled number $y_n^{LE}(k)$. The circular buffer used to generate the data blocks for the F-FCH for the next 512 frames in the test interval includes the following byte sequence:

↓
→ 7C FC 76 78 66 BA 54 7F 9D A7 79 12 EF E8 F0 6B A4 4C 3D 78 BE AF ED
C7 B3 BD C5 8D 42 29 FE 5B D0 44 87 47 DE A3 01 7D 4A AD 34 89 F5 →

The first pseudo-random number generator used to determine the ON/OFF state is then updated, and a new 24bit number having a value of 0×478744 (4,687,684) is generated. The first pseudo-random generator is updated at the end of the first iteration of the loop and after the 24bit number is calculated, it is tested against the ON_THRESHOLD during the second iteration around the loop. Since this value is less than the ON_THRESHOLD value of 11,744,051, the TDSO transitions from the OFF state to the ON state, and a data block is provided to the multiplex sublayer for the current frame.

To generate this data block for the first frame in the test interval, the offset for the buffer pointer is computed as $O_n$ mod B(n) (i.e., 0×3C mod 45=60 mod 45=15). The buffer pointer (which is initialized to zero upon reinitialization) is thus advanced by 15 byte positions, from 0×7C to 0×6B. The 171 bits for the data block are then formed with 21 bytes (168 bits) retrieved from the circular buffer, starting at the buffer location identified by the advanced buffer pointer. The remaining three bits in the data block are filled with zeros. The data block includes the following byte sequence:

6B 4A 4C 3D 78 BE AF ED C7 B3 BD C5 8D 42 29 FE 5B D0 44 87 47 '000'

Since this frame is to be sent over the F-FCH, the first 5 bits of the octet are replaced by '00000' corresponding to the channel ID of '00' and the PDU sequence number of '000'. The final test data block is as follows:

03 A4 4C 3D 78 BE AF ED C7 B3 BD C5 8D 42 29 FE 5B D0 44 87 47 '000'

For the next TDSO frame, a new 24-bit number having a value of 107,486 is generated by the first pseudo-random number generator. Since this value is less than the ON threshold, the TDSO remains in the ON state and a new data block is generated for the multiplex sublayer.

For the second frame in the test interval, the second pseudo-random number generator is iterated, and a 24-bit number having a value of 0×02F3FD is generated. The 6-bit number $O_n$ for the buffer offset has a value of 0×3D. The buffer offset is then computed as $O_n$ mod B(n) (i.e., 0×3D mod 15=61 mod 45=16). The buffer pointer (which was pointing one byte location over from the last retrieved byte value of 0×47 for the last data block) is thus advanced by 16 byte positions from 0×DE to 0×6F. The 171 bits for the data block are then formed with 21 bytes from the circular buffer, starting at the new buffer location. The remaining three bits in the data block are filled with zeros. The data block includes the following byte sequence:

7F 9D A7 79 12 EF E8 F0 6B A4 4C 3D 78 BE AF ED C7 B3 BD C5 8D '000'

After replacing the first 5 bits with '00000' corresponding to the data block header for the F-FCH, the data block provided to the multiplex sublayer is as follows:

07 9D A7 79 12 EF E8 F0 6B A4 4C 3D 78 BE AF ED C7 B3 BD C5 8D '000'

The buffer pointer now points to the next byte position (0×42) for the next frame.

TDSO Frame Transmission and Reception

To test a particular traffic channel, the data block(s) for each "active" frame are generated based on a defined data pattern or a pseudo-random number generator, as described above. The transmitting source and receiving device are synchronized so that the receiving device is able to properly generate the transmitted frames, such that the received frames may be compared with the locally generated frames. Each data block in each frame is appropriately identified to indicate (1) the particular traffic channel used to send the data block and (2) the data block number within the frame. The TDSO is able to compare the received and locally generated frames, count the errors, determine the bit error rate (BER), PDU or data block error rate (PER), and frame error rate (FER), and compute other measures of performance.

The testing thus includes processing performed at the transmitting source to transmit a test frame and processing performed at the receiving device to receive a test frame.

The transmit frame processing includes:
Generating one or more data blocks for each active frame.
Supplying the generated data block(s) to the multiplex sublayer for transmission.
Incrementing the appropriate counters.

For a test of the FCH or DCCH that operates on 20 msec frames, the TDSO provides one data block to the multiplex sublayer for each active frame interval in which the TDSO state for the traffic channel is ON. For a test of the SCH, the TDSO provides $N_B$ data blocks to the multiplex sublayer for each active frame interval (20 msec, 40 msec, or 80 msec), where NB is the maximum number of data blocks in a physical layer SDU for the connected service option. Each data block may be generated as described above, and includes the header and test data.

The receive frame processing includes:
Generating one or more data blocks for each active frame.
Receiving data block(s) from the multiplex sublayer.
Comparing the rates and contents of the received and generated data block(s).
Incrementing the appropriate counters.

At the receiving device, the multiplex sublayer categorizes each received data block (e.g., as either test data or blank) and the frame. The multiplex sublayer then supplies the data block type and received test data bits, if any, to the TDSO.

Various counters may be maintained at the transmitting source and receiving device to support TDSO. For each traffic channel to be tested, a set of counters may be maintained at the transmitting source to keep track of the number of frames (of various types) and data blocks transmitted to the receiving device. At the receiving device, another set of counters may be maintained to keep track of the number of frames, data blocks, and data bits received from the transmitting source, the number of frame errors, block errors, and bit errors, and so on. These counter values may be stored in a buffer. This buffer is typically implemented separate from the data buffer, and is used to store various counters over a period of time. The counter values may thereafter be used to determine the FER, PER, and/or BER, and other statistics such as the average frame activity, average burst length, and so on. The test results and statistical information may be reported from the remote terminal to the base station via one or more messages.

Test Data Service Option

In accordance with an aspect of the invention, the test data service option (TDSO) is a service that may be negotiated and connected using the available service configuration and negotiation procedures defined by a particular CDMA system and used for other services (e.g., a voice call, a data call). The remote terminal may be able to propose and/or accept a service configuration having attributes that are consistent with valid attributes for that configuration. The remote terminal may also be able to indicate the preferred radio configurations for the forward and reverse links.

In an embodiment, the remote terminal is able to propose or invoke service-option-specific functions for a TDSO call by sending a message (e.g., a. *Service Option Control Message* in the cdma2000 system) to the base station. This message may be sent such that an acknowledgement is requested or required from the base station. Via the message, the remote terminal may propose values for various test parameters to be used during the test period.

The base station receives the message and may accept or reject the remote terminal's proposed test parameter settings. If all the fields in the remote terminal's directive are within acceptable ranges for the base station, the base station may issue a directive that accepts the remote terminal's proposal. This directive may be sent to the remote terminal via a response message (e.g., a *Service Option Control Message*) that includes the same values, as proposed by the remote terminal, for the various fields.

Alternatively, if the remote terminal proposes a particular test setting not supported by or acceptable to the base station, the base station may issue a directive that may include alternative values (i.e., counter-proposals) to the remote terminal's proposed values. This directive may be sent to the remote terminal via a response message that includes the proposed values in the fields supported and accepted by the base station, and counter-proposed values in the fields not supported or accepted by the base station. For example, if the remote terminal requests a particular number of circular buffer frames N that is not supported by the base station, the base station may response with a value indicating the maximum number of frames for the buffer supported by the base station.

Thus, via messaging and negotiation, the base station is able to accept the remote terminal's proposal, or reject the proposal and provide alternative values for test parameters.

Upon receiving the response message from the base station, the remote terminal may accept the counter-proposed values or select new values that conform to the counter-proposed values. The remote terminal may then send to the base station another message proposing these new values.

Table 6 lists the valid service configuration for TDSO for a specific implementation in the cdma2000 system.

TABLE 6

| Service Configuration Attribute | Valid Selection |
| --- | --- |
| Forward Multiplex Option | 0x01 or 0x02 |
| Reverse Multiplex Option | 0x01 or 0x02 |
| Forward Transmission Rates | For the FCH - Rates 1, 1/2, 1/4, and 1/8 enabled |
| | For the DCCH - Rate 1 enabled, Rates 1/2, 1/4, and 1/8 not enabled |
| Reverse Transmission Rates | For the FCH, Rates 1, 1/2, 1/4, and 1/8 enabled. |
| | For the DCCH, Rate 1 enabled, Rates 1/2, 1/4, and 1/8 not enabled. |
| Forward Traffic Type | Primary or Secondary |
| Reverse Traffic Type | Should be Identical to the Forward Traffic Type |
| Forward FCH Radio Configuration | RC 1, 2, 3, 4, 5, 6, 7, 8, or 9 |
| Reverse FCH Radio Configuration | RC 1, 2, 3, 4, 5, or 6 |
| Forward DCCH Radio Configuration | RC 3, 4, 5, 6, 7, 8, or 9 |
| Reverse DCCH Radio Configuration | RC 3, 4, 5, or 6 |
| Forward SCH Radio Configuration | RC 3, 4, 5, 6, 7, 8, or 9 |
| Reverse SCH Radio Configuration | RC 3, 4, 5, or 6 |
| Forward SCH Frame Size | 20 ms, 40 ms, or 80 ms |
| Reverse SCH Frame Size | 20 ms, 40 ms, or 80 ms |

TABLE 6-continued

| Service Configuration Attribute | Valid Selection |
| --- | --- |
| Forward Supplemental Channel Multiplex Option | 0x921, 0x911, 0x909, 0x905, 0x821, 0x811, 0x809, 0x03 0x922, 0x912, 0x90a, 0x906, 0x822, 0x812, 0x80a, 0x04, 0xf20 |
| Reverse Supplemental Channel Multiplex Option | 0x921, 0x911, 0x909, 0x905, 0x821, 0x811, 0x809, 0x03 0x922, 0x912, 0x90a, 0x906, 0x822, 0x812, 0x80a, 0x04, 0xf20 |

As noted above, a number of traffic channels may be concurrently tested on each of the forward and reverse links. For each traffic channel to be tested, the test parameters for the channel may be negotiated via the signaling and negotiation described above. Thus, traffic channels of various types on the forward and reverse links may be tested independently based on their respective sets of test parameter values.

In FIGS. 2A, 2B, and 4, the elements in the base station and remote terminal may be implemented by various means. For example, the pseudo-random number generators may be implemented with hardware, software, or a combination thereof. For a hardware implementation, pseudo-random number generators, controllers, and other processing units may be implemented within one or more application specific integrated circuits (ASICs), digital signal processors (DSPs), programmable logic devices (PLDs), controllers, micro-controllers, microprocessors, other electronic units designed to perform the functions described herein, or a combination thereof.

For a software implementation, these processing units may be implemented with modules (e.g., procedures, functions, and so on) that perform the functions described herein. For example, the pseudo-random number generators may be implemented with software code stored in a memory unit and executed by a processor (e.g., controller 220 or 270).

The circular buffers for the test data for the traffic channels may be implemented with one or more buffers, which may be implemented using RAM, DRAM, Flash memory, or some other memory technology. Also, the pseudo-random number generators may be operated to generate test data for the traffic channels as the data is needed, without having to store the test data in buffers. In that case, the states of the pseudorandom number generators are appropriately maintained and updated such that the generators are able to generate the proper sequence of test data for each active frame.

Although various aspects, embodiments, and features of the test data generation and traffic channel testing of the invention have been described for the cdma2000 system, these techniques may be advantageously applied for the other wireless communication systems and other CDMA systems (e.g., the W-CDMA system).

A specific implementation of various aspects of the invention for a cdma2000 system is described in the following Exhibit A.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

[PA000107]

EXHIBIT A

TR45

Test Data Service Option (TDSO) for cdma2000 Spread Spectrum Systems

*PN-4877*

*Ballot Version*
*November 13, 2000*

Contents

| | |
|---|---|
| FOREWORD | 38 |
| NOTES | 39 |
| REFERENCES | 41 |
| 1 General | 42 |
| 1.1 Terms | 42 |
| 1.2 Notation | 44 |
| 2 Test Data Service Option | 45 |
| 2.1 Overview | 45 |
| 2.2 General description | 46 |
| 2.3 Service option number | 47 |
| 2.4 Required multiplex option support | 47 |
| 2.4.1 Multiplex option support for FCH/DCCH (for 20 ms FCH/DCCH frames only) | 47 |
| 2.4.2 Multiplex option support for SCH | 48 |
| 2.5 Interface to multiplex options | 49 |
| 2.6 Primary traffic | 49 |
| 2.6.1 Secondary traffic | 51 |
| 2.7 TDSO frame transmission and reception | 53 |
| 2.7.1 Transmitted frames | 54 |
| 2.7.2 Received frames | 55 |

Copyright © 2000 TIA.

[PA000107]

2.8 Interface to Layer 3 Signaling when testing 5 ms FCH/DCCH frames ..................................................................................................... 55
3 TDSO Procedures and Description ........................................................ 56
   3.1 Negotiation and activation of service option .................................. 56
      3.1.1 Mobile station requirements ................................................ 56
         3.1.1.1 Supplemental channel allocation ............................... 58
         3.1.1.2 CDMA-CDMA hard handoff scenario ........................... 62
      3.1.2 Base station requirements .................................................... 63
   3.2 Synchronization frame .................................................................... 63
      3.2.1 Forward Traffic Channels ..................................................... 64
      3.2.2 Forward Supplemental Channels ......................................... 64
      3.2.3 Reverse Traffic Channels ...................................................... 64
      3.2.4 Reverse Supplemental Channels .......................................... 64
   3.3 Counters ........................................................................................... 65
   3.4 Mobile station initialization and control operation ...................... 68
      3.4.1 Service option initialization ................................................. 68
      3.4.2 Mobile station control operations ........................................ 70
         3.4.2.1 Control invocation ..................................................... 70
         3.4.2.2 Control directive ........................................................ 70
         3.4.2.3 Counter retrieval ........................................................ 72
   3.5 Base station initialization and control operations ........................ 73
         3.5.1.1 Control invocation ..................................................... 73
         3.5.1.2 Control directive ........................................................ 73
         3.5.1.3 Counter retrieval ........................................................ 74
   3.6 TDSO Frame processing ................................................................. 74
      3.6.1 Transmit frame processing ................................................... 75
      3.6.2 Receive frame processing ..................................................... 78
      3.6.3 Transmit frame processing for 5 ms FCH/DCCH frames ..... 82
         3.6.3.1 Mobile Station Requirement ...................................... 82
         3.6.3.2 Base Station Requirement ......................................... 83
   3.7 TDSO frame generation .................................................................. 84
      3.7.1 Selectable byte pattern ......................................................... 84
      3.7.2 Pseudo-random number generation .................................... 85
         3.7.2.1 Initialization ............................................................... 87
         3.7.2.2 Number production .................................................. 88
         3.7.2.3 24-bit random number .............................................. 89
      3.7.3 Circular buffer sizes ............................................................. 89

[PA000107]

3.7.4 Information bit generation................................................................91
        3.7.5 Frame activity.............................................................................93
            3.7.5.1 Deterministic frame activity.........................................93
            3.7.5.2 Random with a specified frame activity and burst length.................................................................................94
        3.7.6 Data block header and formats........................................................97
    3.8 Message formats .................................................................................98
        3.8.1 Service Option Control Message.......................................................98
            3.8.1.1 Control......................................................................99
            3.8.1.2 Counter retrieval........................................................104
            3.8.1.3 Counter responses on the fundicated channels...........................106
            3.8.1.4 Receive Expected Counters Response .........................................109
            3.8.1.5 Transmitted Counters Response.................................................112
            3.8.1.6 5 ms Frame Transmitted Counters Response..............................114
            3.8.1.7 5 ms Frame Received Counters Response ...................................115
        3.8.2 Counter responses on the Supplemental Channels ...........................117
            3.8.2.1 FER counters response .............................................117
            3.8.2.2 PER Counters Response............................................119
            3.8.2.3 Transmitted Counters response..................................123
ANNEX A TDSO Call Flow Examples (for a system operating in MC-41 mode) ........................................................................................................124
ANNEX B TDSO Operation Examples.............................................................128
ANNEX C Using the TDSO.............................................................................147
ANNEX D Calculating p and q Based on D and B..............................................153

Figures

Figure 1. Synchronized operation of pseudo-random number
    generated buffers ...................................................................86

Figure 2. Reshuffling of $y_n(k)$ to generate $y_n^{LE}(k)$ ............................................92

Figure 3. Two-state Markov chain representing ON/OFF
    transitions for TDSO ................................................................95

Figure 4. Flowchart illustrating TDSO state transitions for a D
    frame activity and B average "On" period in units of
    frames. ...................................................................................96

Figure 5. Mobile station origination example with transmission
    on DCCH/FCH/SCH (part 1 of 2)..........................................125

[PA000107]

Figure 6. Mobile station origination example with transmission
 on DCCH/FCH/SCH (part 2 of 2)..........................................................127

Figure 7. Base station commanded test parameters change............................128

Tables

Table 1. Summary of test data service option notation....................................44

Table 2  Multiplex option support for FCH or DCCH.........................................47

Table 3  Multiplex options applicable to an SCH..............................................48

Table 4  Primary traffic types supplied by the TDSO to the
 multiplex sublayer ................................................................................49

Table 5. Primary traffic frame types supplied by the multiplex
 layer to TDSO........................................................................................50

Table 6  Secondary traffic frames supplied by TDSO to the
 multiplex sublayer ................................................................................51

Table 7. Secondary traffic frames supplied by multiplex
 sublayer to the TDSO ...........................................................................52

Table 8  Valid service configuration attributes for test data
 service option........................................................................................56

Table 9 SCRM_REQ_BLOB format..................................................................60

Table 10 SCRMM_REQ_BLOB format..............................................................61

Table 11 Encoding of the PREFERRED_RATE field ..........................................62

Table 12 Encoding of the DURATION field ......................................................62

Table 13  Transmit frame counters on the fundicated channel.........................65

Table 14  Transmitted frame counters on the Supplemental
 Channel................................................................................................65

Table 15  Receive frame counters maintained for the
 FCH/DCCH............................................................................................66

Table 16  Receive frame counters on the Supplemental Channel......................66

Table 17  Receive PDU counters maintained for the
 Supplemental Channels .......................................................................67

Table 18  Frame counter-value storage............................................................67

Table 19  Frame counter-value storage for Supplemental
 Channels ..............................................................................................68

[PA000107]

| | |
|---|---|
| | Table 20 Counters for fundicated transmitted frames ...................................77 |
| | Table 21 Counters for supplemental transmitted frames................................78 |
| | Table 22 Counter updates for received fundicated frames when MuxPDU Type 1 is used ......................................................................79 |
| | Table 23 Counter updates for received fundicated frames when MuxPDU Type 2 is used ......................................................................80 |
| | Table 24 Counter updates for PDUs received on Supplemental Channels..............................................................................................81 |
| | Table 25 Counter updates for received frames on Supplemental Channels..............................................................................................82 |
| | Table 26 Circular buffer sizes needed to generate fundicated channel data frames............................................................................90 |
| | Table 27 Circular buffer sizes needed to generate reverse Supplemental Channel data frames ........................................................90 |
| | Table 28 Circular buffer sizes needed to generate forward Supplemental Channel data frames ........................................................91 |
| | Table 29 Procedure for generating the default circular buffers for RC>2 channels..................................................................................93 |
| | Table 30 Data block format..........................................................................97 |
| | Table 31 CHANNEL_ID type codes................................................................98 |
| | Table 32 CTL_REC_TYPE codes...................................................................98 |
| | Table 33 *Service Option Control Message* type-specific fields...........................99 |
| | Table 34 CONTROL_CODE codes................................................................102 |
| | Table 35 DATA_SOURCE codes...................................................................103 |
| | Table 36 FRAME_ACTIVITY codes ..............................................................103 |
| | Table 37 CHANNEL_DIRECTION codes.......................................................103 |
| | Table 38 FRAME_SOURCE codes................................................................103 |
| | Table 39 TEST_OPTIONS codes..................................................................104 |
| | Table 40 Type-specific fields in a *Service Option Control Message* used for counter retrieval on the FCH/DCCH..........................104 |
| | Table 41 VECT_COUNTER_ID codes for FCH/DCCH ....................................105 |
| | Table42 Type-specific fields in a *Service Option Control Message* used for counter retrieval from the mobile station for SCHs...................105 |

[PA000107]

38

| | |
|---|---:|
| Table 43 VECT_COUNTER_ID codes for SCHs | 105 |
| Table 44 Type-specific fields in a *Service Option Control Message* corresponding to FER Counters Response on FCH/DCCH | 107 |
| Table 45 Type-specific fields in a *Service Option Control Message* corresponding to Receive Expected Counters Response on FCH/DCCH | 109 |
| Table 46 Type-specific fields in a *Service Option Control Message* corresponding to Transmitted Counters Response on FCH/DCCH | 112 |
| Table 47 Type-specific fields in a *Service Option Control Message* corresponding to 5 ms Frame Transmitted Counters Response on FCH/DCCH | 115 |
| Table 48 Type-specific fields in a *Service Option Control Message* corresponding to 5 ms Frame Received Counters Response on FCH/DCCH | 116 |
| Table 49 Type-specific fields in a *Service Option Control Message* corresponding to FER Counters Response on SCH(s) | 117 |
| Table 50 Type-specific fields in a *Service Option Control Message* corresponding to PER Counters response on SCH(s) | 119 |
| Table 51 Type-specific fields in a *Service Option Control Message* corresponding to Transmitted Counters response on SCH(s) | 123 |

FOREWORD

This document specifies procedures for the Test Data Service Option (TDSO). The TDSO is used to allow verification of the physical layer performance frame error rate (FER) and PDU error rate (PER) of cdma2000 physical channels. The document is organized into the following sections:

- Chapter 1 defines the terms and notations used in this document.

- Chapter 2 outlines the requirements of the TDSO and provides a general description of the TDSO.

[PA000107]

39

- Chapter 3 describes the detailed procedures and operation of the mobile station and the base station for the TDSO.

- Annex A is an informative section that presents some TDSO call flow examples.

- Annex B is an informative section that presents some TDSO frame generation examples.

- Annex C is an informative section that presents some procedures for conducting a TDSO test. It also shows the use of the transmit counters and the receive counters for estimating the FER and PER for the Forward and Reverse Traffic Channels.

- Annex D is an informative section that presents the equations for calculating transition probabilities p and q based on average frame activity (D) and average burst length (B).

NOTES

- "Base station" refers to the functions performed on the landline side, which are typically distributed among a cell, a sector of a cell, and a mobile switching center.

- The following verbal forms: "Shall" and "shall not" identify requirements to be followed strictly to conform to the standard and from which no deviation is permitted. "Should" and "should not" indicate that one of several possibilities is recommended as particularly suitable, without mentioning or excluding others; that a certain course of action is preferred but not necessarily required; or that (in the negative form) a certain possibility or course of action is discouraged but not prohibited. "May" and "need not" indicate a course of action permissible within the limits of the standard. "Can" and "cannot" are used for statements of possibility and capability, whether material, physical, or causal.

- Footnotes appear at various points in this specification to elaborate and further clarify items discussed in the body of the specification.

- Unless indicated otherwise, this document presents numbers in decimal form.

- Binary numbers are distinguished in the text by the use of single quotation marks. In some tables, binary values may appear without single quotation marks if the table notation clearly specifies that values are binary. The character 'x' is used to represent a binary bit of unspecified value. For example 'xxx00010' represents any 8-bit binary value such that the least significant five bits equal '00010'.

[PA000107]

40

- Hexadecimal numbers (base 16) are distinguished in the text by use of the form 0xh...h where h...h represents a string of hexadecimal digits. For example, 0x2fa1 represents a number whose binary value is '10111110100001' and whose decimal value is 12193. Note that the exact number of bits in the binary representation of a hexadecimal number strictly depends on the implementation requirements for the variable being represented.

- The following conventions apply to mathematical expressions in this standard:

- $\lfloor x \rfloor$ indicates the largest integer less than or equal to x: $\lfloor 1.1 \rfloor = 1$, $\lfloor 1.0 \rfloor = 1$.

- $\lceil x \rceil$ indicates the smallest integer greater than or equal to x: $\lceil 1.1 \rceil = 2$, $\lceil 2.0 \rceil = 2$.

- ROUND(x) indicates the integer that is closest to x: ROUND(1.2) = 1, ROUND(1.9) = 2.

- $|x|$ indicates the absolute value of x: $|-17|=17$, $|17|=17$.

- min(x, y) indicates the minimum of x and y.

- max(x, y) indicates the maximum of x and y.

- In figures, × indicates multiplication. In formulas within the text, multiplication is implicit. For example, if h(n) and $p_L(n)$ are functions, then h(n) $p_L(n)$ = h(n) × $p_L(n)$.

- x mod y indicates the remainder after dividing x by y: x mod y = x - (y $\lfloor x/y \rfloor$).

- x ∈ { a, b, c } indicates x is a member of the set comprised of elements a, b, and c.

- The bracket operator, [ ], isolates individual bits of a binary value. VAR[n] refers to bit n of the binary representation of the value of the variable VAR, such that VAR[0] is the least significant bit of VAR. The value of VAR[n] is either 0 or 1.

- x ≈ y indicates that x is approximately equal to y.

- The following conventions apply to expressions in the pseudo code in this standard:

- x & y represents the bit-wise AND operation between the binary representation of x and y: 31 & 4 = 4 = '00100'.

[PA000107]

41

- x ^ y represents the bit-wise exclusive OR operation between the binary representation of x and y: 31 ^ 4 = 27 = '11011'.

- x >> k represents the bit-wise right shift of x by k bits with the vacated positions at the left filled with '0' bits: 61 >> 3 = 7 = '000111'.

- x << k represents the bit-wise left shift of x by k bits with the vacated positions at the right filled with '0' bits: 4 << 3 = 32 = '100000'.

- ++ represents an increment operator: x++ increments the value of x by 1.

- The symbols (* and *) are used to enclose comments.

- This document applies only to base stations with P_REV equal to or greater than 6, and to mobile stations with MOB_P_REV equal to or greater than 6 and.

- This document supports systems operating in MC-MAP mode.

REFERENCES

The following standards contain provisions which, through reference in this text, constitute provisions of this Standard. At the time of publication, the editions indicated were valid. All standards are subject to revision, and parties to agreements based on this Standard are encouraged to investigate the possibility of applying the most recent editions of the standards indicated below.

—Standards:

1. Reserved.[1]
2. *TIA/EIA/IS-2000.2-A, Physical Layer Standard for cdma2000 Spread Spectrum Systems.*
3. *TIA/EIA/IS-2000.3-A, Medium Access Control Standard for cdma2000 Spread Spectrum Systems.*
4. Reserved.[2]
5. *TIA/EIA/IS-2000.5-A, Upper Layer (Layer 3) Signaling Standard for cdma2000 Spread Spectrum Systems.*

---

[1] Reserved for future use.

[PA000107]

6. *TIA/EIA/IS-833, Multi-Carrier Specification for Spread Spectrum on GSM MAP (MC-MAP).*

General

Terms

Base Station (BS). A fixed station used for communicating with mobile stations. Depending on the context, the term base station may refer to a cell, a sector within a cell, or another part of the wireless system.

Blank-and-burst. The preemption of the traffic in an entire traffic channel frame by another form of traffic, typically signaling.

Data Block. The unit of data exchanged between the multiplex sublayer and the TDSO.

Dim-and-burst. A frame in which primary traffic is multiplexed with secondary, signaling, or secondary and signaling traffic.

ESCAM. *Extended Supplemental Channel Assignment Message* (see [5]).

FER. Frame Error Rate.

Forward Dedicated Control Channel. A portion of a Radio Configuration 3 through 9 Forward Traffic Channel.

Forward Fundamental Channel. A portion of a Forward Traffic Channel.

Forward Supplemental Channel. A portion of a Radio Configuration 3 through 9 Forward Traffic Channel, which operates in conjunction with a Forward Fundamental Channel or Forward Dedicated Control Channel in that Forward Traffic Channel to provide higher data rate services.

Forward Traffic channel. One or more forward CDMA channels used to transport user and signaling traffic from the base station to the mobile station (see Forward Fundamental Channel, Forward Dedicated Control Channel, and Forward Supplemental Channel).

Frame. A basic timing interval in the system. For the traffic channel, a frame is 5 ms, 20 ms, 40 ms, or 80 ms long.

FSCAMM. *Forward Supplemental Channel Assignment Mini Message* (see [5]).

Fundamental Channel. A portion of a traffic channel, which includes a Forward Fundamental Channel and a Reverse Fundamental Channel.

---

[2] Reserved for future use.

[PA000107]

43

Fundicated Frame. A TDSO frame carried in a fundicated data block.

Fundicated Channel. Fundamental Channel or a Dedicated Control Channel.

Fundicated Data Block. A data block carried on a Fundamental Channel or a Dedicated Control Channel.

Mobile Station (MS). A station that communicates with the base station.

Multiplex Format Indicator. A number that specifies the format of a MuxPDU [see 3].

Multiplex Option. The ability of the multiplex sublayer and lower layers to be tailored to provide special capabilities. A multiplex option defines such characteristics as the frame format and rate decision rules (see also Multiplex Sublayer).

Multiplex Sublayer. One of the conceptual layers of the system that multiplexes and demultiplexes primary traffic, secondary traffic, and signaling traffic (see [3].

MuxPDU Type 1 Category. The category of the received MuxPDU type 1 as defined in [3].

MuxPDU Type 2 Category. The category of the received MuxPDU type 2 as defined in [3].

MuxPDU Type 3 Category. The category of the received MuxPDU type 3 as defined in [3].

MuxPDU Type 5 Category. The category of the received MuxPDU type 5 as defined in [3].

PER. PDU Error Rate.

Primary Traffic. Data bits from a service that has the traffic type in the Service Configuration Record set to Primary.

Radio Configuration (RC). A set of Forward Traffic Channel and Reverse Traffic Channel transmission formats that are characterized by physical layer parameters such as transmission rates, modulation characteristics, and spreading rate.

Reverse Dedicated Control Channel. A portion of a Radio Configuration 3 through 6 Reverse Traffic Channel.

Reverse Fundamental Channel. A portion of a Reverse Traffic Channel.

Reverse Supplemental Channel. A portion of a Radio Configuration 3 through 6 Reverse Traffic Channel, which operates in conjunction with a Reverse Fundamental Channel or Reverse Dedicated Control Channel in that Reverse Traffic Channel to provide higher data rate services.

[PA000107]

44

Reverse Traffic channel. One or more reverse CDMA channels on which data and signaling are transmitted from a mobile station to a base station (see Reverse Dedicated Control Channel, Reverse Fundamental Channel, and Reverse Supplemental Channel).

RSCAMM. *Reverse Supplemental Channel Assignment Mini Message* (see [5]).

SCRM. *Supplemental Channel Request Message* (see [5]).

SCRMM. *Supplemental Channel Request Mini Message* (see [5]).

Secondary Traffic. Data bits from a service that has the traffic type in the Service Configuration Record set to Secondary.

Service Option. A service capability of the system. Service options may be applications such as voice, data, or facsimile etc.

Service Option Connection. A particular instance or session in which the service defined by a service option is used.

Signaling Traffic. Control messages that are carried between mobile station and the
base station on the Traffic Channel.

System Time. The time reference used by the system. System Time is synchronous to Universal Coordinate Time (except for leap seconds) and uses the same time origin as GPS time. All base stations use the same System Time (within a small margin of error). Mobile stations use the same System Time, offset by the propagation delay from
the base station to the mobile station.

TDSO. Test Data Service Option.

Traffic Channel. One or more CDMA channels on which data and signaling are transmitted between a mobile station and base station (see Forward Traffic Channel and Reverse Traffic Channel).

UHDM. *Universal Handoff Direction Message* (see [5]).

Notation

The TDSO uses the notation as listed in Table 1.

Table 1. Summary of test data service option notation

| Parameter | Section | Name/Description |
|---|---|---|
| B(n) | 0 | Actual circular buffer size |
| FRNG | 0 | State of the Forward Traffic Channel pseudo-random number generator |

[PA000107]

| Parameter | Section | Name/Description |
|---|---|---|
| NUM_RAND | 0 | Number of pseudo-random number generations per frame to generate information bits in a data block or data blocks |
| R(n) | 0 | Needed circular buffer size |
| RRNG | 0 | State of the Reverse Traffic Channel pseudo-random number generator |
| $x_n$ | 0 | Pseudo-random number generated by the linear congruential generator |
| $y_n(k)$ | 0 | A 24-bit pseudo-random number used for the generation of circular buffer information bits |
| $y_n^{LE}(k)$ | 0 | A number derived from $y_n(k)$ after storing it in little endian order |
| $O_n$ | 0 | A 6-bit pseudo-random number used for determining the next byte offset in the circular buffer |

No text.

Test Data Service Option

Overview

The following are the requirements of the cdma2000 Test Data Service Option:

- Connects the Service Option at the Multiplex Sublayer.

- Supports both forward and reverse links (asymmetric and symmetric).

- Does bit-wise comparison of the received frame with the locally generated/expected frame to detect the undetected bit errors that are not detected by frame quality bits.

- Maintains separate sets of error statistics for the FCH/DCCH and SCH(s) and responds with this information when queried by the base station.

- Defines a single service option, and sets up different RCs and service configurations on the two links through service negotiation.

- May include simultaneous primary and secondary traffic (for example, can run Markov service [SO 54] on the Fundamental Channel and TDSO on the Supplemental Channel).

[PA000107]

- Can be carried by all RC combinations on the reverse/forward links as defined under cdma2000.
- Requires separate channel IDs to differentiate between the FCH, DCCH, and Supplemental Channel(s).
- Is able to handle multiframe interleaving over 40 ms and 80 ms intervals in the physical layer.
- Does not preclude a future extension to support flexible/variable rate.
- Allows two types of ON/OFF traffic models to be selectable:
  - Deterministic frame activity given by TX_ON and TX_OFF
  - Random frame activity with average frame activity D and average burst length B, in units of Physical Layer frames
- Supports two source types of bits for frame generation:
  - Selectable byte pattern
  - Pseudo-random bits
- Supports 5 ms FCH/DCCH frames testing using Layer 3 Signaling mini messages General description TDSO provides for the generation of an arbitrary (preselected or random) data source for transport over forward and reverse traffic channels while following an arbitrary (preselected or random) transmission frame activity. The test is performed at a fixed data rate.

The mobile station and the base station generate TDSO data frames for the configured and allocated traffic channels. The content of each frame is generated per a selectable byte pattern or by employing a hybrid approach consisting of pseudo-randomly generated data together with a circular buffer. The frame generation processes are synchronized between the mobile station and the base station. This permits the receiving station to reproduce the transmitted frames and compare them to the received frames. The TDSO counts the number of various frame types that were transmitted on a particular traffic channel. The TDSO also counts the number of various frame types received on the traffic channel according to the information provided by the multiplex sublayer and the result of the comparison between the frame received and the locally generated replica. Frame error and bit error statistics can be calculated from these counts.

The TDSO allows system signaling to take precedence. Dim-and-burst frames and blank-and-burst frames are excluded from FER or bit error rate calculations. Because the receiver cannot predict when the transmitter transmits a dim-and-burst or blank-and-burst frame, the receiver may categorize a frame as dim-and-burst or blank-and-burst when it is not (false alarm), or categorize a frame as not dim-and-burst or blank-and-burst when it is (miss). Therefore, the frame error statistics calculated by using only frame counts recorded in the receiver may not be exact. However, the error is very small and can usually be ignored.

Service option number

The TDSO described by this standard shall use service option number 32.

Required multiplex option support

The TDSO shall transmit and receive traffic channel frames in accordance with the requirements of the multiplex option or multiplex options configured for the service option.

Multiplex option support for FCH/DCCH (for 20 ms FCH/DCCH frames only)

On the FCH/DCCH physical channels, the TDSO shall support an interface with the multiplex options indicated in Table 2.

Table 2 Multiplex option support for FCH or DCCH

|  | Multiplex Option ||
| --- | --- | --- |
|  | Forward RC = 1, 3, 4, 6, or 7<br>Reverse RC = 1, 3, or 5 | Forward RC = 2, 5, 8, or 9<br>Reverse RC = 2, 4, or 6 |
| FCH/DCCH | 0x1 | 0x2 |

[PA000107]

When Multiplex Option 0x01 is used, MuxPDU Type 1 is used (see 0for interface to multiplex option).

When Multiplex Option 0x02 is used, MuxPDU Type 2 is used (see 0for interface to multiplex option)

Multiplex option support for SCH

On the SCH(s) physical channel(s), the TDSO shall support an interface with the multiplex options as indicated in Table 3.

Table 3 Multiplex options applicable to an SCH

| SCH Rate | Maximum number of MuxPDUs in the physical layer SDU | | | Multiplex option | | | | | |
|---|---|---|---|---|---|---|---|---|---|
| | | | | Forward RC = 3, 4, 6, or 7<br><br>Reverse RC = 3 or 5 | | | Forward RC = 5, 8, or 9<br><br>Reverse RC = 4 or 6 | | |
| | MuxPDU Type 1 or 2 | MuxPDU Type 3 | | MuxPDU Type 1 | MuxPDU Type 3 | | MuxPDU Type 2 | MuxPDU Type 3 | |
| | | Single | Double | | Single | Double | | Single | Double |
| 1x | 1 | | | 0x03 | | | 0x04 | | |
| 2x | | 2 | 1 | | 0x809 | 0x905 | | 0x80a | 0x906 |
| 4x | | 4 | 2 | | 0x811 | 0x909 | | 0x812 | 0x90a |
| 8x | | 8 | 4 | | 0x821 | 0x911 | | 0x822 | 0x912 |
| 16x | | | 8 | | | 0x921 | | | 0x922 |

The SCH rate is expressed in multiples of a base rate. For example, odd multiplex options have the base rate 9600 bps, a 2x SCH rate means twice of 9600 bps or 19200 bps. For Supplemental Channel rates lower than or equal to 16x, MuxPDU Type 1, 2 or 3 that is associated with the multiplex option as shown in Table 9 will be used. For Supplemental Channel rates higher than 16x, the TDSO shall use MuxPDU Type 5, which is associated with the Multiplex Option 0xf20.

[PA000107]

49

The number of data blocks (either carried by MuxPDU Type 1, 2, or 3) in every SCH frame is shown in Table 9 for different multiplex options. For SCH rates higher than 16x, there is exactly one data block (carried by MuxPDU Type 5) in every SCH frame (see [3]). (see 0for interface to multiplex options)

Interface to multiplex options

TDSO frames can be carried as primary or secondary traffic.

A TDSO frame supplied to the multiplex sublayer as a fundicated data block (a data block carried on an FCH or DCCH) is called a Fundicated TDSO frame. Similarly, a TDSO frame supplied to the multiplex sublayer to be carried as a supplemental data block or data blocks (data block(s) carried on an SCH0 or SCH1) is referred to as a Supplemental TDSO frame.

Primary traffic

Normally, each TDSO frame supplied to the multiplex sublayer shall be one of the Rate 1, Rate 2, or Blank (zero bits) frame types shown in Table 10.Table 10.
The number of bits per data block supplied to the multiplex sublayer for each type of TDSO frame is shown in Table 10. The maximum number of MuxPDUs (or data blocks) that can be carried in an SCH TDSO frame is also shown in Table 9.

On command, the TDSO shall supply a Blank frame. A Blank frame contains no bits. Also on command, the TDSO shall supply a non-blank Fundicated TDSO frame of x bits when the multiplex sublayer requests for an x-bit data block. The first x bits of the generated Fundicated TDSO frame shall be supplied to the multiplex sublayer.

Table 4  Primary traffic types supplied by the TDSO to the multiplex sublayer

| TDSO frame type | Odd-numbered multiplex option (bits per data block) | Even-numbered multiplex option (bits per data block) | Can be supplied as a Fundicated TDSO frame | Can be supplied as a Supplemental TDSO frame |
|---|---|---|---|---|
| Rate 3[1] | N/A | Variable | No | Yes |

[PA000107]

50

| TDSO frame type | Odd-numbered multiplex option (bits per data block) | Even-numbered multiplex option (bits per data block) | Can be supplied as a Fundicated TDSO frame | Can be supplied as a Supplemental TDSO frame |
|---|---|---|---|---|
| Rate 2 | 346 | 538 | No | Yes[2] |
| Rate 1 | 171 | 266 | Yes | Yes[3] |
|  | 170 | 266 | No | Yes[4] |
| Blank | 0 | 0 | Yes | Yes |

[1] Applicable only to multiplex option 0xf20. Used when the TDSO supplies more than 4584 bits to the multiplex sublayer during a frame interval (20, 40, or 80 ms).

[2] Applicable only to multiplex options 0x905, 0x906, 0x909, 0x90a, 0x911, 0x912, 0x921, and 0x922.

[3] Applicable only to multiplex options 0x3 and 0x4.

[4] Applicable only to multiplex options 0x0809, 0x80a, 0x811, 0x812, 0x821, and 0x822.

The multiplex sublayer in the mobile station categorizes every received MuxPDU(s) in the Traffic Channel frame and supplies the MuxPDU category and accompanying bits, if any, to TDSO. When the multiplex format indicator is supplied by the mux sublayer, the value of the multiplex format indicator shall be used as the MuxPDU category.
TableTable 11 lists the categories (and corresponding TDSO frame types) supplied by the multiplex sublayer when TDSO is carried as primary traffic.

Table 5. Primary traffic frame types supplied by the multiplex layer to TDSO

| TDSO frame type | Odd-numbered multiplex options | | | Even-numbered multiplex options | | |
|---|---|---|---|---|---|---|
|  | Bits per data block | Categories for fundicated MuxPDU | Categories for supplemental MuxPDU | Bits per data block | Categories for fundicated MuxPDU | Categories for supplemental MuxPDU |
| Rate 3 | N/A | N/A | N/A | Variable | N/A | 2 |
| Rate 2 | 346 | N/A | 5 | 538 | N/A | 5 |
| Rate 1 | 171 | 1 | 1 | 266 | 1 | 1 |

[PA000107]

51

| TDSO frame type | Odd-numbered multiplex options ||| Even-numbered multiplex options |||
|---|---|---|---|---|---|---|
| | Bits per data block | Categories for fundicated MuxPDU | Categories for supplemental MuxPDU | Bits per data block | Categories for fundicated MuxPDU | Categories for supplemental MuxPDU |
| | 170 | N/A | 4 | 266 | N/A | 4 |
| Blank | 0 | 5, 14 | 2 | 0 | 5, 9, 14, 17, 21, 23, 25 | 2 |
| Null | 0 | 15 | N/A | 0 | 27 | N/A |

Secondary traffic

Normally, each TDSO frame supplied to the multiplex sublayer shall be one of the Rate 1, Rate 2, Rate 3, or Blank frame types shown in. The number of bits
    per data block supplied to the multiplex sublayer for each type of TDSO frame shall also be as shown in Table 12. The maximum number of MuxPDUs that can be carried in a SCH TDSO frame is also shown in Table 3.
On command, TDSO shall generate a Blank TDSO frame. A Blank TDSO frame contains no bits. Also on command, TDSO shall supply a non-blank Fundicated
    TDSO frame of x bits when the multiplex sublayer requests for an x-bit data block. The first x bits of the generated Fundicated TDSO frame shall be supplied as a data block to the multiplex sublayer.

Table 6 Secondary traffic frames supplied by TDSO to the multiplex sublayer

| TDSO frame type | Odd-numbered multiplex option (bits per data block) | Even-numbered multiplex option (bits per data block) | Can be supplied as a Fundicated TDSO frame | Can be supplied as a Supplemental TDSO frame |
|---|---|---|---|---|
| Rate 3[1] | N/A | Variable | No | Yes |

[PA000107]

52

| TDSO frame type | Odd-numbered multiplex option (bits per data block) | Even-numbered multiplex option (bits per data block) | Can be supplied as a Fundicated TDSO frame | Can be supplied as a Supplemental TDSO frame |
|---|---|---|---|---|
| Rate 2 | 346 | 538 | No | Yes[2] |
| Rate 1 | 168 | 262 | Yes | Yes[3] |
|  | 170 | 266 | No | Yes[4] |
| Blank | 0 | 0 | Yes | Yes |

[1] Applicable only to Multiplex Option 0xf20. Used when TDSO supplies more than 4584 bits to the multiplex sublayer during a frame interface (20, 40, or 80 ms).

[2] Applicable only to Multiplex Options 0x905, 0x906, 0x909, 0x90a, 0x911, 0x912, 0x921, and 0x922.

[3] Applicable only to Multiplex Options 0x3 and 0x4.

[4] Applicable only to Multiplex Options 0x809, 0x80a, 0x811, 0x812, 0x821, and 0x822.

The multiplex sublayer in the mobile station categorizes every MuxPDU in the received Traffic Channel frame and supplies the MuxPDU category and accompanying bits, if any, to TDSO. When the multiplex format indicator is supplied by the mux sublayer, the value of the multiplex format indicator shall be used as the MuxPDU category. Table 13 lists the categories (and corresponding TDSO frame types) supplied by the multiplex sublayer when the TDSO is carried as secondary traffic.

Table 7. Secondary traffic frames supplied by multiplex sublayer to the TDSO

| TDSO frame type | Odd-numbered multiplex options | | | Even-numbered multiplex options | | |
|---|---|---|---|---|---|---|
|  | Bits per data block | Categories for fundicated MuxPDU | Categories for supplemental frames | Bits per data block | Categories for fundicated MuxPDU | Categories for supplemental MuxPDU |
| Rate 3 | N/A | N/A | N/A | Variable | N/A | 2 |

[PA000107]

53

| TDSO frame type | Odd-numbered multiplex options | | | Even-numbered multiplex options | | |
|---|---|---|---|---|---|---|
| | Bits per data block | Categories for fundicated MuxPDU | Categories for supplemental frames | Bits per data block | Categories for fundicated MuxPDU | Categories for supplemental MuxPDU |
| Rate 2 | 346 | N/A | 5 | 538 | N/A | 5 |
| Rate 1 | 168 | 14 | 2 | 262 | 9 | 2 |
| | 170 | N/A | 4 | 266 | N/A | 4 |
| Blank | 0 | 1-8 | 1 | 0 | 1-5, 11-14, 19-21, 24 | 1 |
| Null | 0 | 15 | N/A | 0 | 27 | N/A |

TDSO frame transmission and reception

When primary or secondary traffic is carried on SCH(s) and/or FCH/DCCH, the content of each frame is generated in one of two ways, as negotiated between the two ends. The test stream can consist of a selectable repeated byte pattern (by default set to all '1's) or a pseudo-randomly generated data stream from a circular buffer. The two ends are synchronized to the content of test data transmitted (expected) in a particular frame. This permits the receiving station to reproduce the transmitted frames and compare them to the received frames. When a pseudo-random data stream is used, data blocks for all frames are generated by copying the bits from the circular buffer to the data blocks, starting at a random offset for each TDSO frame. The random offset is synchronized between the mobile station and the base station.
The TDSO counts the number of various frame types received on the FCH/DCCH and/or SCH separately according to the MuxPDU category information provided by the multiplex sublayer and the result of the comparison between the frames received and the locally generated replica. FER and PER characteristics can be calculated from these counts for each physical channel.
There can be instances of transmission power headroom running out in either the base station or mobile station (causing the transmitter to not transmit on a

[PA000107]

given traffic channel for a particular frame), which leads to the physical layer reporting an erasure at the receiver. For the TDSO, no special mechanism is used to account for the inaccuracies that can occur in the FER (PER) calculation due to this. No transmission by the physical channel is considered to be a channel and/or implementation limitation.

Transmitted frames

If configured to operate over Fundicated Channels (FCH or DCCH) that use 20 ms frames, if the frame activity is "ON", the service option shall supply exactly one Fundicated data block to the multiplex sublayer every 20 ms. The data block contains a header (channel ID and PDU sequence number) followed by the service option information bits.

Unless otherwise commanded, the service option shall supply a Rate 1 or blank data block as listed in Table 4 and Table 6 when carrying primary or secondary traffic, respectively. On command, the service option shall supply a blank data block. Also on command, the service option shall supply a data block with the number of bits that the multiplex sublayer requests, by truncating the generated data block if necessary.

If configured to operate over Supplemental Channels (SCH0 and/or SCH1), if the frame activity is "ON", the service option shall supply one or N data blocks to the multiplex sublayer for each Supplemental Channel every frame interval (20 ms, 40 ms, or 80 ms), where N is the maximum number of data blocks (or MuxPDUs) in a physical layer SDU for a connected multiplex option, as shown in Table 3. The data blocks contain a header (channel ID and PDU sequence number) followed by the service option information bits.

Unless otherwise commanded, the service option shall supply Rate 1, Rate 2, Rate 3, or Blank Supplemental frames, as listed in Table 4 and Table 6, when carrying primary or secondary traffic, respectively. A single data block is passed to the multiplex sublayer for the SCH when the connected multiplex option is 0xf20.

[PA000107]

Received frames

The multiplex sublayer in the receiving station categorizes every received MuxPDU(s) in the fundicated and supplemental frame (see [3]), and supplies the MuxPDU type and accompanying bits, if any, to the TDSO. The MuxPDU types that are supplied are indicated in Table 4 and Table 6 for primary and secondary traffic operations, respectively.

Interface to Layer 3 Signaling when testing 5 ms FCH/DCCH frames

When testing 5 ms FCH/DCCH frames, TDSO generates requests to Layer 3 Signaling to send mini messages as opposed to sending TDSO frames as described in the 20 ms frame length case. The same frame activity model will be used for each 5 ms frame to determine whether to request Layer 3 Signaling to send a mini message or not during that frame. Since TDSO has no control of timing in Layer 3 Signaling, the mini message may actually be transmitted at a later 5 ms frame.

To test the Forward 5 ms FCH/DCCH frames, the TDSO in the base station shall request Layer 3 Signaling to transmit *Forward Supplemental Channel Assignment Mini Message* (FSCAMM), according to the frame activity. The base station shall fill the FSCAMM in accordance with 0. The base station should count the number of 5 ms frames transmitted, which includes all the transmitted and retransmitted 5 ms Layer 3 Signaling messages. The mobile station keeps a reception counter (see [3]) of the number of good 5 ms frames received (e.g., MUX1_FOR_FCH_5_ms when Multiplex Option 0x01 is used on a Forward Fundamental Channel).

To test the Reverse 5 ms FCH/DCCH frames, the TDSO in the mobile station shall request Layer 3 Signaling to transmit *Supplemental Channel Request Mini Messages* (SCRMM), according to the frame activity. The mobile station shall fill the SCRMM_REQ_BLOB in the SCRMM in accordance with 0. The base station should count the number of good 5 ms frames received, which includes all the good transmitted and retransmitted 5 ms Layer 3 Signaling messages. The mobile station keeps a transmission counter (see [3]) of the number of 5 ms

[PA000107]

56 frames transmitted (e.g., MUX1_REV_FCH_5_ms when Multiplex Option 0x01 is used on a Reverse Fundamental Channel).

No text.

TDSO Procedures and Description

Negotiation and activation of service option

The mobile stations and base stations that conform to cdma2000 are required to support service configuration and negotiation as described in [5].

Mobile station requirements

The TDSO shall be negotiated and connected using the service configuration
and negotiation procedures defined in [5]. For the TDSO, the mobile station shall not propose a service configuration whose attributes are inconsistent with the valid service configuration attribute for the service option. For a mobile station operating in MC-41 mode, the mobile station shall indicate the preferred Forward RC and Reverse RC in the FOR_RC_PREF field and the
REV_RC_PREF field, respectively, in the *Page Response Message* and *Origination Message*. For a mobile station operating in MC-MAP mode (see [6]), the mobile station shall indicate the preferred Forward RC and Reverse RC in the FOR_RC_PREF field and the REV_RC_PREF field, respectively, in the *MC-MAP RRC Connection Request Message*. When proposing the TDSO, the mobile station
shall not accept a service configuration whose attributes are inconsistent with the valid service configuration attributes for the service option as listed in Table 14. The default service configuration for the TDSO shall be as shown in the valid service configuration detailed in Table 8.

Table 8 Valid service configuration attributes for test data service option

[PA000107]

57

| Service configuration attribute | Valid selections[1] |
|---|---|
| Forward Multiplex Option | 0x01[2] or 0x02[3] |
| Reverse Multiplex Option | 0x01[4] or 0x02[5] |
| Forward Transmission Rates | For the FCH, Rates 1, 1/2, 1/4, and 1/8 enabled. For the DCCH, Rate 1 enabled, Rates 1/2, 1/4, and 1/8 not enabled. |
| Reverse Transmission Rates | For the FCH, Rates 1, 1/2, 1/4, and 1/8 enabled. For the DCCH, Rate 1 enabled, Rates 1/2, 1/4, and 1/8 not enabled. |
| Forward Traffic Type | Primary[6] or Secondary Traffic |
| Reverse Traffic Type | Should be identical to the Forward Traffic Type |
| Forward FCH Radio Configuration | RC 1, 2, 3, 4, 5, 6, 7, 8, or 9 |
| Reverse FCH Radio Configuration | RC 1, 2, 3, 4, 5, or 6 |
| Forward DCCH Radio Configuration | RC 3, 4, 5, 6, 7, 8, or 9 |
| Reverse DCCH Radio Configuration | RC 3, 4, 5, or 6 |
| Forward SCH Radio Configuration | RC 3, 4, 5, 6, 7, 8, or 9 |
| Reverse SCH Radio Configuration | RC 3, 4, 5 or 6 |
| Forward SCH Frame Size | 20 ms, 40 ms, or 80 ms |
| Reverse SCH Frame Size | 20 ms, 40 ms, or 80 ms |
| Forward Supplemental Channel Multiplex Option | 0x921, 0x911, 0x909, 0x905, 0x821, 0x811, 0x809, 0x03<br><br>0x922, 0x912, 0x90a, 0x906, 0x822, 0x812, 0x80a, 0x04<br><br>0xf20 |
| Reverse Supplemental Channel Multiplex Option | 0x921, 0x911, 0x909, 0x905, 0x821, 0x811, 0x809, 0x03<br><br>0x922, 0x912, 0x90a, 0x906, 0x822, 0x812, 0x80a, 0x04<br><br>0xf20 |

[PA000107]

58

| Service configuration attribute | Valid selections[1] |
|---|---|

[1] See [5] for a description of the selections.

[2] Applies when Forward RC is 1, 3, 4, 6 or 7.

[3] Applies when Forward RC is 2, 5, 8 or 9.

[4] Applies when Reverse RC is 1, 3 or 5.

[5] Applies when Reverse RC is 2, 4 or 6.

[6] Selections in bold represent the default configurations for the TDSO.

If the mobile station originates or accepts a TDSO call, then the mobile station shall perform the following:

- If the TDSO call is mobile station terminated, then the mobile station shall initiate an auto-answer before entering the *Waiting for Mobile Station Answer subsate*.[3]

- The mobile station shall connect the TDSO at the action time specified in the *Service Connect Message*, the *General Handoff Direction Message*, or the *Universal Handoff Direction Message* containing the TDSO service option connection, and shall initialize the service option as specified in Section 0in this document. While the service option is connected, the TDSO shall process the received frames as specified in 0and generate and supply frames for transmission as specified in 0.

Supplemental channel allocation

The mobile station may request high-speed operation on the Supplemental Channel(s) by sending one of the following messages to the BSC/MSC at an implementation-defined time:

- *Supplemental Channel Request Message* (SCRM)

- *Supplemental Channel Request Mini Message* (SCRMM)

---

[3] For the purposes of this standard, the term "auto-answer" shall have the following meaning: While in the *Waiting for Mobile Station Answer Substate* of the *Mobile Station Control on the Traffic Channel State*, the mobile station shall automatically send a *Connect Order* to the base station as a message requiring acknowledgment without waiting for the user to explicitly command the call to be answered. The mobile station shall enter the *Conversation Substate*.

[PA000107]

59

If a *Supplemental Channel Request Message* is used, the mobile station shall:

- Assemble the SCRM_REQ_BLOB (see Table 9)
- Set the DURATION field in the SCRM_REQ_BLOB to '1111'
- Include the SCRM_REQ_BLOB in the REQ_BLOB field in the *Supplemental Channel Request Message*
- Set the SIZE_OF_REQ_BLOB field in the *Supplemental Channel Request Message* to the number of octets in the SCRM_REQ_BLOB If a *Supplemental Channel Request Mini Message* is used, the mobile station shall:

- Assemble the SCRMM_REQ_BLOB (see Table 10) and include it in the REQ_BLOB field in the *Supplemental Channel Request Mini Message*
- Set the DURATION field in the SCRMM_REQ_BLOB to '1111'
- Include the SCRMM_REQ_BLOB in the REQ_BLOB field in the *Supplemental Channel Request Mini Message*

After the mobile station sends the *Supplemental Channel Request Message* or *Supplemental Channel Request Mini Message*, the BS may respond with an allocation message (ESCAM, RSCAMM, or UHDM). The mobile station shall not repeat the request sooner than one second after the request was sent. If the mobile station receives an UHDM, ESCAM, FSCAMM, or RSCAMM that changes the transmission rates available to the mobile station on the Supplemental Channel, the mobile station shall:

- At the start time indicated by the FOR_SCH_START_TIME or REV_SCH_START_TIME fields, reinitialize the TDSO to supply one or more data blocks at the new rate, filled with all 1 bits with a 100% frame activity (that is, continuously) to the multiplex sublayer for the SCH(s) until the next synchronization frame (see 0for description of synchronization frame).
- At the synchronization frame time, the TDSO shall:
  - Reset all counters associated with the involved Supplemental Channels.
  - Commence using the same test parameters for the channel that was used before the rate change took effect.

If the mobile station receives an UHDM, ESCAM, RSCAMM, or FSCAMM that deallocates the current Supplemental Channel(s):

[PA000107]

- The mobile station shall continue transmitting the TDSO traffic over the Fundicated Channels without any reinitialization.

- The mobile station may request high-speed operation on the Supplemental Channel(s) by sending a *Supplemental Channel Request Message* or, if permitted by the base station, a *Supplemental Channel Request Mini Message* to the BSC/MSC at an implementation-defined time.

SCRM_REQ_BLOB format

Table 9 SCRM_REQ_BLOB format

| Field | Length (bits) | Definition |
|---|---|---|
| DURATION_UNIT | 3 | The mobile station shall set this field to one less than the number of 20 ms intervals in a single duration period. |
| NUM_REQ | 3 | The mobile station shall set this field to the number of service request records in the SCRM_REQ_BLOB. |
| RESERVED | 2 | The mobile station shall set this field to '00'. |
| Followed by NUM_REQ occurrences of the following service request record: | | |
| SR_ID | 3 | The mobile station shall set this field to the service reference identifier associated with the service option. |
| PREFERRED_RATE | 4 | The mobile station shall set this field to the Reverse Supplemental Channel Rate (according to Table 11 Table ) that it prefers to use for this reverse high-speed operation for this service option. |
| DURATION | 9 | The mobile station shall set this field to the number of duration periods that the mobile station requires reverse high-speed operation for this service option. A value of '111111111' indicates a request for an infinite duration. |

SCRMM_REQ_BLOB format

Table 10 SCRMM_REQ_BLOB format

| Field | Length (bits) | Definition |
|---|---|---|
| SR_ID | 3 | The mobile station shall set this field to the service reference identifier associated with this service option. |
| PREFERRED_RATE | 4 | The mobile station shall set this field to the Reverse Supplemental Channel Rate (according Table 11) that it prefers to use for this reverse high-speed operation for this service option. |
| DURATION | 4 | The mobile station shall set this field to the number of 20 ms intervals (according Table 12) that the mobile station requires reverse high-speed operation at the PREFERRED_RATE for this service option. |
| RESERVED | 5 | The mobile station shall set this field to '00000'. |

Table 11 Encoding of the PREFERRED_RATE field

| PREFERRED_RATE field value (binary) | Requested reverse supplemental channel rate (kbps) for RC using Nx9.6 | Requested reverse supplemental channel rate (kbps) for RC using Nx14.4 |
|---|---|---|
| '0000' | 9.6 | 14.4 |
| '0001' | 19.2 | 28.8 |
| '0010' | 38.4 | 57.6 |
| '0011' | 76.8 | 115.2 |
| '0100' | 153.6 | 230.4 |
| '0101' | 307.2 | 460.8 |
| '0110' | Reserved | 518.4 |
| '0111' | 614.4 | 1036.8 |
| '1000'-'1111' | Reserved | Reserved |

Table 12 Encoding of the DURATION field

| DURATION field value (binary) | Number of 20 ms intervals |
|---|---|
| '1111' | Infinite |

CDMA-CDMA hard handoff scenario

While in a TDSO call, if the mobile station receives a *Universal Handoff Direction Message* signaling a hard handoff in which the active set, frame offset, or frequency assignment changes, upon performing the hard handoff, the mobile station shall:

- At the action time associated with the message. reinitialize the TDSO to supply data blocks with all 1 bits at a 100% frame activity to the multiplex sublayer for the FCH/DCCH channels (depending on the channel configuration).

- If a supplemental channel assignment is included. at the start time indicated by the FOR_SCH_START_TIME or REV_SCH_START_TIME fields, reinitialize the TDSO to supply one or more data blocks at the new rate filled with all 1 bits with a 100% frame activity to the multiplex sublayer for the SCH(s).

[PA000107]

63

- If the TDSO call in progress is a mobile-originated call, after the hard handoff, the mobile station shall propose the test parameters that were in effect before the hard handoff to the base station in a control directive using the *Service Option Control Message*.

Base station requirements

The TDSO shall be negotiated and connected using the service configuration and negotiation procedures defined in [5]. For the TDSO, the base station shall not propose a service configuration whose attributes are inconsistent with the valid service configuration attribute for the service option. The base station
shall not accept a service configuration whose attributes are inconsistent with the valid service configuration attributes for the service option as shown in Table 8. The base station should not propose a reverse RC that is different than the one proposed by the mobile station.

The BS controls both the forward and reverse high-speed operation by
allocating Supplemental Channels for an infinite duration. Allocation is specified in the ESCAM, FSCAMM, RSCAMM, or UHDM.

Synchronization frame

The Forward and Reverse Traffic Channels (F/R-FCH or F/R-DCCH, F/R-SCH0 and F/R-SCH1) are each subdivided into independent segments of 10.24
seconds each. This corresponds to every:

- 2048 frames for physical channels (FCH, DCCH) with 5 ms frame length
- 512 frames for physical channels (FCH, DCCH or SCH) with 20 ms frame length
- 256 frames for Supplemental Channels with a 40 ms frame length
    - 128 frames for a Supplemental Channel with an 80 ms frame length The first frame of a segment is called the synchronization frame. All pseudo-random number generators associated with the channel are reinitialized prior to TDSO frame processing for each synchronization frame. All service option initialization and control operations also take effect prior to TDSO frame
processing for a synchronization frame for each physical channel.

[PA000107]

Forward Traffic Channels

For the Forward Traffic Channels (F-FCH, F-DCCH, F-SCH0, and F-SCH1), the synchronization frames shall be those frames for which the least significant nine bits of the System Time in frames (as defined in [2]) are equal to the least significant nine bits of the bit-wise exclusive-OR of the least significant 32-bits Public Long Code Mask (PLCM_32) of the mobile station and the value 0x2aaaaaaa.

Forward Supplemental Channels

For 40 ms and 80 ms frame length operation on the Forward Supplemental Channels, however, the synchronization frame time as calculated for the Forward Traffic Channels above may not coincide with the beginning of the frame period for these channels. In that case, the circular buffer shall still be generated using the same generator as for other forward channels (F-FCH/DCCH) for the 20 ms frame length. However, the beginning of the next frame period on the Forward Supplemental Channel that is closest in time to the frame as calculated above for Forward Traffic Channels shall be treated as the first frame of the next 10.24-second test segment for the Forward Supplemental Channel.

Reverse Traffic Channels

For the Reverse Traffic Channels (R-FCH, R-DCCH, R-SCH0, and R-SCH1), the synchronization frames shall be those frames for which the least significant nine bits of the System Time in frames (as defined in [2]) are equal to the least significant nine bits of the bit-wise exclusive-OR of the least significant 32-bits Public Long Code Mask (PLCM_32) of the mobile station and the value 0x15555555.

Reverse Supplemental Channels

For 40 ms and 80 ms frame length operation on the Reverse Supplemental Channels, however, the synchronization frame time as calculated for the Reverse Traffic Channels above may not coincide with the beginning of the frame period for these channels. In that case, the circular buffer shall still be

[PA000107]

generated using the same generator as for other reverse channels (R-FCH/DCCH) for the 20 ms frame length. However, the beginning of the next frame period on the Reverse Supplemental Channel closest in time to the frame as calculated above for Reverse Traffic Channels shall be treated as the first frame of the next 10.24-second test segment for the Reverse Supplemental Channel.

Counters

The mobile station and the base station shall support the transmit counters listed in Table 13 and Table 14 for the Fundicated and Supplemental Channels, respectively.

Table 13 Transmit frame counters on the fundicated channel

| Generated frame type | Transmitted frame type | Counter name |
|---|---|---|
| Rate 1 | Rate 1 with no signaling | TDSO_E1_T1 |
| Rate 1 | Rate 1 with dim-and-burst signaling | TDSO_E1_TD |
| Rate 1 | Rate 1 with blank-and-burst signaling | TDSO_E1_TB |
| Blank | Blank | TDSO_EB_TB |
| Blank | Anything other than blank | TDSO_EB_TO |

Table 14 Transmitted frame counters on the Supplemental Channel

| SCH-generated frame type (kbps) | Transmitted frame type (kbps) | Counter name |
|---|---|---|
| N x 9.6 or N x 14.4[1] | N x 9.6 or N x 14.4 | TDSO_ENx_TNx |
| N x 9.6 or N x 14.4[1] | Blank | TDSO_ENx_TB |
| Blank | Blank | TDSO_EB_TB |

[1]N can take the values 1, 2, 4, 8, 16, 18, 32, 36, 64, or 72 depending on the connected SCH transmission rate. The SCH frame consists of one or more data blocks of type Rate 1, Rate 2, or Rate 3 as determined by the connected multiplex option.

The mobile station and the base station shall support the receive counters listed in Table 15 and Table 16.

Table 15 Receive frame counters maintained for the FCH/DCCH

| Expected frame type | Received frame type | Counter name |
|---|---|---|
| Rate 1 | Error-free Rate 1 frame with no dim-and-burst | TDSO_E1_R1 |
| Rate 1 | Rate 1 with bit errors detected by the service option | TDSO_E1_RERR |
| Rate 1 | Dim-and-burst frame | TDSO_E1_RD |
| Rate 1 | Other rate frame | TDSO_E1_RO |
| Rate 1 | Blank-and-burst | TDSO_E1_RB |
| Rate 1 | Rate 1 physical layer frame with insufficient physical layer frame quality[1] | TDSO_E1_RFL |
| Rate 1 | Insufficient frame quality (erasure) | TDSO_E1_RE |
| Null | Null | TDSO_EN_RN |
| Null | Blank | TDSO_EN_RB |
| Null | Other | TDSO_EN_RO |

1 Categorized by Multiplex Option 0x01 only.

Table 16 Receive frame counters on the Supplemental Channel

| SCH expected frame type | Received frame type | Counter name |
|---|---|---|
| N x 9.6 or N x 14.4 | Error-free N x 9.6 or N x 14.4 frame | TDSO_ENx_RNx |
| N x 9.6 or N x 14.4 | N x 9.6 or N x 14.4 frame with bit errors detected by the service option | TDSO_ENx_RERR |
| N x 9.6 or N x 14.4 | Insufficient frame quality (erasure) | TDSO_ENx_RE |
| N x 9.6 or N x 14.4 | Blank | TDSO_ENx_RB |
| Blank | Blank | TDSO_EB_RB |
| Blank | Anything other than blank | TDSO_EB_RO |

[PA000107]

67

The mobile station shall support the counters in Table 17 for the calculation of PER on the Supplemental Channels.

Table 17 Receive PDU counters maintained for the Supplemental Channels

| SCH expected rate | Received MuxPDU type | Bit counter name |
|---|---|---|
| 3 | Error-free Rate 3 MuxPDU | TDSO_E3_R3 |
| 3 | Rate 3 MuxPDU with errors detected by the TDSO | TDSO_E3_RERR |
| 3 | Insufficient frame quality (erasure) | TDSO_E3_RE |
| 2 | Error-free Rate 2 MuxPDU | TDSO_E2_R2 |
| 2 | Rate 2 MuxPDU with errors detected by the TDSO | TDSO_E2_RERR |
| 2 | Insufficient frame quality (erasure) | TDSO_E2_RE |
| 1a[1] | Error-free Rate 1a MuxPDU | TDSO_E1a_R1a |
| 1a | Rate 1a MuxPDU with errors detected by the TDSO | TDSO_E1a_RERR |
| 1a | Insufficient frame quality (erasure) | TDSO_E1a_RE |
| 1b[2] | Error-free Rate 1b MuxPDU | TDSO_E1b_R1b |
| 1b | Rate 1b MuxPDU with errors detected by the TDSO | TDSO_E1b_RERR |
| 1b | Insufficient frame quality (erasure) | TDSO_E1b_RE |

[1] Rate 1a corresponds to the Rate 1 type MuxPDU applicable only to multiplex options 0x3-0x4 as indicated in Table 9.

[2] Rate 1b corresponds to the Rate 1 type MuxPDU applicable only to multiplex options 0x809, 0x80a, 0x811, 0x812, 0x821, and 0x822 as indicated in Table 9.

The following buffers shall be capable of storing the frame counter values as shown in the following tables.

Table 18 Frame counter-value storage

| Channel | Buffer | Station | Counter-value storage type[1] |
|---|---|---|---|
| | | Mobile | Transmit |

[PA000107]

68

| Channel | Buffer | Station | Counter-value storage type[1] |
|---------|--------|---------|-------------------------------|
| R-FCH | RFCH_BUFFER | Mobile | Transmit |
| R-DCCH | RDCCH_BUFFER | Mobile | Transmit |
|  |  | Base | Receive |
| F-FCH | FFCH_BUFFER | Mobile | Transmit |
|  |  | Base | Receive |
| F-DCCH | FDCCH_BUFFER | Mobile | Transmit |
|  |  | Base | Receive |

[1] For more information on transmit frame counter values, refer to Table 13. For more information on receive frame counter values, refer to Table 15.

Table 19 Frame counter-value storage for Supplemental Channels

| Channel | Buffer | Station | Counter-value storage type* |
|---------|--------|---------|-----------------------------|
| R-SCH0 | RSCH0_BUFFER | Mobile | Transmit |
|  |  | Base | Receive |
| R-SCH1 | RSCH1_BUFFER | Mobile | Transmit |
|  |  | Base | Receive |
| F-SCH0 | FSCH0_BUFFER | Mobile | Transmit |
|  |  | Base | Receive |
|  |  | Mobile | Transmit |
|  |  | Base | Receive |

*For more information on transmit and receive frame counter values, refer to Table 14. For more information on receive bit counter values, refer to Table 17.

Mobile station initialization and control operation

Service option initialization

If a TDSO initialization is required as a result of a signaling message on f-dsch, the mobile station shall consider the System Time in frames coinciding with the action time of the message (as defined in [5]) to be the effective initialization frame, EFF_FRAME.

[PA000107]

For the Forward and Reverse Fundicated Traffic Channels (F/R-DCCH and/or F/R-FCH), the TDSO shall consider the System Time in frames that coincide with the action time of the *Service Connect Message* as the initialization frame. For the Forward and Reverse Supplemental Channels (F/R-SCH0 and/or F/R-SCH1), the TDSO shall consider the System time in frames coinciding with the start time indicated by the FOR_SCH_START_TIME (for Forward Supplemental Channels) or REV_SCH_START_TIME (for Reverse Supplemental Channels) fields inside of the ESCAM, FSCAMM, RSCAMM, or UHDM that is the initialization frame.

The initialization frame may coincide with the synchronization frame on a physical channel. Until the first synchronization on a channel is achieved, the TDSO shall only use the default settings for the test parameters, that is, an all 1's data pattern with a continuous transmission every frame period (20 ms, 40 ms, or 80 ms) on that channel.

To perform TDSO initialization, the mobile station shall perform the following operations:

- Immediately prior to TDSO frame processing for the Reverse Traffic Channel (that is, R-FCH/R-DCCH/R-SCH0/R-SCH1) synchronization frame for which the System Time in frames falls in the range from EFF_FRAME to EFF_FRAME + FRAMES_PER_SEGMENT_1 inclusive, the mobile station shall set the counters associated with the Reverse Traffic Channels to zero.

– For Reverse Fundicated Traffic Channels, the counters are RFCH_BUFFER and RDCCH_BUFFER – For Reverse Supplemental Channels, the counters areRSCH0_BUFFER and RSCH1_BUFFER – The value of FRAMES_PER_SEGMENT_1 shall be:

- 511 for a 20 ms physical channel frame length
    - 255 for a 40 ms physical channel frame length
    - 127 for a 80 ms physical channel frame length

[PA000107]

- Immediately prior to TDSO frame processing for the Forward Traffic Channel (that is, F-FCH/F-DCCH/F-SCH0/F-SCH1) synchronization frame for which the System Time in frames falls in the range from EFF_FRAME to EFF_FRAME + FRAMES_PER_SEGMENT_1 inclusive, the mobile station shall set the counters associated with the Forward Traffic Channels to zero.

- For Forward Fundicated Traffic Channels, the counters are FFCH_BUFFER and FDCCH_BUFFER

- For Forward Supplemental Channels, the counters are FSCH0_BUFFER and FSCH1_BUFFER

- The value of FRAMES_PER_SEGMENT_1 shall be:

- 511 for a 20 ms physical channel frame length
        - 255 for a 40 ms physical channel frame length
        - 127 for a 80 ms physical channel frame length Mobile station control operations Control invocation The mobile station can either propose or invoke service-option-specific functions for a TDSO call by sending a *Service Option Control Message* to the base station. When the mobile station sends the *Service Option Control Message*, it shall:

- Send it as a message requiring acknowledgment
- Set the CONTROL_CODE field in the message (see Table 33) to '00000000'

The mobile station can only propose values of test parameters for use during the test interval. The mobile shall be able to invoke the counter retrieval directives without any base station mediation.

Control directive

When the mobile station receives a *Service Option Control Message* with CTL_REC_TYPE in the range '0000001' – '00000100' inclusive (corresponding to FCH, DCCH, SCH0, or SCH1 physical channels) as indicated in Table 33, the mobile station shall consider the System Time in frames coinciding with the action time

[PA000107]

of the message to be the effective operation frame or initialization frame (also known as EFF_FRAME for the particular physical channel).

- Reverse Traffic Channel

Immediately prior to TDSO frame processing for the Reverse Traffic Channel synchronization frame for which the System Time in frames falls in the range from EFF_FRAME to EFF_FRAME + 511, inclusive, the mobile station shall perform the following:

- If the COPY_COUNTERS field is equal to '1', the mobile station shall copy the counters associated with the specified Reverse Traffic Channel to RFCH_BUFFER, RDCCH_BUFFER, RSCH0_BUFFER, and/or RSCH1_BUFFER as determined by the channel configuration (see Section 3.3 for more information).

- If the CLEAR_COUNTERS field is equal to '1', the mobile station shall set the counters associated with the specified Reverse Traffic Channel to zero (see Section 3.3 for more information).

- If the CHANNEL_DIRECTION field is equal to '00' or '10', the mobile station shall perform the following:

- Initialize the local test variables associated with DATA_SOURCE to the value implied by its value in the message.

- Initialize the local test variables associated with FRAME_ACTIVITY to the value implied by its value in the message.

- Forward Traffic Channel

Immediately prior to TDSO frame processing for the Forward Traffic Channel synchronization frame for which the System Time in frames falls in the range from EFF_FRAME to EFF_FRAME + 511, inclusive, the mobile station shall do the following:

- If the COPY_COUNTERS field is equal to '1', the mobile station shall copy the counters associated with the specified Forward Traffic Channel to FFCH_BUFFER, FDCCH_BUFFER, and/or FSCH_BUFFER (see Section 3.3 for more information).

- If the CLEAR_COUNTERS field is equal to '1', the mobile station shall set the counters associated with the specified Forward Traffic Channel to zero (see Section 3.3 for more information).

[PA000107]

72

- If the CHANNEL_DIRECTION field is equal to '00' or '01', the mobile station shall perform the following:

• Initialize the local test variables associated with DATA_SOURCE to the value implied by its value in the message.

• Initialize the local test variables associated with FRAME_ACTIVITY to the value implied by its value in the message.

Following a mobile station test control proposal (see Section 3.5.1 for a description), if a mobile station receives a *Service Option Control Message* with CTL_REC_TYPE in the range '00000001' – '00000100' inclusive (corresponding to FCH, DCCH, SCH0, or SCH1 physical channels) as listed in Table 32, the mobile station shall perform the following:

• If the CONTROL_CODE field is set to '00000011', the mobile station may send another proposal with the NUM_CIRC_BUF_FRAMES field set to a value less than or equal to the value indicated in the corresponding field of the base station directive.

• If the CONTROL_CODE field is set to '00000110', the mobile station may send another proposal with the FRAME_SOURCE field set to a value other than 10.

Counter retrieval

When the mobile station receives a *Service Option Control Message* with CTL_REC_TYPE in the range of '00000101' – '00001000' (corresponding to FCH, DCCH, SCH0, or SCH1 physical channels) as listed in Table 32, then:

• If the message is used to retrieve the 5 ms Transmitted Frame Counters or the 5 ms Received Frame Counters, then at the first synchronization frame boundary, the mobile station shall respond with the *Service Option Control Message* containing its response shown in Table 40, corresponding to the VECT_COUNTER_ID fields (see Table 41) in the received *Service Option Control Message*.

• Otherwise, at the action time associated with the message, the mobile station shall respond with the *Service Option Control Message* containing its response shown in Table 40 and

• Table 42, respectively, for the Fundicated and Supplemental Channels, corresponding to the VECT_COUNTER_ID fields (see Table 41 and Table 43) in the received *Service Option Control Message*.

[PA000107]

73

Base station initialization and control operations

To perform TDSO initialization, if the FCH/DCCH are configured to use 5 ms frames, the base station shall send a *Service Option Control Message* no later than 1 second before the occurrence of the first synchronization frame after EFF_FRAME, in accordance with 0, to retrieve the values of the 5 ms frame counters in the mobile station (e.g., MUX1_FOR_FCH_5_ms). Base station control operations Control invocation The base station shall use the *Service Option Control Message* for invoking service option specific directives. When the base station sends the *Service Option Control Message*, it shall send it as a message requiring acknowledgment.
When the mobile station proposes values of test parameters for use during the test interval, the base station shall decide whether or not to invoke the mobile-station-proposed test parameter settings through the Service Option Control Message.
The base station shall not send a control directive to the mobile station any later than one second before the occurrence of the synchronization frame on the channel for which the directive is intended.

Control directive

When the base station receives a *Service Option Control Message* with CTL_REC_TYPE in the range of '00000001' – '00000100' inclusive (corresponding to FCH, DCCH, SCH0, or SCH1 physical channels) as indicated in Table 32, the base station shall respond to the mobile station proposal as follows:

- If all of the fields in the mobile-station-proposed control directive (as indicated in Table 33) are within the acceptable range for the base station, the base station shall issue a Control Directive including the same values for the different fields (see Table 33) as proposed by the mobile station in a *Service Option Control Message*, while setting the CONTROL_CODE field (Table 34) in the message to a value of '00000010'.

[PA000107]

- If the base station does not have the capability of supporting the value proposed by the mobile station for the NUM_CIRC_BUF_FRAMES, it shall issue a Control Directive including the same values for the different fields (see Table 33) as were proposed by the mobile station, except for the NUM_CIRC_BUF_FRAMES field in a *Service Option Control Message*, while setting the CONTROL_CODE field (Table 34) in the message to a value of '00000011'. In the NUM_CIRC_BUF_FRAMES field of the message, the base station shall indicate the maximum number of frames it can support for the circular buffer.

- If the base station does not have the capability of generating one frame per frame period as requested by the mobile station through setting a value of '10' for the FRAME_SOURCE field, it shall issue a Control Directive, including the same values for the different fields (see Table 33), as proposed by the mobile station, except for the FRAME_SOURCE field in a *Service Option Control Message*, while setting the CONTROL_CODE field (Table 34) in the message to a value of '00000110'.

- If the base station is not able to recognize the fields in the mobile-proposed Control Directive, it shall issue a Control Directive including the same values for the different fields (see Table 33), as proposed by the mobile station in a *Service Option Control Message*, while setting the CONTROL_CODE field (Table 34) in the message to a value of '00000101'.

Counter retrieval

When the base station receives a *Service Option Control Message* with CTL_REC_TYPE in the range of '00000101' – '00001000' inclusive (corresponding to FCH, DCCH, SCH0, or SCH1 physical channels) as listed in Table 32, then at the action time associated with the message, the base station shall respond with the *Service Option Control Message* containing its response, as shown in Table 40 and Table 42, respectively, for the Fundicated and Supplemental Channels, corresponding to the VECT_COUNTER_ID fields (see Table 41 and Table 43) in the received *Service Option Control Message*.

TDSO Frame processing

For an FCH/DCCH that is configured to use 5 ms frames, the service option shall perform transmit frame processing for 5 ms DCCH frames exactly once for

[PA000107]

75 every 5 ms frame of System Time while the service option is connected on the allocated FCH/DCCH in accordance with 0.

If 20 ms frames are used, the service option shall perform transmit and receive frame processing exactly once for every 20 ms frame of System Time while the
service option is connected on the allocated physical channel(s) in accordance with 0and 0, respectively.

If 40 ms (or 80 ms) SCH frames are used, the service option shall perform transmit and receive frame processing exactly once for every 40 ms (or 80 ms) frame of System Time while the service option is connected on the allocated
SCH in accordance with 0and 0, respectively.

Transmit frame processing

Transmit frame processing refers to F-FCH/F-DCCH/F-SCH Forward Traffic Channel frame processing in the base station or R-FCH/R-DCCH/R-SCH Reverse Traffic Channel frame processing in the mobile station. Transmit frame
processing consists of the following:

- Generating data block(s)
- Supplying data block(s) to the multiplex sublayer for transmission
- Incrementing the corresponding counters The service option shall generate the data blocks in accordance with 3.7. For
Fundicated data frames (carried over FCH or DCCH), if the multiplex sublayer has requested a Blank data block, the service option shall supply a blank data block (data block containing no bits) to the multiplex sublayer. If the multiplex sublayer has requested a non-blank x-bit data block, the service option shall supply the first x bits of the generated data block to the multiplex sublayer and
discard the rest of the generated data block. Otherwise, the service option shall supply the generated data block(s) to the multiplex sublayer, every physical channel frame.

For Supplemental data frames, if the multiplex sublayer has requested a Blank data block or Blank data blocks, the service option shall supply a data block or
data blocks containing zero bits to the multiplex sublayer. Otherwise, the

[PA000107]

76 service option shall supply the generated data block(s) to the multiplex sublayer every SCH frame.

The service option shall increment the counters that are shown in Table 20 and

[PA000107]

TableTable 21, corresponding to the rate of the generated Fundicated and Supplemental frames and the command received from the multiplex sublayer.

Table 20 Counters for fundicated transmitted frames

| Rate of generated frame | Multiplex sublayer command | Counter to increment |
|---|---|---|
| 1 | None | TDSO_E1_T1 |
| 1 | Max Rate = Rate 1/2 | TDSO_E1_TD |
| 1 | Blank | TDSO_E1_TB |
| Blank | None | TDSO_EB_TB |
| Blank | Maximum Rate = Rate 1/2 or Blank | TDSO_EB_TO |

[PA000107]

78

Table 21 Counters for supplemental transmitted frames

| SCH rate of generated frame (kbps) | Multiplex sublayer command | Counter to increment |
|---|---|---|
| N x 9.6 or N x 14.4[1] | None | TDSO_ENx_TNx |
| N x 9.6 or N x 14.4 | Blank | TDSO_ENx_TB |
| Blank | None | TDSO_EB_TB |

[1] N can take the values 1, 2, 4, 8, 16, 18, 32, 36, 64, or 72 depending on the connected SCH transmission rate. The SCH frame consists of one or more data blocks of type Rate 1, Rate 2, or Rate 3 as determined by the connected multiplex option.

Receive frame processing

Receive frame processing refers to F-FCH/F-DCCH/F-SCH frame processing in the mobile station or R-FCH/R-DCCH/R-SCH frame processing in the base station. Receive frame processing consists of the following:

- Generating data block(s)
- Accepting data block(s) from the multiplex sublayer
- Comparing the rates and contents of the comparable data block(s)
- Incrementing the corresponding counters For Fundicated Channel processing:

- The service option shall generate a data block in accordance with 3.7.
- The service option shall accept a received frame and the categorization of the MuxPDU(s) from the multiplex sublayer.
- If the categorization of the received MuxPDU corresponds to the rate of the generated data block, the service option shall compare the contents of the generated data block with the contents of the received data block, and shall determine whether or not they are identical.
- The service option shall increment the counter shown in Table 22 (when MuxPDU Type 1 is used) or

[PA000107]

79

TableTable 23 (when MuxPDU Type 2 is used) corresponding to the rate of the generated data block, the categorization of the received MuxPDU, and the result, if any, of the comparison of the data blocks.

Table 22 Counter updates for received fundicated frames when MuxPDU
Type 1 is used

| Rate of generated frame | Category of received MuxPDU for primary traffic | Category of received MuxPDU for secondary traffic | Data block comparison identical? | Counter to increment |
|---|---|---|---|---|
| 1 | 1 | 14 | Y | TDSO_E1_R1 |
| 1 | 1 | 14 | N | TDSO_E1_RERR |
| 1 | 2, 3, 4, 11, 12, 13 | 11, 12, 13 | N/A | TDSO_E1_RD |
| 1 | 6, 7, 8 | N/A | N/A | TDSO_E1_RO |
| 1 | 5, 14 | 1-8 | N/A | TDSO_E1_RB |
| 1 | 9 | 9 | N/A | TDSO_E1_RFL |
| 1 | 10 | 10 | N/A | TDSO_E1_RE |
| Blank | 15 | 15 | N/A | TDSO_EN_RN |
| Blank | 5, 14 | 1-8 | N/A | TDSO_EN_RB |
| Blank | 1-4, 6-13 | 9-14 | N/A | TDSO_EN_RO |

[PA000107]

80

Table 23 Counter updates for received fundicated frames when MuxPDU Type 2 is used

| Rate of generated frame | Category of received MuxPDU for primary traffic | Category of received MuxPDU for secondary traffic | Data block comparison identical? | Counter to increment |
|---|---|---|---|---|
| 1 | 1 | 9 | Y | TDSO_E1_R1 |
| 1 | 1 | 9 | N | TDSO_E1_RERR |
| 1 | 2-4, 6-8, 10, 12, 13, 15, 16, 18, 20, 22 | 6-8, 10, 15, 16, 18, 22 | N/A | TDSO_E1_RD |
| 1 | 5, 9, 14, 17, 21, 23, 25 | 1-5, 11-14, 19-21, 24 | N/A | TDSO_E1_RB |
| 1 | 26 | 26 | N/A | TDSO_E1_RE |
| 1 | 11, 19, 24 | 17, 23, 25 | N/A | TDSO_E1_RO |
| Blank | 27 | 27 | N/A | TDSO_EN_RN |
| Blank | 5, 9, 14, 17, 21, 23, 25 | 1-5, 11-14, 19-21, 24 | N/A | TDSO_EN_RB |
| Blank | 1-4, 6-8, 10-13, 15, 16, 18-20, 22, 24, 26 | 6-10, 15-18, 22, 23, 25, 26 | N/A | TDSO_EN_RO |

For Supplemental Channel processing:

- The service option shall generate one or more data blocks in accordance with 3.7 for every SCH frame.

- The service option shall accept one or more data blocks, along with a categorization of each MuxPDU (see [3]), from the multiplex sublayer at every SCH frame, as dictated by the connected multiplex option.

- If the categorization of the received MuxPDU(s) corresponds to the rate of the corresponding generated frame, the service option shall compare the contents of the generated data block(s) with the contents of the received data block(s), and shall determine whether or not they are identical.

[PA000107]

81

- The service option shall increment the counter shown in Table 24 corresponding to the rate of the generated frame, the categorization of the received MuxPDU(s), and the result, if any, of the comparison of the two frames. These counters are employed in PER calculations on the Supplemental Channels.

- If all of the data block(s) received within a frame interval are identical to the locally generated data block(s), the frame is declared error-free and the corresponding frame counter is incremented to reflect this as shown in Table 25. Otherwise, the frame error is noted in the appropriate counter. These counters are employed in FER calculations on the Supplemental Channels.

Table 24 Counter updates for PDUs received on Supplemental Channels

| Rate of generated data block | Category expected | Category of received MuxPDU | Data block comparison identical? | Counter to increment |
|---|---|---|---|---|
| 3 | 2 | 2 | Y | TDSO_E3_R3 |
| 3 | 2 | 2 | N | TDSO_E3_RERR |
| 3 | 2 | 1 | N/A | TDSO_E3_RE |
| 2 | 5 | 5 | Y | TDSO_E2_R2 |
| 2 | 5 | 5 | N | TDSO_E2_RERR |
| 2 | 5 | 3 | N/A | TDSO_E2_RE |
| 1a | 1(2)[1] | 1(2) | Y | TDSO_E1a_R1a |
| 1a | 1(2) | 1(2) | N | TDSO_E1a_RERR |
| 1a | 1(2) | 3 | N/A | TDSO_E1a_RE |
| 1b | 4 | 4 | Y | TDSO_E1b_R1b |
| 1b | 4 | 4 | N | TDSO_E1b_RERR |
| 1b | 4 | 3 | N/A | TDSO_E1b_RE |

1 The category inside the parentheses is for secondary traffic.

[PA000107]

Table 25 Counter updates for received frames on Supplemental Channels

| Rate of generated frame | Category of each received MuxPDU (if carried as primary traffic) | | | | Category of each received MuxPDU (if carried as secondary traffic) frame | | | | Frame comparison identical? | Counter to increment |
|---|---|---|---|---|---|---|---|---|---|---|
| | MuxPDU Type in use | | | | MuxPDU Type in use | | | | | |
| | 1 | 2 | 3 | 5 | 1 | 2 | 3 | 5 | | |
| N x 9.6 or N x 14.4[1] | 1 | 1 | 4, 5 | 2 | 2 | 2 | 4, 5 | 2 | Y | TDSO_ENx_RNx |
| N x 9.6 or N x 14.4 | 1 | 1 | 4, 5 | 2 | 2 | 2 | 4, 5 | 2 | N | TDSO_ENx_RERR |
| N x 9.6 or N x 14.4 | 3 | 3 | 3 | 1 | 3 | 3 | 3 | 1 | N/A | TDSO_ENx_RE |
| N x 9.6 or N x 14.4 | 2 | 2 | 4, 5 | 2 | 1 | 1 | 4, 5 | 2 | N/A | TDSO_ENx_RB |
| Blank | 2 | 2 | 4, 5 | 2 | 1 | 1 | 4, 5 | 2 | N/A | TDSO_EB_RB |
| Blank | 1,3 | 1,3 | 3 | 1 | 2, 3 | 2, 3 | 3 | 1 | N/A | TDSO_EB_RO |

[1] N can take the values 1, 2, 3, 4, 8, 16, 18, 32, 36, 64, or 72 depending on the allowed SCH transmission rate. The SCH frame consists of one or more data blocks of type Rate 1, Rate 2, or Rate 3 as determined by the connected multiplex option.

Transmit frame processing for 5 ms FCH/DCCH frames

Mobile Station Requirement

For R-FCH/DCCH 5 ms transmit frame processing in the mobile station, the TDSO shall request Layer 3 Signaling to transmit a SCRMM when TDSO decides to send a 5 ms frame based on the frame activity. If the R-SCH0 has already been assigned, the mobile station shall set the fields of the SCRMM_REQ_BLOB as follows:

[PA000107]

83

- SR_ID set to the sr_id corresponding to the connected SO
- PREFERRED_RATE set to the currently connected R-SCH0 rate
- DURATION field set to '1111'

Otherwise, the mobile station should set the fields of the SCRMM_REQ_BLOB as follows:

- SR_ID set to the sr_id corresponding to the connected SO
- PREFERRED_RATE set to any valid R-SCH0 rate
- DURATION field set to '0000'

The mobile station counts and stores the number of transmitted or retransmitted 5 ms frames in the counters (MUX1_REV_FCH_5_ms, MUX2_REV_DCCH_5_ms, MUX2_REV_DCCH_5_ms and MUX2_REV_FCH_5_ms) as specified in [3].

Since TDSO has no control on timing in Layer 3 Signaling, the actual transmission of the mini message may occur in a later frame.

Base Station Requirement

For F-FCH/DCCH 5 ms transmit frame processing in the base station, the TDSO shall request Layer 3 Signaling to transmit an FSCAMM when TDSO decides to send a 5 ms frame based on the frame activity. If the F-SCH0 has already been assigned, the base station should set the fields of the FSCAMM as follows:

- FOR_SCH_ID set to '0'
- FOR_SCH_DURATION field set to '1111'
- SCCL_INDEX set to the Supplemental Channel Code list index corresponds to one currently in use by F-SCH0.

Otherwise, the base station should set the fields of the FSCAMM as follows:

- FOR_SCH_ID set to '0'
- FOR_SCH_DURATION field set to '0000'

[PA000107]

84

- SCCL_INDEX set to any Supplemental Channel Code list index that corresponds to F-SCH0, if available. If there is no Supplemental Channel Code list index corresponds to F-SCH0, SCCL_INDEX shall be set to any value, in which case the mobile station ignores the SCCL_INDEX field.

The base station should count the number of transmitted or retransmitted 5 ms frames, which includes the following:

- Any 5 ms frame carrying a mini message that is initiated by TDSO
- Any 5 ms frame carrying a mini message that is not initiated by TDSO
- A retransmitted 5 ms frame due to LAC retransmission TDSO frame generation Two different categories of traffic can be transported over the connected TDSO:

- Selectable byte pattern
- Pseudo-randomly generated bits

At the physical layer, by default, the TDSO is configured to generate primary traffic over the Forward and Reverse Fundamental Channels using RC3. The default test mode for the TDSO service option is the byte pattern 0xFF with a 100% frame activity.

For every 20 ms FCH/DCCH frame, when TDSO generates a TDSO frame, it shall generate a Rate 1 data block. For every SCH frame, when TDSO generates a TDSO frame, it shall generate one or more Rate 1, Rate 2, or Rate 3 data blocks that are applicable to the connected SCH rate.

The actual size of the transmitted data block(s) during a TDSO frame depends on the multiplex sublayer command.

Selectable byte pattern

When using this scheme, a single-byte pattern is used to fill the data block or data blocks that are passed to the multiplex sublayer (up to a whole number of octets) during each TDSO frame interval (20 ms, 40 ms, or 80 ms).

When the TDSO prepares a TDSO frame for a traffic channel, it shall perform the following:

[PA000107]

85

- Fill up a Rate 1, Rate 2, or Rate 3 data block, whichever is applicable, with single-byte pattern up to a whole number of octets. Pad the data block with '0' bits for any remaining bits that are not filled. (e.g., a 171-bit Rate 1 has 21 full octets and 3 additional bits. The additional remaining bits are filled by '0' bits.)
- Replace the first 5 bits of the data block by the header depicted in Table 30. This helps the TDSO on the receive side to categorize the data blocks on a per-channel and per-PDU basis.

Pseudo-random number generation

Pseudo-random number generators are utilized for frame generation. These generators are associated with a particular physical channel (forward or reverse) and are initialized at each synchronization frame. The pseudo-random number generators are iterated one or more times for every frame. Iterations of the pseudo-random number generators are used for information bit generation, enough to fill two maximum rate physical layer frames (per the configured RC). The bits are stored in circular buffers. The buffers are regenerated with a new seed of the System Time frame number associated with a synchronization frame every 10.24 seconds.

For each physical channel, a TDSO uses two independent pseudo-random number generators. One pseudo-random number generator is associated with the Forward Traffic Channel, while the other is associated with the Reverse Traffic Channel. These pseudo-random number generators are synchronized with their counterparts at the other end of the link, as shown in Figure 1. At synchronization time, the pseudo-random number generator for the transmit side is used for generating the circular buffer that serves as the data source for bits packed into data blocks each frame period for the next test segment (10.24 seconds). The receive side pseudo-random number generator, by emulating the frame generation process at the other end of the link, enables the service option to verify if a data block(s) is received error-free.

[PA000107]

86

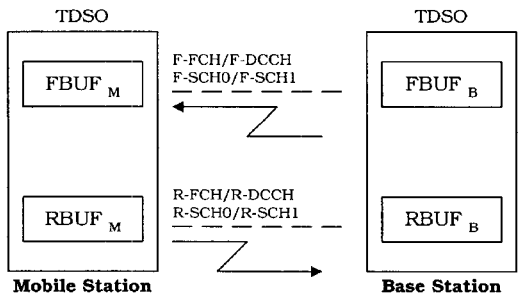

Figure 1. Synchronized operation of pseudo-random number generated buffers

On the transmit side, the bits from the circular buffer for a particular channel
are packed serially into data blocks corresponding to the available MuxPDUs as
determined by the connected multiplex option. The multiplex option indicates
the size of the data block or data block(s), which is equal to the number of bits
to be copied from the circular buffer to the last whole octet to form a data block
or data blocks. Any remaining bits up to the data block size are filled with
'0' bits. For every frame, the service option shall copy the data bits from the
circular buffer, starting at a reference point plus an offset, to fill the data
block(s). The reference for the current frame shall be calculated as follows: If the
current frame is a synchronization frame, the reference point shall be set to
zero; otherwise, the reference point shall be set to the end of the last byte that
was copied into the previous frame. The offset, $O_n$, which is generated every
frame, shall be set to the 6 least significant bits of $RNG/128$ modulo $B(n)$, where
$B(n)$ is the buffer size and $RNG$ is the random number generator associated
with the physical channel (see 0for buffer sizes]. This process is synchronized
with its counterpart on the receive side. The receive side emulates the frame
generation process at the other end by following the same process of building a
frame (which consists of one or more data blocks) from the circular buffer each
time from a different offset.

[PA000107]

87

Depending on the frame activity or the TX_ON_PERIOD/TX_OFF_PERIOD, if the TDSO transmits the TDSO frame during the current frame, it shall perform the following:

- Replace the first 5 bits of the generated data block(s) with the header depicted in Table 30. This helps the TDSO on the receive side to categorize the data blocks on a per-channel and per-PDU basis.
- The TDSO shall pass the generated data block(s) to the multiplex sublayer. The TDSO shall supply the first x bits of the data block to the multiplex sublayer if the multiplex sublayer requests an x-bit data block, where x may be smaller than the number of bits in a Rate 1 data block.

Otherwise, the TDSO shall discard the generated data block(s) during this frame.
The service option shall store the state of all the Forward Traffic Channel pseudo-random number generators, FRNG, and the state of the Reverse Traffic Channel pseudo-random number generators, RRNG.

Initialization

Before frame generation for every Forward Traffic Channel synchronization frame, the service option shall initialize the Forward Traffic Channel pseudo-random number generator as follows:

{
    a = 16807
    m = 2147483647
    FRNG = System Time in frames of the forward synchronization frame
    FRNG = (FRNG ^ 0x2AAAAAAA) & 0x7FFFFFFF
    FRNG = (FRNG * a) mod m
    FRNG = (FRNG * a) mod m
    FRNG = (FRNG * a) mod m
    FRNG = (FRNG * a) mod m
}

Before frame generation for every Reverse Traffic Channel synchronization frame, the service option shall initialize the Reverse Traffic Channel pseudo-random number generator as follows:

{

[PA000107]

88

```
        a = 16807
        m = 2147483647
        RRNG = System Time in frames of the reverse synchronization frame
        RRNG = (RRNG ^ 0x55555555) & 0x7FFFFFFF
        RRNG = (RRNG * a) mod m
        RRNG = (RRNG * a) mod m
        RRNG = (RRNG * a) mod m
        RRNG = (RRNG * a) mod m
    }

    Number production

Whenever a pseudo-random number is required for Forward Traffic Channel
    frame processing, the service option shall use the current value of FRNG as the
    pseudo-random number and then shall update FRNG as follows:
    {
        a = 16807
        m = 2147483647
        FRNG = (FRNG * a) mod m
    }

    Whenever a pseudo-random number is required for Reverse Traffic Channel
    frame processing, the service option shall use the current value of RRNG as the
    pseudo-random number and then shall update RRNG as follows:

{
        a = 16807
        m = 2147483647
        RRNG = (RRNG * a) mod m
    }
```

[PA000107]

89

24-bit random number

The pseudo-random number generators that are used to fill the circular buffers (see Section 0 for more information) to determine the transitions between the two TDSO states for calculation of frame activity (see Section 0 for more information) and to select the 6-bit byte offset in the circular buffer (see Section 0 for more information) each frame period, all have the following linear congruent relationship:

$x_n = a \times x_{n-1} \mod m$, where:

- $a = 7^5 = 16807$
- $m = 2^{31} - 1 = 2147483647$
- $x_{n-1}$ and $x_n$ are the successive outputs of the generator and are 31-bit integers However, because of the better randomness properties of the most significant 24 bits within the 31-bit number and for ease of usage, especially for building circular buffers (31-bit number is not octet-aligned), only the most significant 24 bits of these numbers are used throughout. That is, 24-bit number = 31-bit PN number >> 7

Circular buffer sizes

The sizes of the required buffers for generation of Fundicated and Supplemental (for each Supplemental Channel) traffic frames for various radio configurations (RCs) on the forward/reverse links are indicated in Table 26, Table 27, and

[PA000107]

Table Table 28. For convenience, the buffer sizes are based on the maximum number of bits passed by the multiplex sublayer to the physical layer each frame period (5 ms, 20 ms, 40 ms, or 80 ms) depending on the radio configuration.

Table 26 Circular buffer sizes needed to generate fundicated channel data frames

| Reverse Radio Configuration (RC) | Forward Radio Configuration (RC) | Maximum bits/frame | Default circular buffer size 2 frames (bits) | Circular buffer size N frames (bits) |
|---|---|---|---|---|
| 1, 3, 5 | 1, 3, 4, 6 or 7 | 172 | 2 x 172 = 344 | N x 172 |
| 2, 4, 6 | 2, 5, 8 or 9 | 267 | 2 x 267 = 534 | N x 267 |

Table 27 Circular buffer sizes needed to generate reverse Supplemental Channel data frames

| Radio configuration (RC) | Maximum bits/frame | Default circular buffer size 2 frames (bits) | Circular buffer size N frames (bits) |
|---|---|---|---|
| 3 | 6, 120 | 2 x 6,120 = 12,240 | N x 6,120 |
| 4 | 4, 584 | 2 x 4,584 = 9,168 | N x 4,584 |
| 5 | 12, 264 | 2 x 12,264 = 24,528 | N x 12,264 |
| 6 | 20, 712 | 2 x 20,712 = 41,424 | N x 20,712 |

[PA000107]

91

Table 28 Circular buffer sizes needed to generate forward Supplemental Channel data frames

| Radio configuration (RC) | Maximum bits/frame | Default circular buffer size 2 frames (bits) | Circular buffer size N frames (bits) |
|---|---|---|---|
| 3 | 3,048 | 2 x 3,048 = 6,096 | N x 3,048 |
| 4 | 6,120 | 2 x 6,120 = 12,240 | N x 6,120 |
| 5 | 4,584 | 2 x 4,584 = 9,168 | N x 4,584 |
| 6 | 6,120 | 2 x 6,120 = 12,240 | N x 6,120 |
| 7 | 12,264 | 2 x 12,264 = 24,528 | N x 12,264 |
| 8 | 9,192 | 2 x 9,192 = 18,384 | N x 9,192 |
| 9 | 20,172 | 2 x 20,712 = 41,424 | N x 20,712 |

The pseudo-random number generators used to fill the circular buffers have the following linear congruent relationship:

$x_n = a \times x_{n-1} \mod m$, where:

- $a = 7^5 = 16807$
- $m = 2^{31} - 1 = 2147483647$
- $x_{n-1}$ and $x_n$ are the successive outputs of the generator and are 31-bit integers Information bit generation For every Forward or Reverse Traffic Channel frame, the TDSO iterates the
associated pseudo-random number generator for the Physical Channel
(FCH/DCCH or SCH) one or more times, as specified in the following
subsections. For every synchronization frame, the service option shall initiate
the circular buffer. However, for ease of implementation, the actual number of
random bits in a circular buffer that is generated for a radio configuration is
rounded to an octet-aligned number of bits determined exactly by the

[PA000107]

92 minimum number of iterations conducted on the associated pseudo-random number generator to achieve the given buffer size.

To generate the circular buffer at any rate R(n):

- The service option shall generate a total of NUM_RAND pseudo-random numbers (as shown in Table 35) corresponding to actual circular buffer size B(n).

- Each 24-bit number $y_n(k)$, $1 \leq k \leq$ NUM_RAND, shall be reshuffled and stored in the little-endian order as shown in Figure 2.

- The reshuffled number $y_n^{LE}(k)$ has the least significant byte of $y_n(k)$ in the most significant byte position and *vice versa*.

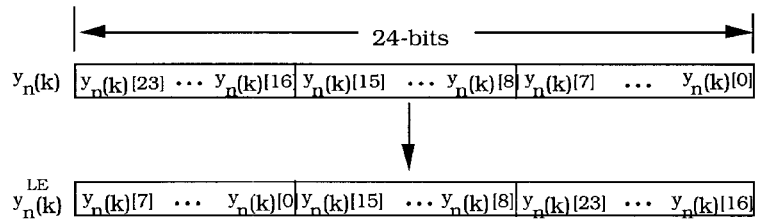

Figure 2. Reshuffling of $y_n(k)$ to generate $y_n^{LE}(k)$

For example, the 45-byte circular buffer (generated to accommodate a needed buffer size of 344 bits) shall be comprised of $y_n^{LE}(1)$ through $y_n^{LE}(15)$ as follows:

$y_n^{LE}(1), y_n^{LE}(2), y_n^{LE}(3) \ldots\ldots\ldots\ldots y_n^{LE}(15)$

[PA000107]

93

Table 29 Procedure for generating the default circular buffers for RC>2 channels

| Needed circular buffer size R(n) | Minimum required number of 24-bit pseudo-random numbers NUM_RAND | Pseudo-random bits generated | Actual circular buffer size (bytes) B(n) |
|---|---|---|---|
| 344 | 15 | 15 x 24 = 360 | 45 |
| 534 | 23 | 23 x 24 = 552 | 69 |
| 6096 | 254 | 254 x 24 = 6096 | 762 |
| 9168 | 382 | 382 x 24 = 9168 | 1146 |
| 12240 | 510 | 510 x 24 = 12240 | 1530 |
| 18384 | 766 | 766 x 24 = 18384 | 2298 |
| 24528 | 1022 | 1022 x 24 = 24528 | 3066 |
| 41424 | 1726 | 1726 x 24 = 41424 | 5178 |

Information-bit generation for an N-frame circular buffer follows the same method and principles as described for the 2-frame circular buffer case.

Frame activity

If 5 ms FCH/DCCH frames are used, the TDSO shall decide whether or not to request Layer 3 Signaling to send a mini message for each 5 ms frame period based on the frame activity.

Otherwise, the TDSO passes the information bits to the multiplex sublayer according to a certain ON/OFF frame activity. For each frame period (20 ms, 40 ms, or 80 ms) on a particular physical channel, the TDSO may choose to pass data block(s) corresponding to a full-rate frame on that channel or pass a blank data block to the multiplex sublayer. The TDSO shall support two different schemes to pass data to the multiplex sublayer, as follows:

Deterministic frame activity

This scheme is governed by the values of the TX_ON_PERIOD and TX_OFF_PERIOD indicated in the *Service Option Control Message*. The fields represent (in units of 5

[PA000107]

ms, 20 ms, 40 ms, or 80ms, depending on the target physical channel configuration) the pattern for passing data to the multiplex sublayer.

If the channel is an FCH/DCCH configured to use 5 ms frames, the TDSO shall:

- Request Layer 3 Signaling to send an FSCAMM in the base station (or a SCRMM in the mobile station) every 5 ms, for a duration of TX_ON_PERIOD.

- Not request an FSCAMM in the base station (or a SCRMM in mobile station) every 5 ms, for a duration of TX_OFF_PERIOD.

Otherwise, the TDSO shall:

- Pass data blocks to the multiplex sublayer for a duration of TX_ON_PERIOD.

- Send blank data blocks for a duration of TX_OFF_PERIOD.

The ON/OFF cycle starts at the synchronization frame and terminates at the last frame before the next synchronization frame for that channel.

Random with a specified frame activity and burst length

This second scheme is more random. Its goal is to achieve a long-term average of a specified frame activity (D) and a specified burst length (B), which is defined as the average consecutive "On" period, for a channel. This goal is achieved by modeling the ON/OFF states by a two-state first order Markov chain with transition probabilities p and q, as indicated in Figure 3. The values of p and q are specified in the ON_TO_OFF_PROB field and the OFF_TO_ON_PROB field, respectively, in the base-station control directive using the *Service Option Control Message* (see Table 33). The value of D can be calculated based on p and q as follows:

$$D = q/(p+q),$$

where p is the transition probability from the "On" state to the "Off" state, and q is the transition probability from the "Off" state to the "On" state, The average consecutive "On" period in units of frames, B, can be calculated follows:

$$B = 1/p$$

Procedures for calculating p and q based on some desired D and B are explained in Annex H.

[PA000107]

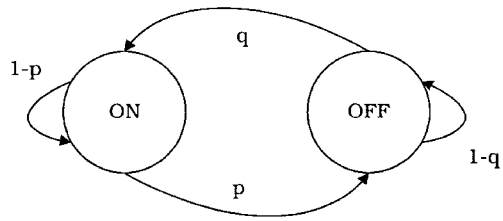

Figure 3. Two-state Markov chain representing ON/OFF transitions for TDSO

A 24-bit pseudo-random number is used to drive the transitions between the
two TDSO states every frame period (5 ms, 20 ms, 40 ms, and 80 ms). For all 20
ms frame length-based physical channels, the TDSO uses the same PN number
generator, iterating every 20 ms to calculate the transitions. If the operating
Supplemental Channels are configured for 40 ms or 80 ms frame lengths, a
second PN number generator iterating every 40 ms or 80 ms, respectively, is
used to derive the TDSO state for the Supplemental Channels.

The PN generator for the 5 ms, 20 ms frame length channels shall be initialized
at the first synchronization frame time after the TDSO is initialized at the action
time that is associated with the *Service Connect Message*. For the 40 ms or 80 ms
frame lengths, the associated PN number generator shall be initialized at the
first synchronization frame time after the TDSO is initialized on the
Supplemental Channel at the action time associated with the UHDM, ESCAM,
FSCAMM, or RSCAMM. When initialized, the state of the Markov chain shall
be set to the "Off" state.

Normally, the state of the PN generators is maintained throughout the duration
of the call without any reinitialization at the synchronization frames. However,
the PN generators are reinitialized if a CDMA-CDMA hard handoff has been
completed. In case of the latter, the reinitialization occurs at the first
synchronization frame after the handoff completion message. When
reinitialized, the state of the Markov chain shall be set to the "Off" state.

[PA000107]
96
Section 0 describes how the 24-bit PN number is derived. The method that is followed in choosing the TDSO state (ON or OFF) during a frame period is shown in Figure 4.
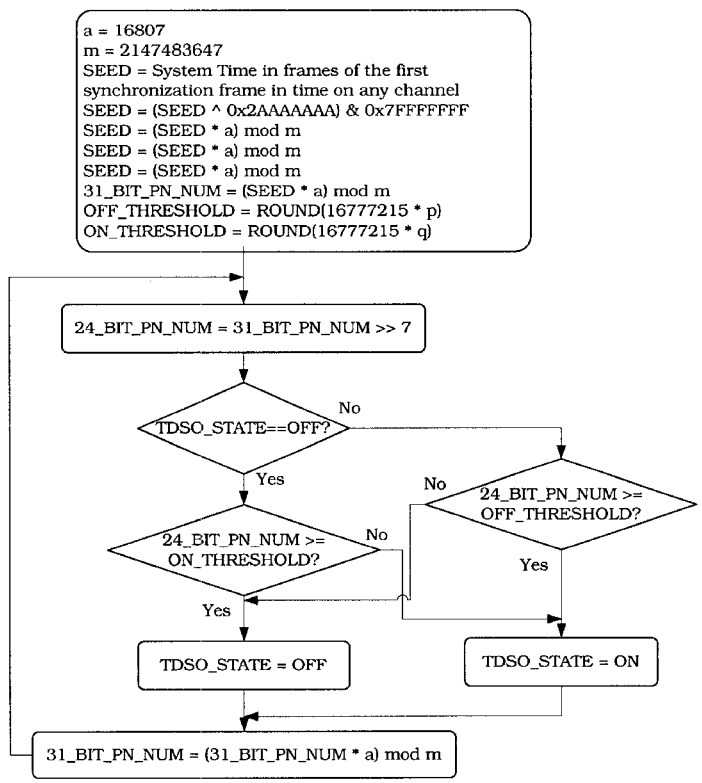
Figure 4. Flowchart illustrating TDSO state transitions for a D frame activity and B average "On" period in units of frames.

[PA000107]

97

Data block header and formats

In order to separate the calculation of FER on a per physical channel basis, a Channel ID must mark each data block that is supplied to the multiplex sublayer during each frame interval.

Also, a sequence number is needed to help compare multiple PDUs that carry individual data blocks received in a physical layer SDU with a locally generated frame.

The first 5 bits of each generated data block are replaced by the header as shown in Table 30 for the FCH/DCCH and SCH Multiplex PDUs.

Table 30 Data block format

| Field | Length (bits) | Definition |
| --- | --- | --- |
| CHANNEL_ID | 2 | Channel ID of the underlying physical channel carrying the data block. Various channel codes are shown in Table 31. |
| PDU_SEQ_NUM | 3 | Sequence number of the data block within a physical layer SDU. For FCH/DCCH data blocks, this field is set to '000'. For SCH data blocks, this field is set as follows: It is set to '000' for the first data block (MuxPDU) in the SCH frame, '001' for the second data block in the SCH frame, and so on. |
| DATA | Variable up to the data block size | Data bits as generated according to the selected DATA_SOURCE algorithm. |

[PA000107]

Table 31 CHANNEL_ID type codes

| CHANNEL_ID | Traffic channel |
|---|---|
| '00' | FCH |
| '01' | DCCH |
| '10' | SCH0 |
| '11' | SCH1 |

Message formats

Service Option Control Message

If the base station or mobile station sends a *Service Option Control Message*, it shall set the CTL_REC_TYPE field to the value shown in Table 32 corresponding to the desired directive.

Table 32 CTL_REC_TYPE codes

| CTL_REC_TYPE | Type of directive |
|---|---|
| '00000000' | Control Directive for all Physical Channels carrying TDSO traffic |
| '00000001' | Control Directive for FCH |
| '00000010' | Control Directive for DCCH |
| '00000011' | Control Directive for SCH0 |
| '00000100' | Control Directive for SCH1 |
| '00000101' | Counter Retrieval Directive for FCH |
| '00000110' | Counter Retrieval Directive for DCCH |
| '00000111' | Counter Retrieval Directive for SCH0 |
| '00001000' | Counter Retrieval Directive for SCH1 |
| '00001001'-'11111111' | Reserved |

[PA000107]

99

Control

When the mobile station sends a *Service Option Control Message* to propose control action or the base station sends a *Service Option Control Message* to invoke control action in a mobile station, it shall include the type-specific fields
as specified in Table 33.

Table 33 *Service Option Control Message* type-specific fields

| Field | Length (bits) | Definition |
|---|---|---|
| CTL_REC_TYPE ('00000000' – '00000100') | 8 | Control record type field.<br>The mobile station or base station shall set this field to a value between '00000000' and '00000100' to signify a control directive on all TDSO-configured channels or for a specific channel according to Table 32. |
| CONTROL_CODE | 8 | Control code field.<br>The mobile station or base station shall set this field according to Table 34. |
| CHANNEL_DIRECTION | 2 | Channel direction field.<br>This field indicates what channel direction this control directive is for. The base station or mobile station shall set this field according to Table 37. |
| COPY_COUNTERS | 1 | Copy counters field.<br>If the mobile station and base station are to copy the counter values at the next synchronization frame, the base station shall set this field to '1'. Otherwise, the base station shall set this field to '0'. |
| CLEAR_COUNTERS | 1 | Clear counters field.<br>If the mobile station and base station are to clear the counters at the next synchronization frame, the base station shall set this field to '1'. Otherwise, the base station shall set this field to '0'. |

[PA000107]

100

| Field | Length (bits) | Definition |
|---|---|---|
| DATA_SOURCE | 1 | Data source field.<br><br>The mobile station or base station shall set this field to the DATA_SOURCE value shown in Table 36 corresponding to the type of traffic that is desired to be generated during the test call. |
| FRAME_SOURCE | 2 | Frame source field.<br><br>Through this field, the base station or mobile station defines the source to be used for filling up the data frames for the particular channel. The various options are indicated in Table 38. |
| FRAME_ACTIVITY | 1 | Frame activity field.<br><br>The base station or mobile station shall set this field to the FRAME_ACTIVITY value shown in Table 36 corresponding to the desired burstiness in the traffic that is to be generated during the test call. |
| TEST_OPTIONS | 8 | TDSO Test Options.<br><br>The base station or mobile station shall set this field according to<br><br>Table Table 39. |
| NUM_CIRC_BUF_FRAMES | 0 or 8 | Number of full-rate frames in the circular buffer field.<br><br>The mobile station or base station shall set this field to indicate the desired size of the circular buffer frames. This field is present only if the FRAME_SOURCE field is set to '01'. If the control directive is a mobile station proposal and the base station cannot support the proposed buffer size, the base station shall set this field to the maximum number of frames it can support during that call for that channel. |

[PA000107]

101

| Field | Length (bits) | Definition |
|---|---|---|
| ON_TO_OFF_PROB | 0 or 8 | "On" state to "Off" state transition probability field.<br><br>This frame is only present if the FRAME_ACTIVITY field has a value of 1. The base station or mobile station shall set this field to the<br><br>ROUND(Desired "On" to "Off" state transition probability * 100). The valid range for this field is between '00000000' and '01100100'. |
| OFF_TO_ON_PROB | 0 or 8 | "Off" state to "On" state transition probability field.<br><br>This frame is only present if the FRAME_ACTIVITY field has a value of 1. The base station or mobile station shall set this field to the<br><br>ROUND(Desired "Off" to "On" state transition probability * 100). The valid range for this field is between '00000000' and '01100100'. |
| TX_ON_PERIOD | 0 or 8 | Transmission on period field.<br><br>This frame is only present if the FRAME_ACTIVITY field has a value of 0. The base station or mobile station shall set this field to the desired number of adjacent frame periods (20 ms, 40 ms, or 80 ms). The TDSO shall supply non-blank data frames to the multiplex sublayer before passing blank frames to it for the number of frame periods indicated by the TX_OFF_PERIOD field. |
| TX_OFF_PERIOD | 0 or 8 | Transmission off period field.<br><br>This frame is only present if the FRAME_ACTIVITY field has a value of '0'. The base station or mobile station shall set this field to the desired number of adjacent frame periods (20 ms, 40 ms, or 80 ms). The TDSO shall supply blank frames to the multiplex sublayer after passing non-blank frames to it for the number of frame periods indicated by the TX_ON_PERIOD field. |

[PA000107]

102

| Field | Length (bits) | Definition |
|---|---|---|
| DATA_PATTERN | 0 or 8 | Data pattern field.<br><br>This frame is only present if the DATA_SOURCE field has a value of '0'. The mobile station or base station shall set this field to the selectable byte pattern to be used for the test corresponding to the type of traffic that is generated during the test call. |

Table 34 CONTROL_CODE codes

| CONTROL_CODE | Meaning |
|---|---|
| '00000000' | Mobile station proposed control directive |
| '00000001' | Base station control directive |
| '00000010' | Base station control directive based on mobile station proposal |
| '00000011' | Base station control directive based on mobile station proposal (number of frames in circular buffer not supported – NUM_CIRC_BUF_FRAMES field indicates maximum number of frames base station can support) |
| '00000100' | Base station control directive based on mobile station proposal (message cannot be handled by the current base station configuration) |
| '00000101' | Base station control directive based on mobile station proposal (message structure not acceptable) |
| '00000110' | Base station control directive based on mobile station proposal (unable to support a value of '10' for the FRAME_SOURCE field as indicated in Table 44, that is, cannot generate 1 frame each frame period) |
| '00000111' – '11111111' | Reserved |

[PA000107]

Table 35 DATA_SOURCE codes

| DATA_SOURCE | Traffic pattern |
|---|---|
| '0' | Selectable data pattern |
| '1' | Pseudo-random bits |

Table 36 FRAME_ACTIVITY codes

| FRAME_ACTIVITY | Type |
|---|---|
| '0' | Deterministic frame activity |
| '1' | Random frame activity |

Table 37 CHANNEL_DIRECTION codes

| CHANNEL_DIRECTION | Channel types |
|---|---|
| '00' | Both forward and reverse link directions |
| '01' | Forward link direction only |
| '10' | Reverse link direction only |
| '11' | Reserved |

Table 38 FRAME_SOURCE codes

| FRAME_SOURCE | Circular buffer composition |
|---|---|
| '00' | 2 full-rate frames |
| '01' | N full-rate frames |
| '10' | New frame every frame period (20 ms, 40 ms, or 80 ms) |
| '11' | Reserved |

[PA000107]

104

Table 39 TEST_OPTIONS codes

| TEST_OPTIONS | TDSO Test Options |
|---|---|
| '00000000' - '11111111' | Reserved |

Counter retrieval

When the base station or mobile station sends a *Service Option Control Message* to retrieve counter values from the other end for any of the Fundicated channels (FCH/DCCH), it shall include the type-specific fields as specified in Table 40.

Table 40 Type-specific fields in a *Service Option Control Message* used for counter retrieval on the FCH/DCCH

| Field | Length (bits) | Definition |
|---|---|---|
| CTL_REC_TYPE ("00000101' or "00000110") | 8 | Control record type field.<br>The mobile station or base station shall set this field to '00000101' to signify a counter retrieval directive on the FCH and '00000110' to signify a counter retrieval directive on the DCCH. |
| VECT_COUNTER_ID | 8 | Vector counter identification field.<br>The base station or mobile station shall set this field to correspond to the value shown in Table 41 for the Fundicated Channels and in corresponding to the desired vector of counter values. |

[PA000107]

105

Table 41 VECT_COUNTER_ID codes for FCH/DCCH

| VECT_COUNTER_ID | Vector name |
|---|---|
| '00000000' | FER counters |
| '00000001' | Receive Expected Counters Response |
| '00000010' | Transmitted counters |
| '00000011' | 5 ms Frame Transmitted counters |
| '00000100' | 5 ms Frame Received counters |
| '00000101'-'11111111' | Reserved |

When the base station or mobile station sends a *Service Option Control Message* to retrieve counter values from the other end for the SCHs, it shall include the type-specific fields as specified in Table 42.

Table 42 Type-specific fields in a *Service Option Control Message* used for counter retrieval from the mobile station for SCHs

| Field | Length (bits) | Definition |
|---|---|---|
| CTL_REC_TYPE ('00000111' or '00001000') | 8 | Control record type field. The base station or mobile station shall set this field to signify a counter retrieval directive on the Supplemental Channels. For the SCH0 and SCH1 channels, the field shall be set to '00000111' and '00001000', respectively. |
| VECT_COUNTER_ID | 8 | Vector counter identification field. The base station or mobile station shall set this field to correspond to the value shown in Table 43 corresponding to the desired vector of counter values. |

Table 43 VECT_COUNTER_ID codes for SCHs

[PA000107]

106

| VECT_COUNTER_ID | Vector name |
|---|---|
| '00000000' | FER counters response |
| '00000001' | PER |
| '00000010' | Transmitted counters response |
| '00000011' - '11111111' | Reserved |

Counter responses on the fundicated channels

FER Counters Response

When the mobile station or base station sends a FER Counters Response for the FCH or DCCH channels, it shall include the following type-specific fields in the *Service Option Control Message*:

[PA000107]

Table 44 Type-specific fields in a *Service Option Control Message* corresponding to FER Counters Response on FCH/DCCH

| Field | Length (bits) | Definition |
|---|---|---|
| CTL_REC_TYPE ('00000101' or '00000110') | 8 | Control record type field.<br><br>The mobile station or base station shall set this field to '00000101' when responding to an FCH Control directive and '00000110' for DCCH. |
| VECT_COUNTER_ID ('00000000') | 8 | Vector counter identification field.<br><br>The mobile station or base station shall set this field to '00000000'. |
| TDSO_E1_R1 | 24 | Counter for Rate 1 data blocks received error free.<br><br>The mobile station shall set this field to the value of TDSO_E1_R1 stored in the FFCH_BUFFER or FDCCH_BUFFER modulo $2^{24}$.<br><br>The base station shall set this field to the value of TDSO_E1_R1 stored in the RFCH_BUFFER or RDCCH_BUFFER modulo $2^{24}$. |
| TDSO_E1_RBAD | 24 | Number of Rate 1 data blocks received in error.<br><br>The mobile station shall compute this value using counter values stored in the FFCH_BUFFER or FDCCH_BUFFER as follows:<br>TDSO_E1_RBAD = (TDSO_E1_RERR + TDSO_E1_RD + TDSO_E1_RE + TDSO_E1_RO + TDSO_E1_RB + TDSO_E1_RFL) mod $2^{24}$.<br><br>The base station shall compute this value using counter values stored in the RFCH_BUFFER or RDCCH_BUFFER as follows:<br>TDSO_E1_RBAD = (TDSO_E1_RERR + TDSO_E1_RD + TDSO_E1_RE + TDSO_E1_RO + TDSO_E1_RB + TDSO_E1_RFL) mod $2^{24}$. |

[PA000107]

108

| Field | Length (bits) | Definition |
|---|---|---|
| TDSO_EN_RN | 24 | Counter for blank frames received as null frames. <br><br> The mobile station shall set this field to the value of TDSO_EN_RN stored in the FFCH_BUFFER or FDCCH_BUFFER modulo $2^{24}$. <br><br> The base station shall set this field to the value of TDSO_EN_RN stored in the RFCH_BUFFER/RDCCH_BUFFER modulo $2^{24}$. |
| TDSO_EN_RBAD | 24 | Number of null data blocks received in error. <br><br> The mobile station shall compute this value using counter values stored in the FFCH_BUFFER or FDCCH_BUFFER as follows: <br> TDSO_EN_RBAD = (TDSO_EN_RB + TDSO_EN_RO) mod $2^{24}$. <br><br> The base station shall compute this value using counter values stored in the RFCH_BUFFER or RDCCH_BUFFER as follows: <br> TDSO_EN_RBAD = (TDSO_EN_RB + TDSO_EN_RO) mod $2^{24}$. |
| TDSO_Ex_RBAD | 24 | Number of bad overall data blocks. <br><br> The mobile station shall compute this value using counter values stored in the FFCH_BUFFER or FDCCH_BUFFER as follows: <br> TDSO_Ex_RBAD = (TDSO_E1_RBAD + TDSO_EN_RB + TDSO_EN_RO) mod $2^{24}$. <br><br> The base station shall compute this value using counter values stored in the RFCH_BUFFER or RDCCH_BUFFER as follows: <br> TDSO_Ex_RBAD = (TDSO_E1_RBAD + TDSO_EN_RB + TDSO_EN_RO) mod $2^{24}$. |

[PA000107]

109

Receive Expected Counters Response

When the mobile station or base station sends a Receive Expected Counters Response, it shall include the following type-specific fields in *the Service Option Control Message*:

Table 45 Type-specific fields in a *Service Option Control Message* corresponding to Receive Expected Counters Response on FCH/DCCH

| Field | Length (bits) | Definition |
|---|---|---|
| CTL_REC_TYPE ('00000101' or '00000110') | 8 | Control record type field.<br>The mobile station shall set this field to '00000101' when responding to an FCH Control directive and '00000110' for DCCH. |
| VECT_COUNTER_ID ('00000001') | 8 | Vector counter identification field.<br>The mobile station shall set this field to '00000001'. |
| TDSO_E1_R1 | 24 | Counter for Rate 1 frames received error-free.<br>The mobile station shall set this field to the value of TDSO_E1_R1 stored in the FFCH_BUFFER or FDCCH_BUFFER, modulo $2^{24}$.<br>The base station shall set this field to the value of TDSO_E1_R1 stored in the RFCH_BUFFER or RDCCH_BUFFER, modulo $2^{24}$. |
| TDSO_E1_RD | 24 | Counter for the number of dim-and-burst frames received given that the expected data block was Rate 1.<br>The mobile station shall set this field to the value of TDSO_E1_RD stored in the FFCH_BUFFER or FDCCH_BUFFER, modulo $2^{24}$.<br>The base station shall set this field to the value of TDSO_E1_RD stored in the RFCH_BUFFER or RDCCH_BUFFER, modulo $2^{24}$. |

[PA000107]

110

| Field | Length (bits) | Definition |
|---|---|---|
| TDSO_E1_RO | 24 | Counter for the number of any other frames received (excluding dim-and-burst types) given that the expected data block was Rate 1.<br><br>The mobile station shall set this field to the value of TDSO_E1_RO stored in the FFCH_BUFFER or FDCCH_BUFFER, modulo $2^{24}$.<br><br>The base station shall set this field to the value of TDSO_E1_RO stored in the RFCH_BUFFER or RDCCH_BUFFER, modulo $2^{24}$. |
| TDSO_E1_RB | 24 | Counter for the number of blank-and-burst frames received given that the expected data block was Rate 1.<br><br>The mobile station shall set this field to the value of TDSO_E1_RB stored in the FFCH_BUFFER or FDCCH_BUFFER, modulo $2^{24}$.<br><br>The base station shall set this field to the value of TDSO_E1_RB stored in the RFCH_BUFFER or RDCCH_BUFFER, modulo $2^{24}$. |
| TDSO_E1_RFL[1] | 24 | Counter for the number of Rate 1 frames with bit errors received (a categorization only applicable with the Multiplex option[2]) given that the expected data block was Rate 1.<br><br>The mobile station shall set this field to the value of TDSO_E1_RFL stored in the FFCH_BUFFER or FDCCH_BUFFER, modulo $2^{24}$.<br><br>The base station shall set this field to the value of TDSO_E1_RFL stored in the RFCH_BUFFER or RDCCH_BUFFER, modulo $2^{24}$. |

[PA000107]

111

| Field | Length (bits) | Definition |
|---|---|---|
| TDSO_E1_RE | 24 | Counter for the number of frames received with Insufficient frame quality (erasure) given that the expected data block was Rate 1.<br><br>The mobile station shall set this field to the value of TDSO_E1_RE stored in the FFCH_BUFFER or FDCCH_BUFFER, modulo $2^{24}$.<br><br>The base station shall set this field to the value of TDSO_E1_RE stored in the RFCH_BUFFER or RDCCH_BUFFER, modulo $2^{24}$. |
| TDSO_E1_RERR | 24 | Counter for the number of Rate 1 frames received with bit errors (detected by the TDSO) given that the expected data block was Rate 1.<br><br>The mobile station shall set this field to the value of TDSO_E1_RERR stored in the FFCH_BUFFER or FDCCH_BUFFER, modulo $2^{24}$.<br><br>The base station shall set this field to the value of TDSO_E1_RERR stored in the RFCH_BUFFER or RDCCH_BUFFER, modulo $2^{24}$. |
| TDSO_EN_RN | 24 | Counter for the number of null frames received given that the expected data block was also null.<br><br>The mobile station shall set this field to the value of TDSO_EN_RN stored in the FFCH_BUFFER or FDCCH_BUFFER, modulo $2^{24}$.<br><br>The base station shall set this field to the value of TDSO_EN_RN stored in the RFCH_BUFFER or RDCCH_BUFFER, modulo $2^{24}$. |

[PA000107]

| Field | Length (bits) | Definition |
|---|---|---|
| TDSO_EN_RB | 24 | Counter for the number of blank frames received given that the expected data block was null.<br><br>The mobile station shall set this field to the value of TDSO_EN_RB stored in the FFCH_BUFFER or FDCCH_BUFFER, modulo $2^{24}$.<br><br>The base station shall set this field to the value of TDSO_EN_RB stored in the RFCH_BUFFER or RDCCH_BUFFER, modulo $2^{24}$. |
| TDSO_EN_RO | 24 | Counter for the number of other categories of MuxPDU received given that the expected frame was null.<br><br>The mobile station shall set this field to the value of TDSO_EN_RO stored in the FFCH_BUFFER or FDCCH_BUFFER, modulo $2^{24}$.<br><br>The base station shall set this field to the value of TDSO_EN_RO stored in the RFCH_BUFFER or RDCCH_BUFFER, modulo $2^{24}$. |

[1] The counter does not get incremented for Multiplex Option 2.

[2] This counter does not get incremented with Multiplex Option 2.

Transmitted Counters Response

When the mobile station or base station sends a Transmitted Counters Response, it shall include the following type-specific fields in the *Service Option Control Message*:

Table 46 Type-specific fields in a *Service Option Control Message* corresponding to Transmitted Counters Response on FCH/DCCH

[PA000107]

| Field | Length (bits) | Definition |
|---|---|---|
| CTL_REC_TYPE ('00000101' or '00000110') | 8 | Control record type field.<br><br>The mobile station or base station shall set this field to '00000101' when responding to an FCH control directive and '00000110' for DCCH. |
| VECT_COUNTER_ID ('00000010') | 8 | Vector counter identification field.<br><br>The mobile station or base station shall set this field to '00000010'. |
| TDSO_E1_T1 | 24 | Counter for Rate 1 frames transmitted with no dim-and-burst or blank-and-burst given that the generated data block was Rate 1.<br><br>The mobile station shall set this field to the value of TDSO_E1_T1 stored in the RFCH_BUFFER or RDCCH_BUFFER, modulo $2^{24}$.<br><br>The base station shall set this field to the value of TDSO_E1_T1 stored in the FFCH_BUFFER or FDCCH_BUFFER, modulo $2^{24}$. |
| TDSO_E1_TD | 24 | Counter for the number of dim-and-burst frames transmitted, given that the generated data block was Rate 1.<br><br>The mobile station shall set this field to the value of TDSO_E1_TD stored in the RFCH_BUFFER or RDCCH_BUFFER, modulo $2^{24}$.<br><br>The base station shall set this field to the value of TDSO_E1_TD stored in the FFCH_BUFFER or FDCCH_BUFFER, modulo $2^{24}$. |
| TDSO_E1_TB | 24 | Counter for the number of blank-and-burst frames transmitted, given that the generated data block was Rate 1.<br><br>The mobile station shall set this field to the value of TDSO_E1_TB stored in the RFCH_BUFFER or RDCCH_BUFFER, modulo $2^{24}$.<br><br>The base station shall set this field to the value of TDSO_E1_TB stored in the FFCH_BUFFER or FDCCH_BUFFER, modulo $2^{24}$. |

[PA000107]

114

| Field | Length (bits) | Definition |
|---|---|---|
| TDSO_EB_TB | 24 | Counter for the number of blank-and-burst frames transmitted, given that the generated data block was blank.<br>The mobile station shall set this field to the value of TDSO_EB_TB stored in the RFCH_BUFFER or RDCCH_BUFFER, modulo $2^{24}$.<br>The base station shall set this field to the value of TDSO_EB_TB stored in the FFCH_BUFFER or FDCCH_BUFFER, modulo $2^{24}$. |
| TDSO_EB_TO | 24 | Counter for the number of other frame types transmitted, given that the generated data block was blank (basically, the counter for the event when the TDSO wants to transmit a blank and the multiplex sublayer also requests a blank frame for the particular frame period).<br>The mobile station shall set this field to the value of TDSO_EB_TO stored in the RFCH_BUFFER or RDCCH_BUFFER, modulo $2^{24}$.<br>The base station shall set this field to the value of TDSO_EB_TO stored in the FFCH_BUFFER or FDCCH_BUFFER, modulo $2^{24}$. |

5 ms Frame Transmitted Counters Response

When the mobile station sends a 5 ms Frame Transmitted Counters Response, it shall include the following type-specific fields in the *Service Option Control Message*:

[PA000107]

Table 47 Type-specific fields in a *Service Option Control Message* corresponding to 5 ms Frame Transmitted Counters Response on FCH/DCCH

| Field | Length (bits) | Definition |
|---|---|---|
| CTL_REC_TYPE ('00000101' or '00000110') | 8 | Control record type field.<br>The mobile station or base station shall set this field to '00000101' when responding to an FCH control directive and '00000110' for DCCH. |
| VECT_COUNTER_ID ('00000011') | 8 | Vector counter identification field.<br>The mobile station shall set this field to '00000011'. |
| TDSO_MUX1_5ms_T1 | 24 | Counter for 5 ms transmitted.<br>If CTL_REC_TYPE is set to '00000101', the mobile station shall set this field to the value of MUX1_REV_FCH_5_ms (see [5]) stored in mobile station, modulo $2^{24}$, at the ACTION_TIME specified by this *Service Option Control Message*.<br>Otherwise, the mobile station shall set this field to the value of MUX1_REV_DCCH_5_ms (see [5]) stored in mobile station, modulo $2^{24}$, at ACTION_TIME specified by this *Service Option Control Message*. |
| TDSO_MUX2_5ms_T1 | 24 | Counter for 5 ms transmitted.<br>If CTL_REC_TYPE is set to '00000101', the mobile station shall set this field to the value of MUX2_REV_FCH_5_ms (see [5]) stored in mobile station, modulo $2^{24}$, at the ACTION_TIME specified by this *Service Option Control Message*.<br>Otherwise, the mobile station shall set this field to the value of MUX2_REV_DCCH_5_ms (see [5]) stored in mobile station, modulo $2^{24}$, at ACTION_TIME specified by this *Service Option Control Message*. |

5 ms Frame Received Counters Response

When the mobile station sends a 5 ms Frame Received Counters Response, it shall include the following type-specific fields in the *Service Option Control Message*:

[PA000107]

116

Table 48 Type-specific fields in a *Service Option Control Message* corresponding to 5 ms Frame Received Counters Response on FCH/DCCH

| Field | Length (bits) | Definition |
|---|---|---|
| CTL_REC_TYPE ('00000101' or '00000110') | 8 | Control record type field.<br>The mobile station or base station shall set this field to '00000101' when responding to an FCH control directive and '00000110' for DCCH. |
| VECT_COUNTER_ID ('00000100') | 8 | Vector counter identification field.<br>The mobile station shall set this field to '00000100'. |
| TDSO_MUX1_5ms_R1 | 24 | Counter for 5 ms received.<br>If CTL_REC_TYPE is set to '00000101', the mobile station shall set this field to the value of MUX1_FOR_FCH_5_ms (see [5]) stored in mobile station, modulo $2^{24}$, at the ACTION_TIME specified by this *Service Option Control Message*.<br>Otherwise, the mobile station shall set this field to the value of MUX1_FOR_DCCH_5_ms (see [5]) stored in mobile station, modulo $2^{24}$, at ACTION_TIME specified by this *Service Option Control Message*. |
| TDSO_MUX2_5ms_R1 | 24 | Counter for 5 ms received.<br>If CTL_REC_TYPE is set to '00000101', the mobile station shall set this field to the value of MUX2_FOR_FCH_5_ms (see [5]) stored in mobile station, modulo $2^{24}$, at the ACTION_TIME specified by this *Service Option Control Message*.<br>Otherwise, the mobile station shall set this field to the value of MUX2_FOR_DCCH_5_ms (see [5]) stored in mobile station, modulo $2^{24}$, at ACTION_TIME specified by this *Service Option Control Message*. |

[PA000107]

117

Counter responses on the Supplemental Channels

FER counters response

When the mobile station or base station sends an FER Counters Response, it shall include the following type-specific fields in the *Service Option Control*
*Message*:

Table 49 Type-specific fields in a *Service Option Control Message* corresponding to FER Counters Response on SCH(s)

| Field | Length (bits) | Definition |
| --- | --- | --- |
| CTL_REC_TYPE ('00000111'-'00001000') | 8 | Control record type field. The mobile station shall set this field to '00000111' or '00001000', respectively, when responding to an SCH0 or SCH1 control directive. |
| VECT_COUNTER_ID ('00000000') | 8 | Vector counter identification field. The mobile station or base station shall set this field to '00000000'. |
| TDSO_ENx_RNx | 24 | Counter for Nx9.6 or Nx14.4 frames received error-free. The mobile station shall set this field to the value of TDSO_ENx_RNx stored in the FSCH0_BUFFER or FSCH1_BUFFER, modulo $2^{24}$. The base station shall set this field to the value of TDSO_ENx_RNx stored in the RSCH0_BUFFER or RSCH1_BUFFER, modulo $2^{24}$. |

[PA000107]

118

| Field | Length (bits) | Definition |
|---|---|---|
| TDSO_ENx_RBAD | 24 | Number of bad frames received instead of Nx9.6 or Nx14.4 frames.<br><br>The mobile station shall compute this value using counter values stored in the FSCH0_BUFFER or FSCH1_BUFFER as follows:<br>TDSO_ENx_RBAD = (TDSO_ENx_RERR + TDSO_ENx_RE + TDSO_ENx_RB) mod $2^{24}$.<br><br>The base station shall compute this value using counter values stored in the RSCH0_BUFFER or RSCH1_BUFFER as follows:<br>TDSO_ENx_RBAD = (TDSO_ENx_RERR + TDSO_ENx_RE + TDSO_ENx_RB) mod $2^{24}$. |
| TDSO_EB_RB | 24 | Counter for blank frames received as blank frames.<br><br>The mobile station shall set this field to the value of TDSO_EB_RB stored in the FSCH0_BUFFER or FSCH1_BUFFER, modulo $2^{24}$.<br><br>The base station shall set this field to the value of TDSO_EB_RB stored in the RSCH0_BUFFER or RSCH1_BUFFER, modulo $2^{24}$. |
| TDSO_EB_RBAD | 24 | Number of bad frames received instead of blank frames.<br><br>The mobile station shall compute this value using counter values stored in the FSCH0_BUFFER or FSCH1_BUFFER as follows:<br>TDSO_EB_RBAD = (TDSO_EB_RO) mod $2^{24}$.<br><br>The base station shall compute this value using counter values stored in the RSCH0_BUFFER or RSCH1_BUFFER as follows:<br>TDSO_EB_RBAD = (TDSO_EB_RO) mod $2^{24}$. |

[PA000107]

119

| Field | Length (bits) | Definition |
|---|---|---|
| TDSO_Ex_RBAD | 24 | Number of bad overall frames.<br><br>The mobile station shall compute this value using counter values stored in the FSCH0_BUFFER or FSCH1_BUFFER as follows:<br><br>TDSO_E1_RBAD = (TDSO_ENx_RBAD + TDSO_EB_RO) mod $2^{24}$.<br><br>The base station shall compute this value using counter values stored in the RSCH0_BUFFER or RSCH1_BUFFER as follows:<br><br>TDSO_E1_RBAD = (TDSO_ENx_RBAD + TDSO_EB_RO) mod $2^{24}$. |

PER Counters Response

When the mobile station or base station sends a PER Counters Response, it shall include the following type-specific fields in *the Service Option Control Message*:

Table 50 Type-specific fields in a *Service Option Control Message* corresponding to PER Counters response on SCH(s)

| Field | Length (bits) | Definition |
|---|---|---|
| CTL_REC_TYPE ('00000111' or '00001000') | 8 | Control record type field.<br><br>The mobile station shall set this field to '00000111' or '00001000', respectively, when responding to an SCH0 or SCH1 control directive. |
| VECT_COUNTER_ID ('00000001') | 8 | Vector counter identification field.<br><br>The mobile station shall set this field to '00000001'. |

[PA000107]

120

| Field | Length (bits) | Definition |
|---|---|---|
| TDSO_E3_R3 | 24 | Counter for Rate 3 frames received error-free.<br><br>The mobile station shall set this field to the value of TDSO_E3_R3 stored in the FSCH0_BUFFER or FSCH1_BUFFER, modulo $2^{24}$.<br><br>The base station shall set this field to the value of TDSO_E3_R3 stored in the RSCH0_BUFFER or RSCH1_BUFFER, modulo $2^{24}$. |
| TDSO_E3_RERR | 24 | Counter for Rate 3 frames received with errors detected by the TDSO.<br><br>The mobile station shall set this field to the value of TDSO_E3_RERR stored in the FSCH0_BUFFER or FSCH1_BUFFER, modulo $2^{24}$.<br><br>The base station shall set this field to the value of TDSO_E3_RERR stored in the RSCH0_BUFFER or RSCH1_BUFFER, modulo $2^{24}$. |
| TDSO_E3_RE | 24 | Counter for expected Rate 3 frames received as erasures.<br><br>The mobile station shall set this field to the value of TDSO_E3_RE stored in the FSCH0_BUFFER or FSCH1_BUFFER, modulo $2^{24}$.<br><br>The base station shall set this field to the value of TDSO_E3_RE stored in the RSCH0_BUFFER or RSCH1_BUFFER, modulo $2^{24}$. |
| TDSO_E2_R2 | 24 | Counter for Rate 2 frames received error-free.<br><br>The mobile station shall set this field to the value of TDSO_E2_R2 stored in the FSCH0_BUFFER or FSCH1_BUFFER, modulo $2^{24}$.<br><br>The base station shall set this field to the value of TDSO_E2_R2 stored in the RSCH0_BUFFER or RSCH1_BUFFER, modulo $2^{24}$. |

[PA000107]

121

| Field | Length (bits) | Definition |
|---|---|---|
| TDSO_E2_RERR | 24 | Counter for Rate 2 frames received with errors detected by the TDSO.<br><br>The mobile station shall set this field to the value of TDSO_E2_RERR stored in the FSCH0_BUFFER or FSCH1_BUFFER, modulo $2^{24}$.<br><br>The base station shall set this field to the value of TDSO_E2_RERR stored in the RSCH0_BUFFER or RSCH1_BUFFER, modulo $2^{24}$. |
| TDSO_E2_RE | 24 | Counter for expected Rate 2 frames received as erasures.<br><br>The mobile station shall set this field to the value of TDSO_E2_RE stored in the FSCH0_BUFFER or FSCH1_BUFFER, modulo $2^{24}$.<br><br>The base station shall set this field to the value of TDSO_E2_RE stored in the RSCH0_BUFFER or RSCH1_BUFFER, modulo $2^{24}$. |
| TDSO_E1a_R1a | 24 | Counter for Rate 1a frames received error-free.<br><br>The mobile station shall set this field to the value of TDSO_E1a_R1a stored in the FSCH0_BUFFER or FSCH1_BUFFER, modulo $2^{24}$.<br><br>The base station shall set this field to the value of TDSO_E1a_R1a stored in the RSCH0_BUFFER or RSCH1_BUFFER, modulo $2^{24}$. |
| TDSO_E1a_RERR | 24 | Counter for Rate 1a frames received with errors detected by the TDSO.<br><br>The mobile station shall set this field to the value of TDSO_E1a_RERR stored in the FSCH0_BUFFER or FSCH1_BUFFER, modulo $2^{24}$.<br><br>The base station shall set this field to the value of TDSO_E1a_RERR stored in the RSCH0_BUFFER or RSCH1_BUFFER, modulo $2^{24}$. |

[PA000107]

122

| Field | Length (bits) | Definition |
|---|---|---|
| TDSO_E1a_RE | 24 | Counter for expected Rate 1a frames received as erasures.<br><br>The mobile station shall set this field to the value of TDSO_E1a_RE stored in the FSCH0_BUFFER or FSCH1_BUFFER, modulo $2^{24}$.<br><br>The base station shall set this field to the value of TDSO_E1a_RE stored in the RSCH0_BUFFER or RSCH1_BUFFER, modulo $2^{24}$. |
| TDSO_E1b_R1b | 24 | Counter for Rate 1b frames received error-free.<br><br>The mobile station shall set this field to the value of TDSO_E1b_R1b stored in the FSCH0_BUFFER or FSCH1_BUFFER, modulo $2^{24}$.<br><br>The base station shall set this field to the value of TDSO_E1b_R1b stored in the RSCH0_BUFFER or RSCH1_BUFFER, modulo $2^{24}$. |
| TDSO_E1b_RERR | 24 | Counter for Rate 1b frames received with errors detected by the TDSO.<br><br>The mobile station shall set this field to the value of TDSO_E1b_RERR stored in the FSCH0_BUFFER or FSCH1_BUFFER, modulo $2^{24}$.<br><br>The base station shall set this field to the value of TDSO_E1b_RERR stored in the RSCH0_BUFFER or RSCH1_BUFFER, modulo $2^{24}$. |
| TDSO_E1b_RE | 24 | Counter for expected Rate 1b frames received as erasures.<br><br>The mobile station shall set this field to the value of TDSO_E1b_RE stored in the FSCH0_BUFFER or FSCH1_BUFFER, modulo $2^{24}$.<br><br>The base station shall set this field to the value of TDSO_E1b_RE stored in the RSCH0_BUFFER or RSCH1_BUFFER, modulo $2^{24}$. |

[PA000107]

123

Transmitted Counters response

When the mobile station or base station sends a Transmitted Counters Response, it shall include the following type-specific fields in the *Service Option Control Message*:

Table 51 Type-specific fields in a *Service Option Control Message* corresponding to Transmitted Counters response on SCH(s)

| Field | Length (bits) | Definition |
|---|---|---|
| CTL_REC_TYPE ('00000111' or '00001000') | 8 | Control record type field.<br>The mobile station shall set this field to '00000111' or '00001000', respectively, when responding to an SCH0 or SCH1 control directive. |
| VECT_COUNTER_ID ('00000010') | 8 | Vector counter identification field.<br>The mobile station shall set this field to '00000010'. |
| TDSO_ENx_TNx | 24 | Counter for Rate Nx9.6 or Rate Nx14.4 frames transmitted with no blank command from the multiplex sublayer.<br>The mobile station shall set this field to the value of TDSO_ENx_TNx stored in the RSCH0_BUFFER or RSCH1_BUFFER, modulo $2^{24}$. |
| TDSO_ENx_TB | 24 | Counter for the number of blank frames transmitted given that the generated frame was Rate Nx9.6 or Rate Nx14.4.<br>The mobile station shall set this field to the value of TDSO_ENx_TB stored in the RSCH0_BUFFER or RSCH1_BUFFER, modulo $2^{24}$. |
| TDSO_EB_TB | 24 | Counter for the number of blank frames transmitted, given that the generated frame was blank.<br>The mobile station shall set this field to the value of TDSO_EB_TB stored in the RSCH0_BUFFER or RSCH1_BUFFER, modulo $2^{24}$. |

[PA000107]

124

| Field | Length (bits) | Definition |
|---|---|---|
| TDSO_EB_TO | 24 | Counter for the number of other frame types transmitted given that the generated frame was blank (basically, the counter for the event when the TDSO wants to transmit a blank and the multiplex sublayer also requests a blank frame for the particular frame period).<br><br>The mobile station shall set this field to the value of TDSO_EB_TO stored in the RSCH0_BUFFER or RSCH1_BUFFER, modulo $2^{24}$. |

TDSO Call Flow Examples (for a system operating in MC-41 mode)

This annex contains examples of TDSO call flows using service negotiation.

Figure 5 to Figure 7 use the following convention:

- All messages are received without error.
- Acknowledgments are not shown.

| Mobile Station | | | | Base Station |
|---|---|---|---|---|
| Detects user-initiated call. | | | | |
| Sends *Origination Message* specifying the TDSO service option. | > | r-csch | > | Sets up Fundicated Traffic Channel(s). |
| | | | | Begins sending null Traffic Channel data. |
| Sets up Fundicated Traffic Channel.<br><br>Receives N$_{5m}$ consecutive valid frames. | < | f-csch | < | Sends *Extended Channel Assignment Message*. |
| Begins sending the Traffic Channel preamble. | > | r-dtch | > | Acquires the Reverse Fundicated Traffic Channel. |
| Begins transmitting null Traffic Channel data. | < | f-dsch | < | Sends *Base Station Acknowledgment Order*. |

[PA000107]
125
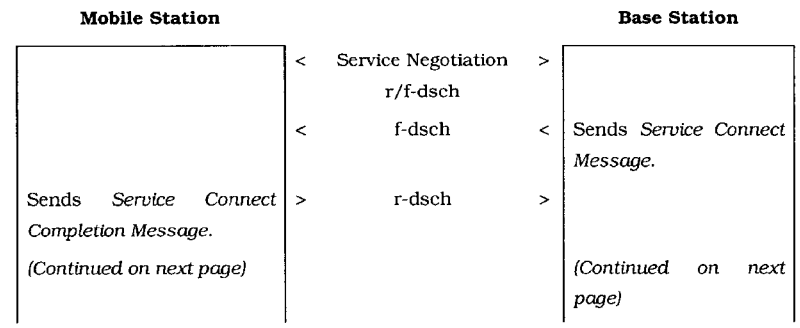
Figure 5. Mobile station origination example with transmission on DCCH/FCH/SCH (part 1 of 2)

[PA000107]

126

| Mobile Station | | | | Base Station |
|---|---|---|---|---|
| Enters the *Conversation Substate*, and connects the TDSO service option at the action time specified in the *Service Connect Message*. Generates Rate 1 frames (by default all 1s) from the time of service option connection to the frame prior to the first synchronization frame. At the first synchronization frame, resynchronizes the TDSO. | < | dsch/dtch | > | Connects and initializes the TDSO service option following the action time specified in the *Service Connect Message*. |
| Sends *Supplemental Channel Request Message* and continues transmitting on the Reverse Traffic Channel. | > | r-dsch | > | |
| | < | f-dsch/f-dtch | > | Allocates Supplemental Channel(s) through ESCAM, FSCAMM, RSCAMM, or UHDM. |

[PA000107]
127
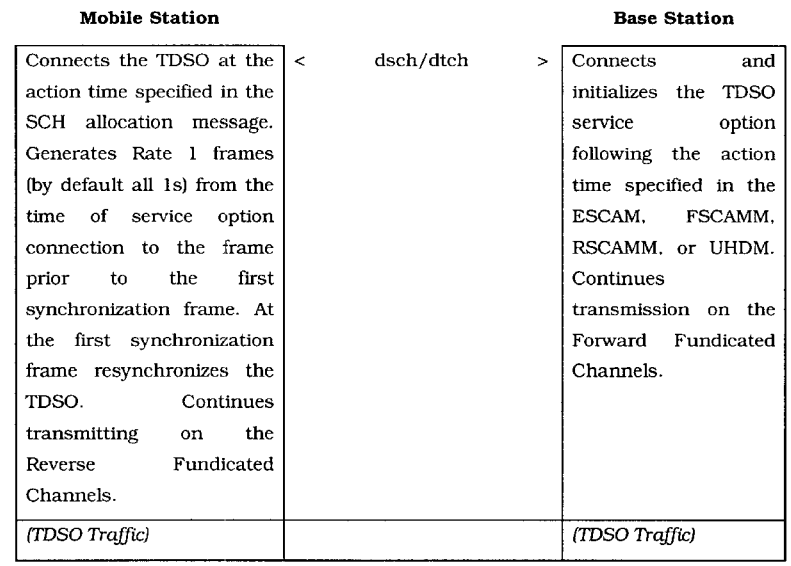
Figure 6. Mobile station origination example with transmission on DCCH/FCH/SCH (part 2 of 2)
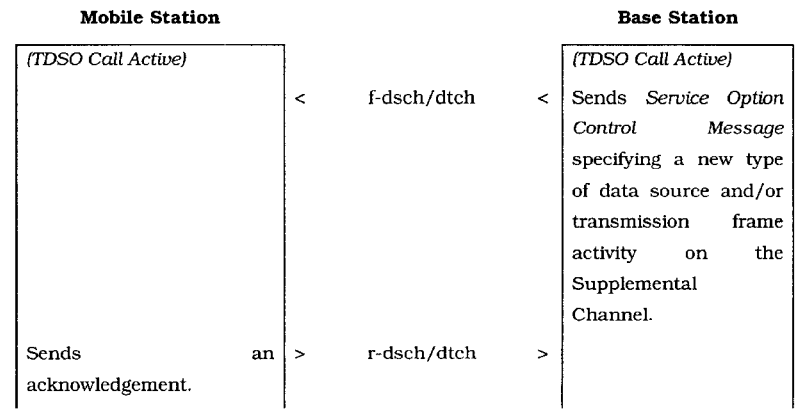

[PA000107]

128

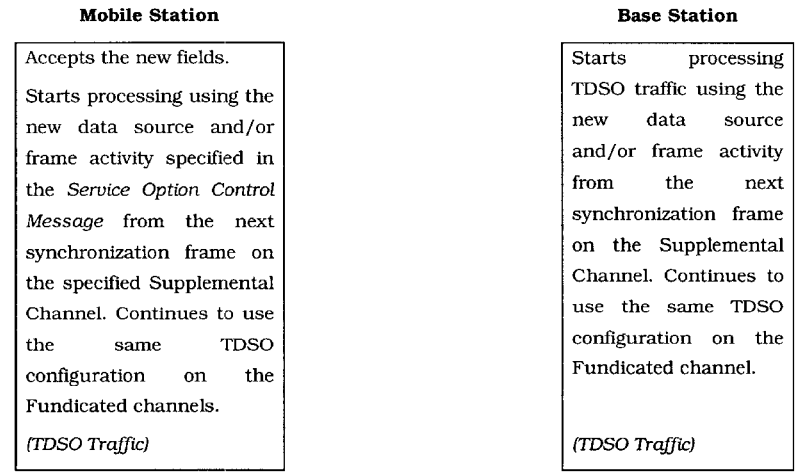

Figure 7. Base station commanded test parameters change

No text.

TDSO Operation Examples

B.1 A TDSO scenario

This annex provides two examples of TDSO test scenarios. Assume the following:

- The TDSO is configured to carry primary traffic over the FCH in both forward and reverse directions and on SCH0 in only the forward direction.

- The mobile station and base station are configured to support the RC3 configuration for the test setup.

- The TDSO is passing pseudo-randomly generated data blocks to the mux sublayer per Multiplex Option 0x01 on the FCH (that is, one MuxPDU Type 1 data block can be passed to the multiplex sublayer every 20 ms).

- SCH0 is configured for 20 ms frame length, has been allocated to support 19.2 kbps, and carries TDSO-generated pseudo-random data bits per Multiplex Option 0x809 format (that is, two single-sized MuxPDU Type 3 data blocks can be supplied to the multiplex sublayer every 20 ms).

- p is equal to 0.7 and q is equal to 0.3. Then, $D = q/(p+q) = 0.3$, $B = 1/p = 1.4$, OFF_THRESHOLD = ROUND(16777215 * p) = 11744051 and ON_THRESHOLD = ROUND(16777215 * q) = 5033164.

[PA000107]

129

- The TDSO option has been running for some time and, at the first synchronization frame after the TDSO was initialized (corresponding to the action time associated with the *Service Connect Message*), the 31_BIT_PN_NUM, which supplies the 24_BIT_PIN_NUM to drive the TDSO_STATE transitions (see 0), was initialized and iterated as illustrated in Figure 4 once every frame period after that. Assume the 31_BIT_PN_NUM has a current value equal to 0x682dff0c and the current Markov chain is in the "Off" state.

B.2 Fundamental Channel TDSO process

Assume that in this stated mode the TDSO is about to transmit frame number 0xab89efad on the Forward Fundamental Traffic Channel (F-FCH) to a mobile station with the least-significant 32 bits of Public Long-Code Mask (PLCM) equal to 0x9F000307. Since the least significant 9 bits of (0xab89efad xor 0x2aaaaaaa) equal 0x107, and the least significant 9 bits of the PLCM are 0x0107, it is time to resynchronize the F-FCH TDSO process. The pseudo-random number generator associated with F-FCH is initialized with F-FRNG (FRNG for the Forward Fundamental Channel) set equal to the 31 least-significant bits of (0xab89efad or 0x2aaaaaaa) = 0x01234507 as follows (see 0):

| | |
|---|---|
| 01234507 | (F-FRNG: starting value for the Synchronization Frame) |
| 3288cf26 | (F-FRNG: 1st iteration) |
| 33d7e1b5 | (F-FRNG: 2nd iteration) |
| 22234caa | (F-FRNG: 3rd iteration) |
| 3b7e3e68 | (F-FRNG: 4th iteration) |

After reinitialization, the Forward Fundamental Traffic Channel TDSO service option would compute $y_n(1) = FRNG/128 = 0x3b7e3e68/128 = 0x76fc7c$. The least-significant 6 bits of $y_n(1)$, $O_n$, is equal to 0x3c, or 60. $O_n$ mod $B(n)$ (see Table ) for the values of $B(n)$, for RC3 $B(n) = 45$) determines the byte offset in the circular buffer (where to begin copying data bits into blocks for the multiplex sublayer).

For the synchronization frame, the offset is taken with respect to the first-generated byte in the circular buffer; whereas for subsequent System Time frames, the byte address next to that of the last-packed byte from the previous

[PA000107]

130 frame serves as the reference. The TDSO always advances this pointer in the circular buffer according to the value of $O_n$, irrespective of whether any data bits were actually passed to the multiplex sublayer during that frame period as determined by the value of 24_BIT_PN_NUM.

For the F-FCH, the TDSO generates 45 bytes through random number iterations. These bytes are put together, starting with the same 24-bit number that was used to determine the offset.

|     |                          |                        |
| --- | ------------------------ | ---------------------- |
|     | F-FRNG = 0x3b7e3e68,     | $y_n(1)$ = 0x76fc7c    |
| | F-FRNG = 0x5d333c5b,     | $y_n(2)$ = 0xba6678    |
|     | F-FRNG = 0x4ebfaa2a,     | $y_n(3)$ = 0x9d7f54    |
|     | F-FRNG = 0x093cd3ca,     | $y_n(4)$ = 0x1279a7    |
|     | F-FRNG = 0x78747782,     | $y_n(5)$ = 0xf0e8ef    |
|     | F-FRNG = 0x26523596,     | $y_n(6)$ = 0x4ca46b    |
| | F-FRNG = 0x5f3c1e81,     | $y_n(7)$ = 0xbe783d    |
|     | F-FRNG = 0x63f6d7ff,     | $y_n(8)$ = 0xc7edaf    |
|     | F-FRNG = 0x62ded99e,     | $y_n(9)$ = 0xc5bdb3    |
|     | F-FRNG = 0x14a146c8,     | $y_n(10)$ = 0x29428d   |
|     | F-FRNG = 0x682dff0c,     | $y_n(11)$ = 0xd05bfe   |
| | F-FRNG = 0x23c3a243,     | $y_n(12)$ = 0x478744   |
|     | F-FRNG = 0x00d1ef0d,     | $y_n(13)$ = 0x01a3de   |
|     | F-FRNG = 0x56a53ee6,     | $y_n(14)$ = 0xad4a7d   |
|     | F-FRNG = 0x7ac49a7a,     | $y_n(15)$ = 0xf58934   |

Each 24-bit number $y_n(k)$ is written to the frame buffer in little-endian fashion. So 0x76fc7c becomes the byte stream 0x7c 0xfc 0x76. The little-endian version of the next 24-bit number, 0xba6678, is written immediately after the first number. The circular buffer to be used to generate data blocks for the F-FCH for the next 512 frames is thus organized as follows:

[PA000107]

131

—→7c fc 76 78 66 ba 54 7f 9d a7 79 12 ef e8 f0 6b a4 4c 3d 78 be af ed c7 b3
bd c5 8d 42 29 fe 5b d0 44 87 47 de a3 01 7d 4a ad 34 89 f5—→

Following the procedure outlined in Figure 4, the new pseudo-random number
generator is as follows, assuming the current value of the PN generator for the
TDSO state model is 0x682dff0c:

31_BIT_PN_NUM = (0x682dff0c * a) mod m = 0x23c3a243
      24_BIT_PN_NUM = 31_BIT_PN_NUM >> 7 = 0x478744 = 4687684

As the value of 24_BIT_PN_NUM is less than the ON_THRESHOLD, the TDSO_STATE
turns to ON and, therefore, TDSO shall pass a Rate 1 frame to the multiplex
sublayer during the current frame period.

The starting offset for the first frame in the 512-frame segment is given by $O_n$
mod $B(n)$, which, in this case, is 60 mod 45 = 15. Therefore, the TDSO will
generate a Rate 1 (171-bit) frame that can be supplied to the mux sublayer. The
frame will be comprised of 21 octets from the circular buffer beginning at the
15th byte offset in the circular buffer followed by 3 zero bits as shown:

6b a4 4c 3d 78 be af ed c7 b3 bd c5 8d 42 29 fe 5b d0 44 87 47 '000'

Since this frame is to be carried over the Fundamental Channel, the first 5 bits
of the first octet are replaced by '00000', the CHANNEL_ID code, and PDU_SEQ_NUM
for the FCH as shown in Table and Table 37. Therefore, the final data block
passed to the multiplex sublayer is as follows:

03 a4 4c 3d 78 be af ed c7 b3 bd c5 8d 42 29 fe 5b d0 44 87 47 '000'

For the next TDSO frame, the pseudo-random numbers $y_n(1)$ is as follows:

F-FRNG    $y_n(1)$
      0x0179fe8e  0x02f3fd

    Following the procedure outlined in Figure 4, the new pseudo-random number
generator is as follows:

[PA000107]

132

31_BIT_PN_NUM = (0x23c3a243 * a) mod m = 0x00d1ef0d
24_BIT_PN_NUM = 31_BIT_PN_NUM >> 7 = 0x1a3de = 107486

As the value of 24_BIT_PN_NUM is less than the ON_THRESHOLD, the TDSO_STATE
turns to ON and, therefore, TDSO shall pass a Rate 1 frame to the multiplex
sublayer during the current frame period.

The 6 least-significant bits of $y_n(1)$, $O_n$, is 0x3d = 61. $O_n$ mod 45 = 16 is used to
indicate the byte offset in the circular buffer. The offset is taken with respect to
the byte address next to the last packed byte from the frame generated in the
previous 20 ms period, that is, with respect to the byte 0xde in the buffer.
The TDSO service option will generate and supply a Rate 1 frame using 21
octets from the circular buffer followed by 3 zero bits. The complete data block
looks like the following:

7f 9d a7 79 12 ef e8 f0 6b a4 4c 3d 78 be af ed c7 b3 bd c5 8d '000'

After replacing the first 5 bits with '00000' corresponding to the data block
header for FCH, the data block supplied to the multiplex sublayer, as a data
block, is as follows:

07 9d a7 79 12 ef e8 f0 6b a4 4c 3d 78 be af ed c7 b3 bd c5 8d '000'

The byte offset pointer advances to the byte immediately after 0x8d, that is, 42
for the next frame.

A while later, frame number 0xab89f052 is about to be generated for the
Reverse Fundamental Traffic Channel. Since the least-significant nine bits of
(0xab89f052 xor 0x55555555) equal 0x107, and the least-significant nine bits of
the PLCM are 0x0107, it is time to resynchronize the Reverse Traffic Channel
TDSO process. The associated pseudo-random number generator is initialized
with F-RRNG set equal to the 31 least-significant bits of (0xab89f052 xor
0x55555555) = 0x7edca507 as follows (see 0):

[PA000107]

133

|   | 7edca507 | (F-RRNG starting value for the Synchronization Frame) |
|---|---|---|
|   | 47d6afa2 | (F-RRNG: 1st iteration) |
|   | 5fa4d986 | (F-RRNG: 2nd iteration) |
|   | 3fc51d78 | (F-RRNG: 3rd iteration) |
| | 2611d1fd | (F-RRNG: 4th iteration) |

The Reverse Fundamental Traffic Channel TDSO first computes $y_n(1)$ = RRNG/128 = 0x2611d1fd/128 = 0x4c23a3. For the R-FCH, the TDSO generates 360 bits (two TDSO frames) through random number iterations. These bytes are
put together, starting with the same 24-bit number that was used to determine the offset above.

|    | F-RRNG = 0x2611d1fd, | $y_n(1) = 0x4c23a3$ |
|----|---|---|
|    | F-RRNG = 0x5bf14c91, | $y_n(2) = 0xb7e299$ |
| | F-RRNG = 0x3ed9f2bf, | $y_n(3) = 0x7db3e5$ |
|    | F-RRNG = 0x56cff9d5, | $y_n(4) = 0xad9ff3$ |
|    | F-RRNG = 0x701b3b79, | $y_n(5) = 0xe03676$ |
|    | F-RRNG = 0x0bddbe6f, | $y_n(6) = 0x17bb7c$ |
|    | F-RRNG = 0x0b016f7f, | $y_n(7) = 0x1602de$ |
| | F-RRNG = 0x0b3f007e, | $y_n(8) = 0x167e00$ |
|    | F-RRNG = 0x553955f6, | $y_n(9) = 0xaa72ab$ |
|    | F-RRNG = 0x273ab530, | $y_n(10) = 0x4e756a$ |
|    | F-RRNG = 0x7f4d766e, | $y_n(11) = 0xfe9aec$ |
|    | F-RRNG = 0x369a710d, | $y_n(12) = 0x6d34e2$ |
| | F-RRNG = 0x5574287c, | $y_n(13) = 0xaae850$ |
|    | F-RRNG = 0x3d0e10b8, | $y_n(14) = 0x7a1c21$ |
|    | F-RRNG = 0x666bbf58, | $y_n(15) = 0xccd77e$ |

The circular buffer to be used to generate data blocks for the R-FCH for the next
512 frames is thus organized as follows:

[PA000107]

134

→a3 23 4c 99 e2 b7 e5 b3 7d f3 9f ad 76 36 e0 7c bb 17 de 02 16 00 7e 16 ab 72 aa 6a 75 4e ec 9a fe e2 34 6d 50 e8 aa 21 1c 7a 7e d7 cc→

The 31_BIT_PN_NUM has gone through 164 iterations since the synchronization
time for the Forward Traffic Channel was reached. The current value of the 32_BIT_PN_NUM = 0x4de9620.
Following the procedure outlined in Figure 4, the new pseudo-random number generator is as follows, assuming the current value of the PN generator for the TDSO state model is 0x0x4de9620:

31_BIT_PN_NUM = (0x0x4de9620 * a) mod m = 0x3152115f
    24_BIT_PN_NUM = 31_BIT_PN_NUM >> 7 = 0x62a422 = 4687684 = 6464546

      As the value of 24_BIT_PN_NUM is greater than the ON_THRESHOLD, the TDSO_STATE stays in OFF and, therefore, TDSO shall pass a blank data block (0 bits) to the multiplex sublayer during the current frame period.
The starting offset for the first frame in the 512-frame segment is given by the 6 least-significant bits of $y_n(1)$, $O_n$ mod $B(n)$, which in this case is equal to 0x23
mod 45 or 19.
Even though no frame shall be built in this frame period, the pointer associated with the starting offset for the next frame shall be incremented by 19, that is, the reference byte address for the next frame in the circular buffer is that of byte 02 in the buffer.
For the next TDSO frame, the pseudo-random numbers $y_n(1)$ is as follows:

F-RRNG    $y_n(1)$
    0x2bdf5ef0  0x57bebd

      Following the procedure outlined in Figure 4, the new pseudo-random number generator is as follows:

[PA000107]

135

31_BIT_PN_NUM = (0x3152115f * a)mod m = 0x2f28d45
24_BIT_PN_NUM = 31_BIT_PN_NUM >> 7 = 0x5e51a = 386330

As the value of 24_BIT_PN_NUM is less than the ON_THRESHOLD, the TDSO_STATE
turns to ON, therefore, it shall pass a Rate 1 frame to the multiplex sublayer
during the current frame period.
The 6 least-significant bits of $y_n(1)$, $O_n$, is 0x3d = 61. $O_n$ mod 45 = 16 is used to
indicate the byte offset in the circular buffer. The offset is taken with respect to
the byte address of byte 02 in the buffer as stored in the previous frame.
The TDSO service option will generate and supply a Rate 1 frame using 21
octets from the circular buffer followed by 3 zero bits. The packet derived from
the circular buffer thus looks like this:

6d 50 e8 aa 21 1c 7a 7e d7 cc a3 23 4c 99 e2 b7 e5 b3 7d f3 '000'

However, the first 5 bits are to be replaced by '00000' for the FCH. Therefore,
the data block supplied to the mux sublayer is:

09 50 e8 aa 21 1c 7a 7e d7 cc a3 23 4c 99 e2 b7 e5 b3 7d f3 '000'

The reference byte address for the next frame in the circular buffer is that of
byte 9f in the buffer.
B.3 Supplemental Channel TDSO process
Assume that in this stated mode the TDSO is about to transmit frame number
0xab89efad on the Forward Supplemental Channel (F-SCH0) to a mobile station
with the least-significant 32 bits of PLCM equal to 0x9F000307. Since the least-
significant nine bits of (0xab89efad xor 0x2aaaaaaa) equal 0x107, and the least
significant nine bits of the PLCM are 0x0107, it is time to resynchronize the F-
SCH0 TDSO process. The pseudo-random number generator associated with F-
SCH0 is initialized with S-FRNG0 (FRNG for the Forward Supplemental
Channel 0) set equal to the 31 least-significant bits of (0xab89efad xor
0x2aaaaaaa) = 0x01234507 as follows (see 0):

[PA000107]

136

```
        01234507    (S-FRNG0: starting value for the Synchronization Frame)
        3288cf26    (S-FRNG0: 1st iteration)
        33d7e1b5    (S-FRNG0: 2nd iteration)
        22234caa    (S-FRNG0: 3rd iteration)
        3b7e3e68    (S-FRNG0: 4th iteration)
```

After reinitialization, the Forward Supplemental Channel TDSO service option would compute $y_n(1) = FRNG/128 = 0x3b7e3e68/128 = 0x76fc7c$. The least-significant 6 bits of $y_n(1)$, $O_n$, is equal to 0x3c, or 60. $O_n$ mod B(n) (see Table ) for the values of B(n), for RC3 B(n) = 762) determines the byte offset in the circular buffer from where to begin copying data bits into blocks for the multiplex sublayer.

For the synchronization frame, the offset is taken with respect to the first-generated byte in the circular buffer; whereas for subsequent System Time frames, the byte address next to that of the last-packed byte from the previous frame serves as the reference. The TDSO always advances this pointer in the circular buffer according to the value of $O_n$ mod B(n), irrespective of whether any data bits were actually passed to the multiplex sublayer during that frame period as determined by the value of 24_BIT_PN_NUM.

For the F-SCH0, the TDSO generates 762 bytes (two full-rate RC3 frames) through random number iterations. These bytes are put together, starting with the same 24-bit number that was used to determine the offset.

```
        S-FRNG0 = 0x3b7e3e68,    y_n(1) = 0x76fc7c
        S-FRNG0 = 0x5d333c5b,    y_n(2) = 0xba6678
        S-FRNG0 = 0x4ebfaa2a,    y_n3) = 0x9d7f54
        S-FRNG0 = 0x93cd3ca,     y_n(4) = 0x1279a7
        S-FRNG0 = 0x78747782,    y_n(5) = 0xf0e8ef
        S-FRNG0 = 0x26523596,    y_n(6) = 0x4ca46b
        S-FRNG0 = 0x5f3c1e81,    y_n(7) = 0xbe783d
```

[PA000107]

137

| | | |
|---|---|---|
| | S-FRNG0 = 0x63f6d7ff, | $y_n(8) = $ 0xc7edaf |
| | S-FRNG0 = 0x62ded99e, | $y_n(9) = $ 0xc5bdb3 |
| | S-FRNG0 = 0x14a146c8, | $y_n(10) = $ 0x29428d |
| | S-FRNG0 = 0x682dff0c, | $y_n(11) = $ 0xd05bfe |
| | S-FRNG0 = 0x23c3a243, | $y_n(12) = $ 0x478744 |
| | S-FRNG0 = 0xd1ef0d, | $y_n(13) = $ 0x1a3de |
| | S-FRNG0 = 0x56a53ee6, | $y_n(14) = $ 0xad4a7d |
| | S-FRNG0 = 0x7ac49a7a, | $y_n(15) = $ 0xf58934 |
| | S-FRNG0 = 0x179fe8e, | $y_n(16) = $ 0x2f3fd |
| | S-FRNG0 = 0x70371d63, | $y_n(17) = $ 0xe06e3a |
| | S-FRNG0 = 0x326a8823, | $y_n(18) = $ 0x64d510 |
| | S-FRNG0 = 0x700fcbb0, | $y_n(19) = $ 0xe01f97 |
| | S-FRNG0 = 0x1d05c94a, | $y_n(20) = $ 0x3a0b92 |
| | S-FRNG0 = 0x66e22828, | $y_n(21) = $ 0xcdc450 |
| | S-FRNG0 = 0x9ba8edd, | $y_n(22) = $ 0x13751d |
| | S-FRNG0 = 0x36f95428, | $y_n(23) = $ 0x6df2a8 |
| | S-FRNG0 = 0x2b042a4a, | $y_n(24) = $ 0x560854 |
| | S-FRNG0 = 0x1e747656, | $y_n(25) = $ 0x3ce8ec |
| | S-FRNG0 = 0x700517b8, | $y_n(26) = $ 0xe00a2f |
| | S-FRNG0 = 0x5e586a7c, | $y_n(27) = $ 0xbcb0d4 |
| | S-FRNG0 = 0x7eb72347, | $y_n(28) = $ 0xfd6e46 |
| | S-FRNG0 = 0x296d4b4f, | $y_n(29) = $ 0x52da96 |
| | S-FRNG0 = 0x466b44c8, | $y_n(30) = $ 0x8cd689 |
| | S-FRNG0 = 0x2c70ca96, | $y_n(31) = $ 0x58e195 |
| | S-FRNG0 = 0x210454a5, | $y_n(32) = $ 0x4208a9 |
| | S-FRNG0 = 0x23512d92, | $y_n(33) = $ 0x46a25b |
| | S-FRNG0 = 0x2686de5b, | $y_n(34) = $ 0x4d0dbc |
| | S-FRNG0 = 0x60703c1f, | $y_n(35) = $ 0xc0e078 |
| | S-FRNG0 = 0x687b48af, | $y_n(36) = $ 0xd0f691 |

[PA000107]

138

| | | |
|---|---|---|
| | S-FRNG0 = 0x75e10ebf, | $y_n(37)$ = 0xebc21d |
| | S-FRNG0 = 0xa8f5a0f, | $y_n(38)$ = 0x151eb4 |
| | S-FRNG0 = 0x49619433, | $y_n(39)$ = 0x92c328 |
| | S-FRNG0 = 0x2548c5e8, | $y_n(40)$ = 0x4a918b |
| | S-FRNG0 = 0x4cb91577, | $y_n(41)$ = 0x99722a |
| | S-FRNG0 = 0xb305efb, | $y_n(42)$ = 0x1660bd |
| | S-FRNG0 = 0x14abb67a, | $y_n(43)$ = 0x29576c |
| | S-FRNG0 = 0x15590e30, | $y_n(44)$ = 0x2ab21c |
| | S-FRNG0 = 0x9b27c43, | $y_n(45)$ = 0x1364f8 |
| | S-FRNG0 = 0x24fc17ae, | $y_n(46)$ = 0x49f82f |
| | S-FRNG0 = 0x2276b37a, | $y_n(47)$ = 0x44ed66 |
| | S-FRNG0 = 0x1f012043, | $y_n(48)$ = 0x3e0240 |
| | S-FRNG0 = 0x2ed1e9c, | $y_n(49)$ = 0x5da3d |
| | S-FRNG0 = 0x1d749544, | $y_n(50)$ = 0x3ae92a |
| | S-FRNG0 = 0x50f3b277, | $y_n(51)$ = 0xa1e764 |
| | S-FRNG0 = 0x2f49cc26, | $y_n(52)$ = 0x5e9398 |
| | S-FRNG0 = 0x15f9eb0b, | $y_n(53)$ = 0x2bf3d6 |
| | S-FRNG0 = 0x4ab62a72, | $y_n(54)$ = 0x956c54 |
| | S-FRNG0 = 0x7d9cc8af, | $y_n(55)$ = 0xfb3991 |
| | S-FRNG0 = 0x403b9996, | $y_n(56)$ = 0x807733 |
| | S-FRNG0 = 0x8e067cc, | $y_n(57)$ = 0x11c0cf |
| | S-FRNG0 = 0x44be86a1, | $y_n(58)$ = 0x897d0d |
| | S-FRNG0 = 0x3878d749, | $y_n(59)$ = 0x70f1ae |
| | S-FRNG0 = 0x57e1696, | $y_n(60)$ = 0xafc2d |
| | S-FRNG0 = 0x18fcd4ab, | $y_n(61)$ = 0x31f9a9 |
| | S-FRNG0 = 0x7eee335d, | $y_n(62)$ = 0xfddc66 |
| | S-FRNG0 = 0x486e5fc5, | $y_n(63)$ = 0x90dcbf |
| | S-FRNG0 = 0x4651a3a9, | $y_n(64)$ = 0x8ca347 |
| | S-FRNG0 = 0x19cfd050, | $y_n(65)$ = 0x339fa0 |

[PA000107]

139

| | S-FRNG0 = 0x1a75416d, | $y_n(66) = $ 0x34ea82 |
|---|---|---|
| | S-FRNG0 = 0x81a68ad, | $y_n(67) = $ 0x1034d1 |
| | S-FRNG0 = 0x7dce3a02, | $y_n(68) = $ 0xfb9c74 |
| | S-FRNG0 = 0x6e4299d4, | $y_n(69) = $ 0xdc8533 |
| | S-FRNG0 = 0x568165d9, | $y_n(70) = $ 0xad02cb |
| | S-FRNG0 = 0x4945b5ed, | $y_n(71) = $ 0x928b6b |
| | S-FRNG0 = 0x7fab002f, | $y_n(72) = $ 0xff5600 |
| | S-FRNG0 = 0x33994f24, | $y_n(73) = $ 0x67329e |
| | S-FRNG0 = 0x161adef3, | $y_n(74) = $ 0x2c35bd |
| | S-FRNG0 = 0x3e232edb, | $y_n(75) = $ 0x7c465d |
| | S-FRNG0 = 0x77d94bbb, | $y_n(76) = $ 0xefb297 |
| | S-FRNG0 = 0x5afb1f75, | $y_n(77) = $ 0xb5f63e |
| | S-FRNG0 = 0x1cce68fd, | $y_n(78) = $ 0x399cd1 |
| | S-FRNG0 = 0x334ec8d1, | $y_n(79) = $ 0x669d91 |
| | S-FRNG0 = 0x79622ba7, | $y_n(80) = $ 0xf2c457 |
| | S-FRNG0 = 0x1c201f33, | $y_n(81) = $ 0x38403e |
| | S-FRNG0 = 0xe05bb2, | $y_n(82) = $ 0x1c0b7 |
| | S-FRNG0 = 0x9a40391, | $y_n(83) = $ 0x134807 |
| | S-FRNG0 = 0x6ee62988, | $y_n(84) = $ 0xddcc53 |
| | S-FRNG0 = 0x48b0d899, | $y_n(85) = $ 0x9161b1 |
| | S-FRNG0 = 0x525c4a17, | $y_n(86) = $ 0xa4b894 |
| | S-FRNG0 = 0x2904563f, | $y_n(87) = $ 0x5208ac |
| | S-FRNG0 = 0x5bba5722, | $y_n(88) = $ 0xb774ae |
| | S-FRNG0 = 0x26aea83a, | $y_n(89) = $ 0x4d5d50 |
| | S-FRNG0 = 0x14a68bad, | $y_n(90) = $ 0x294d17 |
| | S-FRNG0 = 0x421c1572, | $y_n(91) = $ 0x84382a |
| | S-FRNG0 = 0x41c41146, | $y_n(92) = $ 0x838822 |
| | S-FRNG0 = 0x2f4a2c65, | $y_n(93) = $ 0x5e9458 |
| | S-FRNG0 = 0x2ea8b324, | $y_n(94) = $ 0x5d5166 |

[PA000107]

140

| | S-FRNG0 = 0x4589186a, | $y_n(95) = $ 0x8b1230 |
|---|---|---|
| | S-FRNG0 = 0x2ba1fad0, | $y_n(96) = $ 0x5743f5 |
| | S-FRNG0 = 0x17598411, | $y_n(97) = $ 0x2eb308 |
| | S-FRNG0 = 0x75ed8410, | $y_n(98) = $ 0xebdb08 |
| | S-FRNG0 = 0x3c7972ec, | $y_n(99) = $ 0x78f2e5 |
| | S-FRNG0 = 0x496802f8, | $y_n(100) = $ 0x92d005 |
| | S-FRNG0 = 0x4b9b0d6e, | $y_n(101) = $ 0x97361a |
| | S-FRNG0 = 0x308ed789, | $y_n(102) = $ 0x611daf |
| | S-FRNG0 = 0x71e87c46, | $y_n(103) = $ 0xe3d0f8 |
| | S-FRNG0 = 0x56371216, | $y_n(104) = $ 0xac6e24 |
| | S-FRNG0 = 0x39848e92, | $y_n(105) = $ 0x73091d |
| | S-FRNG0 = 0x2dac30be, | $y_n(106) = $ 0x5b5861 |
| | S-FRNG0 = 0x3b4215f, | $y_n(107) = $ 0x76842 |
| | S-FRNG0 = 0x26fae5df, | $y_n(108) = $ 0x4df5cb |
| | S-FRNG0 = 0x2209a777, | $y_n(109) = $ 0x44134e |
| | S-FRNG0 = 0x27d18716, | $y_n(110) = $ 0x4fa30e |
| | S-FRNG0 = 0x2cfbc9c6, | $y_n(111) = $ 0x59f793 |
| | S-FRNG0 = 0x467bfd3c, | $y_n(112) = $ 0x8cf7fa |
| | S-FRNG0 = 0x762e924a, | $y_n(113) = $ 0xec5d24 |
| | S-FRNG0 = 0x6b8674e3, | $y_n(114) = $ 0xd70ce9 |
| | S-FRNG0 = 0x48641a3b, | $y_n(115) = $ 0x90c834 |
| | S-FRNG0 = 0x23f63c9e, | $y_n(116) = $ 0x47ec79 |
| | S-FRNG0 = 0x7b05bb83, | $y_n(117) = $ 0xf60b77 |
| | S-FRNG0 = 0x3559d48e, | $y_n(118) = $ 0x6ab3a9 |
| | S-FRNG0 = 0x1c91d1ff, | $y_n(119) = $ 0x3923a3 |
| | S-FRNG0 = 0x2971cb00, | $y_n(120) = $ 0x52e396 |
| | S-FRNG0 = 0x6dc68241, | $y_n(121) = $ 0xdb8d04 |
| | S-FRNG0 = 0x391b1b5, | $y_n(122) = $ 0x72363 |
| | S-FRNG0 = 0x5229e3e7, | $y_n(123) = $ 0xa453c7 |

[PA000107]

141

| | | |
|---|---|---|
| | S-FRNG0 = 0x3c317cd5, | $y_n(124) = 0x7862f9$ |
| | S-FRNG0 = 0x54faa2d2, | $y_n(125) = 0xa9f545$ |
| | S-FRNG0 = 0x12d7b494, | $y_n(126) = 0x25af69$ |
| | S-FRNG0 = 0xf906a36, | $y_n(127) = 0x1f20d4$ |
| | S-FRNG0 = 0x522d0735, | $y_n(128) = 0xa45a0e$ |
| | S-FRNG0 = 0xa3452b9, | $y_n(129) = 0x1468a5$ |
| | S-FRNG0 = 0x7122f4ea, | $y_n(130) = 0xe245e9$ |
| | S-FRNG0 = 0x2dfd68ad, | $y_n(131) = 0x5bfad1$ |
| | S-FRNG0 = 0x57e34d71, | $y_n(132) = 0xafc69a$ |
| | S-FRNG0 = 0xbf162cb, | $y_n(133) = 0x17e2c5$ |
| | S-FRNG0 = 0x148d038d, | $y_n(134) = 0x291a07$ |
| | S-FRNG0 = 0x35e42885, | $y_n(135) = 0x6bc851$ |
| | S-FRNG0 = 0x16204f67, | $y_n(136) = 0x2c409e$ |
| | S-FRNG0 = 0x233cfe8a, | $y_n(137) = 0x4679fd$ |
| | S-FRNG0 = 0x796b2818, | $y_n(138) = 0xf2d650$ |
| | S-FRNG0 = 0x6a157dee, | $y_n(139) = 0xd42afb$ |
| | S-FRNG0 = 0x28fecaab, | $y_n(140) = 0x51fd95$ |
| | S-FRNG0 = 0x6fabb593, | $y_n(141) = 0xdf576b$ |
| | S-FRNG0 = 0x721dff2b, | $y_n(142) = 0xe43bfe$ |
| | S-FRNG0 = 0xf5b9a95, | $y_n(143) = 0x1eb735$ |
| | S-FRNG0 = 0x4701b413, | $y_n(144) = 0x8e0368$ |
| | S-FRNG0 = 0x40d56fd0, | $y_n(145) = 0x81aadf$ |
| | S-FRNG0 = 0x7c9fe1f0, | $y_n(146) = 0xf93fc3$ |
| | S-FRNG0 = 0x64aa937b, | $y_n(147) = 0xc95526$ |
| | S-FRNG0 = 0x7ab8a3de, | $y_n(148) = 0xf57147$ |
| | S-FRNG0 = 0x700e82c3, | $y_n(149) = 0xe01d05$ |
| | S-FRNG0 = 0x48ab09ae, | $y_n(150) = 0x915613$ |
| | S-FRNG0 = 0x5508a3c7, | $y_n(151) = 0xaa1147$ |
| | S-FRNG0 = 0x2a38896e, | $y_n(152) = 0x547112$ |

[PA000107]

142

|    |                          |                         |
|----|--------------------------|-------------------------|
|    | S-FRNG0 = 0x65c6aa69,    | $y_n(153)$ = 0xcb8d54   |
|    | S-FRNG0 = 0x55de07b2,    | $y_n(154)$ = 0xabbc0f   |
|    | S-FRNG0 = 0x63cb6328,    | $y_n(155)$ = 0xc796c6   |
|    | S-FRNG0 = 0x3ddb0a47,    | $y_n(156)$ = 0x7bb614   |
| | S-FRNG0 = 0x777fdb0a,    | $y_n(157)$ = 0xeeffb6   |
|    | S-FRNG0 = 0x6b05aad0,    | $y_n(158)$ = 0xd60b55   |
|    | S-FRNG0 = 0x41117494,    | $y_n(159)$ = 0x8222e9   |
|    | S-FRNG0 = 0x60fcc1eb,    | $y_n(160)$ = 0xc1f983   |
|    | S-FRNG0 = 0x721f5d0b,    | $y_n(161)$ = 0xe43eba   |
| | S-FRNG0 = 0x6915b7b5,    | $y_n(162)$ = 0xd22b6f   |
|    | S-FRNG0 = 0x10d001f9,    | $y_n(163)$ = 0x21a003   |
|    | S-FRNG0 = 0x48318b0e,    | $y_n(164)$ = 0x906316   |
|    | S-FRNG0 = 0x2ca06929,    | $y_n(165)$ = 0x5940d2   |
|    | S-FRNG0 = 0x575819a2,    | $y_n(166)$ = 0xaeb033   |
| | S-FRNG0 = 0x58fb077a,    | $y_n(167)$ = 0xb1f60e   |
|    | S-FRNG0 = 0x48a80839,    | $y_n(168)$ = 0x915010   |
|    | S-FRNG0 = 0xfb3fb73,     | $y_n(169)$ = 0x1f67f6   |
|    | S-FRNG0 = 0x71414312,    | $y_n(170)$ = 0xe28286   |
|    | S-FRNG0 = 0x739a8cd4,    | $y_n(171)$ = 0xe73519   |
| | S-FRNG0 = 0x2793ed97,    | $y_n(172)$ = 0x4f27db   |
|    | S-FRNG0 = 0x60d368cd,    | $y_n(173)$ = 0xc1a6d1   |
|    | S-FRNG0 = 0x57859c64,    | $y_n(174)$ = 0xaf0b38   |
|    | S-FRNG0 = 0x4de9620,     | $y_n(175)$ = 0x9bd2c    |
|    | S-FRNG0 = 0x3152115f,    | $y_n(176)$ = 0x62a422   |
| | S-FRNG0 = 0x2f28d45,     | $y_n(177)$ = 0x5e51a    |
|    | S-FRNG0 = 0x218ae86,     | $y_n(178)$ = 0x4315d    |
|    | S-FRNG0 = 0x2269e07d,    | $y_n(179)$ = 0x44d3c0   |
|    | S-FRNG0 = 0x55114031,    | $y_n(180)$ = 0xaa2280   |
|    | S-FRNG0 = 0x5f8d7c98,    | $y_n(181)$ = 0xbf1af9   |

[PA000107]

143

| | | |
|---|---|---|
| | S-FRNG0 = 0x41ef102a, | $y_n(182)$ = 0x83de20 |
| | S-FRNG0 = 0x360e5737, | $y_n(183)$ = 0x6c1cae |
| | S-FRNG0 = 0x677ff79a, | $y_n(184)$ = 0xceffef |
| | S-FRNG0 = 0x258d48c, | $y_n(185)$ = 0x4b1a9 |
| | S-FRNG0 = 0x15ea3488, | $y_n(186)$ = 0x2bd469 |
| | S-FRNG0 = 0x431ed7f5, | $y_n(187)$ = 0x863daf |
| | S-FRNG0 = 0x1df43840, | $y_n(188)$ = 0x3be870 |
| | S-FRNG0 = 0xc99011d, | $y_n(189)$ = 0x193202 |
| | S-FRNG0 = 0x11181d61, | $y_n(190)$ = 0x22303a |
| | S-FRNG0 = 0x4630d40b, | $y_n(191)$ = 0x8c61a8 |
| | S-FRNG0 = 0x2fb1422d, | $y_n(192)$ = 0x5f6284 |
| | S-FRNG0 = 0x1e6fb0d1, | $y_n(193)$ = 0x3cdf61 |
| | S-FRNG0 = 0x36c178f3, | $y_n(194)$ = 0x6d82f1 |
| | S-FRNG0 = 0x57ebb59a, | $y_n(195)$ = 0xafd76b |
| | S-FRNG0 = 0x33dfbe8e, | $y_n(196)$ = 0x67bf7d |
| | S-FRNG0 = 0x2657773d, | $y_n(197)$ = 0x4caeee |
| | S-FRNG0 = 0x38555975, | $y_n(198)$ = 0x70aab2 |
| | S-FRNG0 = 0x6b642d37, | $y_n(199)$ = 0xd6c85a |
| | S-FRNG0 = 0x7dd4acf5, | $y_n(200)$ = 0xfba959 |
| | S-FRNG0 = 0x15a7495d, | $y_n(201)$ = 0x2b4e92 |
| | S-FRNG0 = 0x19c183c6, | $y_n(202)$ = 0x338307 |
| | S-FRNG0 = 0x6fb2495f, | $y_n(203)$ = 0xdf6492 |
| | S-FRNG0 = 0x21ef3543, | $y_n(204)$ = 0x43de6a |
| | S-FRNG0 = 0x5f91d31c, | $y_n(205)$ = 0xbf23a6 |
| | S-FRNG0 = 0x5ebb0448, | $y_n(206)$ = 0xbd7608 |
| | S-FRNG0 = 0x4816438e, | $y_n(207)$ = 0x902c87 |
| | S-FRNG0 = 0x2dad449b, | $y_n(208)$ = 0x5b5a89 |
| | S-FRNG0 = 0x4a73338a, | $y_n(209)$ = 0x94e667 |
| | S-FRNG0 = 0x513ccf35, | $y_n(210)$ = 0xa2799e |

[PA000107]

144

| | | |
|---|---|---|
| | S-FRNG0 = 0x6f47ca3d, | $y_n(211)$ = 0xde8f94 |
| | S-FRNG0 = 0x522ea3de, | $y_n(212)$ = 0xa45d47 |
| | S-FRNG0 = 0x74086df8, | $y_n(213)$ = 0xe810db |
| | S-FRNG0 = 0x556bf04b, | $y_n(214)$ = 0xaad7e0 |
| | S-FRNG0 = 0x216cf7bd, | $y_n(215)$ = 0x42d9ef |
| | S-FRNG0 = 0x78fcaa6f, | $y_n(216)$ = 0xf1f954 |
| | S-FRNG0 = 0x14199b77, | $y_n(217)$ = 0x283336 |
| | S-FRNG0 = 0x1d2dabf0, | $y_n(218)$ = 0x3a5b57 |
| | S-FRNG0 = 0x21732887, | $y_n(219)$ = 0x42e651 |
| | S-FRNG0 = 0xf69c839, | $y_n(220)$ = 0x1ed390 |
| | S-FRNG0 = 0x69d81e16, | $y_n(221)$ = 0xd3b03c |
| | S-FRNG0 = 0x6b9f6ca3, | $y_n(222)$ = 0xd73ed9 |
| | S-FRNG0 = 0x2f957888, | $y_n(223)$ = 0x5f2af1 |
| | S-FRNG0 = 0x7e1c411f, | $y_n(224)$ = 0xfc3882 |
| | S-FRNG0 = 0x70f79ae7, | $y_n(225)$ = 0xe1ef35 |
| | S-FRNG0 = 0xfdaeda2, | $y_n(226)$ = 0x1fb5db |
| | S-FRNG0 = 0x6e272ecf, | $y_n(227)$ = 0xdc4e5d |
| | S-FRNG0 = 0x4e725088, | $y_n(228)$ = 0x9ce4a1 |
| | S-FRNG0 = 0x330538f4, | $y_n(229)$ = 0x660a71 |
| | S-FRNG0 = 0x1bde3557, | $y_n(230)$ = 0x37bc6a |
| | S-FRNG0 = 0x197ff10c, | $y_n(231)$ = 0x32ffe2 |
| | S-FRNG0 = 0x1eaa57e8, | $y_n(232)$ = 0x3d54af |
| | S-FRNG0 = 0x41715012, | $y_n(233)$ = 0x82e2a0 |
| | S-FRNG0 = 0x763fef4e, | $y_n(234)$ = 0xec7fde |
| | S-FRNG0 = 0x5f782688, | $y_n(235)$ = 0xbef04d |
| | S-FRNG0 = 0x4929dbaf, | $y_n(236)$ = 0x9253b7 |
| | S-FRNG0 = 0x5b15e3af, | $y_n(237)$ = 0xb62bc7 |
| | S-FRNG0 = 0x7a1724e0, | $y_n(238)$ = 0xf42e49 |
| | S-FRNG0 = 0x5762cbf, | $y_n(239)$ = 0xaec59 |

[PA000107]

145

|   | | |
|---|---|---|
| | S-FRNG0 = 0x1173b266, | $y_n(240) = 0x22e764$ |
| | S-FRNG0 = 0x42c54f7d, | $y_n(241) = 0x858a9e$ |
| | S-FRNG0 = 0x27e5b9ca, | $y_n(242) = 0x4fcb73$ |
| | S-FRNG0 = 0x5b08913c, | $y_n(243) = 0xb61122$ |
| | S-FRNG0 = 0xf7728d5, | $y_n(244) = 0x1eee51$ |
| | S-FRNG0 = 0x5819bfe1, | $y_n(245) = 0xb0337f$ |
| | S-FRNG0 = 0x28479f7, | $y_n(246) = 0x508f3$ |
| | S-FRNG0 = 0x4763486b, | $y_n(247) = 0x8ec690$ |
| | S-FRNG0 = 0x47278d6a, | $y_n(248) = 0x8e4f1a$ |
| | S-FRNG0 = 0x75b54ea4, | $y_n(249) = 0xeb6a9d$ |
| | S-FRNG0 = 0x523e2d5b, | $y_n(250) = 0xa47c5a$ |
| | S-FRNG0 = 0x7013db8b, | $y_n(251) = 0xe027b7$ |
| | S-FRNG0 = 0x27b2bc29, | $y_n(252) = 0x4f6578$ |
| | S-FRNG0 = 0x475f3c1b, | $y_n(253) = 0x8ebe78$ |
| | S-FRNG0 = 0x3d633538, | $y_n(254) = 0x7ac66a$ |

Each 24-bit number $y_n(k)$ is written to the frame buffer in little-endian fashion. So 0x76fc7c turns into the byte stream 0x7c 0xfc 0x76. The little-endian version of the next 24-bit number, 0xba6678, is written immediately after the first number.

The circular buffer to be used to generate data block(s) for the F-SCH for the next 512 frames is thus organized as follows:

→7c fc 76 78 66 ba 54 7f 9d a7 79 12 ef e8 f0 6b a4 4c 3d 78 be af ed c7 b3 bd c5 8d 42 29 fe 5b d0 44 87 47 de a3 01 7d 4a ad 34 89 f5 fd f3 02
3a 6e e0 10 d5 64 97 1f e0 92 0b 3a 50 c4 cd 1d 75 13 a8 f2 6d 54 08 56
ec e8 3c 2f 0a e0 d4 b0 bc 46 6e fd 96 da 52 89 d6 8c 95 e1 58 a9 08 42
5b a2 46 bc 0d 4d 78 e0 c0 91 f6 d0 1d c2 eb b4 1e 15 28 c3 92 8b 91 4a
2a 72 99 bd 60 16 6c 57 29 1c b2 2a f8 64 13 2f f8 49 66 ed 44 40 02 3e 3d da 05 2a e9 3a 64 e7 a1 98 93 5e d6 f3 2b 54 6c 95 91 39 fb 33 77 80
cf c0 11 0d 7d 89 ae f1 70 2d fc 0a a9 f9 31 66 dc fd bf dc 90 47 a3 8c

[PA000107]

146

```
a0 9f 33 82 ea 34 d1 34 10 74 9c fb 33 85 dc cb 02 ad 6b 8b 92 00 56 ff
9e 32 67 bd 35 2c 5d 46 7c 97 b2 ef 3e f6 b5 d1 9c 39 91 9d 66 57 c4 f2
3e 40 38 b7 c0 01 07 48 13 53 cc dd b1 61 91 94 b8 a4 ac 08 52 ae 74 b7
50 5d 4d 17 4d 29 2a 38 84 22 88 83 58 94 5e 66 51 5d 30 12 8b f5 43 57
08 b3 2e 08 db eb e5 f2 78 05 d0 92 1a 36 97 af 1d 61 f8 d0 e3 24 6e ac
1d 09 73 61 58 5b 42 68 07 cb f5 4d 4e 13 44 0e a3 4f 93 f7 59 fa f7 8c
24 5d ec e9 0c d7 34 c8 90 79 ec 47 77 0b f6 a9 b3 6a a3 23 39 96 e3 52
04 8d db 63 23 07 c7 53 a4 f9 62 78 45 f5 a9 69 af 25 d4 20 1f 0e 5a a4
a5 68 14 e9 45 e2 d1 fa 5b 9a c6 af c5 e2 17 07 1a 29 51 c8 6b 9e 40 2c
fd 79 46 50 d6 f2 fb 2a d4 95 fd 51 6b 57 df fe 3b e4 35 b7 1e 68 03 8e
df aa 81 c3 3f f9 26 55 c9 47 71 f5 05 1d e0 13 56 91 47 11 aa 12 71 54
54 8d cb 0f bc ab c6 96 c7 14 b6 7b b6 ff ee 55 0b d6 e9 22 82 83 f9 c1
ba 3e e4 6f 2b d2 03 a0 21 16 63 90 d2 40 59 33 b0 ae 0e f6 b1 10 50 91
f6 67 1f 86 82 e2 19 35 e7 db 27 4f d1 a6 c1 38 0b af 2c bd 09 22 a4 62
1a e5 05 5d 31 04 c0 d3 44 80 22 aa f9 1a bf 20 de 83 ae 1c 6c ef ff ce
a9 b1 04 69 d4 2b af 3d 86 70 e8 3b 02 32 19 3a 30 22 a8 61 8c 84 62 5f
61 df 3c f1 82 6d 6b d7 af 7d bf 67 ee ae 4c b2 aa 70 5a c8 d6 59 a9 fb
92 4e 2b 07 83 33 92 64 df 6a de 43 a6 23 bf 08 76 bd 87 2c 90 89 5a 5b
67 e6 94 9e 79 a2 94 8f de 47 5d a4 db 10 e8 e0 d7 aa ef d9 42 54 f9 f1
36 33 28 57 5b 3a 51 e6 42 90 d3 1e 3c b0 d3 d9 3e d7 f1 2a 5f 82 38 fc
35 ef e1 db b5 1f 5d 4e dc a1 e4 9c 71 0a 66 6a bc 37 e2 ff 32 af 54 3d
a0 e2 82 de 7f ec 4d f0 be b7 53 92 c7 2b b6 49 2e f4 59 ec 0a 64 e7 22
9e 8a 85 73 cb 4f 22 11 b6 51 ee 1e 7f 33 b0 f3 08 05 90 c6 8e 1a 4f 8e
9d 6a eb 5a 7c a4 b7 27 e0 78 65 4f 78 be 8e 6a c6 7a→
```

Following the procedure outlined in Figure 4, the new pseudo-random number generator is as follows:

31_BIT_PN_NUM = (0x682dff0c * a) mod m = 0x23c3a243
24_BIT_PN_NUM = 31_BIT_PN_NUM >> 7 = 0x478744 = 4687684

[PA000107]

147

As the value of 24_BIT_PN_NUM is less than the ON_THRESHOLD, the TDSO_STATE turns to ON and, therefore, TDSO shall pass two Rate 1 frame to the multiplex sublayer during the current frame period.

The starting offset for the first frame in the 512 frame segment is given by $O_n$ mod B(n), which in this case is 60 mod 762 = 60. Therefore, the TDSO will generate two Rate 1 (170-bit) date blocks that are supplied to the multiplex sublayer. Each data block is comprised of 21 octets from the circular buffer beginning at the 60th byte offset in the circular buffer followed by 2 zero bits as shown:

50 c4 cd 1d 75 13 a8 f2 6d 54 08 56 ec e8 3c 2f 0a e0 d4 b0 bc '00'
46 6e fd 96 da 52 89 d6 8c 95 e1 58 a9 08 42 5b a2 46 bc 0d 4d '00'

The first 5 bits of each generated PDU, however, will be masked by 2 bits representing the CHANNEL_ID, that is, 10 for F-SCH0 followed by 3 bits to designate the PDU sequence number within the physical layer SDU ('000' for first data block and '001' for the second). Therefore, the two data blocks that are passed to the multiplex sublayer look like the following:

PDU1->80 c4 cd 1d 75 13 a8 f2 6d 54 08 56 ec e8 3c 2f 0a e0 d4 b0 bc '00'
PDU2->8e 6e fd 96 da 52 89 d6 8c 95 e1 58 a9 08 42 5b a2 46 bc 0d 4d '00'

For the next frame, however, the byte offset pointer advances to the byte immediately after 4d, that is, 78.

Using the TDSO

C.1 Introduction

This annex outlines the procedure for conducting a TDSO test and a method for computing frame error rates.

C.2 Conducting a TDSO test

[PA000107]

148

A TDSO test may be conducted at a base station using the following procedures:

1. Start a TDSO call (or clear the counters of an existing call).

- To conduct a TDSO call with a random data source, send a *Service Option Control Message* control directive with DATA_SOURCE field set to '001' and the CLEAR_COUNTERS field set to '1' for the particular physical channel.

- Wait for the test interval to elapse.

- Direct the mobile station to make a copy of the TDSO counters.

- Wait for the forward synchronization and reverse synchronization frame after the action time to occur.

- Retrieve the values of the copied counters from the mobile station and compute the FERs.

A call is started by negotiating the TDSO (see 0) and initializing and connecting the service option. The service option counters are cleared at initialization, or could be cleared explicitly by the base station by sending a control directive while a TDSO call is in progress.

The duration of a test should correspond to an integral number of segments (see 0). The mobile station's processing of the control directive (see 0) enforces this test duration.

The base station sends a *Service Option Control Message* directing the mobile station to copy the received and transmitted TDSO counters to buffers at the next Forward and Reverse Traffic Channel synchronization frames. This provides a synchronized snapshot of all the TDSO counters for accurate calculations of FERs.

The base station sends *Service Option Control Messages* to request counter values to be retrieved from the copied buffer. These counter values are used in frame-error rate and bit-error rate calculations.

C.3 Computation of FERs

C.3.1 FER computation on the FCH and DCCH

The FER on the Forward Fundicated Traffic Channel is given by the following calculation:

[PA000107]

149

$$FER_{Rate\ 1}\ (Forward) = 1 - (TDSO\_E1\_R1_m + TDSO\_EN\_RN_m)/(TDSO\_E1\_T1_b + TDSO\_EB\_TB_b)$$

where counters in the mobile station are denoted by a subscript m, and counters in the base station are denoted by a subscript b.
The FER of the Reverse Fundicated Traffic Channel is given by the following calculation:

$$FER_{Rate\ 1}\ (Reverse) = 1 - (TDSO\_E1\_R1_b + TDSO\_EN\_RN_b)/(TDSO\_E1\_T1_m + TDSO\_EB\_TB_m)$$

where counters in the mobile station are denoted by a subscript m, and counters in the base station are denoted by a subscript b.
The number of dim-and-burst frames and the number of blank-and-burst frames are not used in the FER calculations described above.
The values of the base station transmit counter $TDSO\_E1\_T1_b$, $TDSO\_EB\_TB_b$ can be estimated by summing the values of the corresponding mobile station counters for received frames as follows:

$$TDSO\_E1\_T1_b \approx TDSO\_E1\_R1_m + TDSO\_E1\_RO_m + TDSO\_E1\_RFL_m + TDSO\_E1\_RE_m \quad TDSO\_E1\_RERR_m$$

$$TDSO\_EB\_TB_b \approx TDSO\_EN\_RN_m + TDSO\_EN\_RO_m$$

The values of the mobile station transmit counter $TDSO\_E1\_T1_m$, $TDSO\_EB\_TB_m$ can be estimated at the base station by summing the values of the corresponding base station counters for received frames as follows:

$$TDSO\_E1\_T1_m \approx TDSO\_E1\_R1_b + TDSO\_E1\_RO_b + TDSO\_E1\_RFL_b + TDSO\_E1\_RE_b + TDSO\_E1\_RERR_b$$

$$TDSO\_EB\_TB_m \approx TDSO\_EN\_RN_b + TDSO\_EN\_RO_b$$

[PA000107]

150

C.3.2 FER computation on the SCH

The FER of Nx9.6 or Nx14.4 frames on the Forward Supplemental Channel is given by the following calculation:

$$FER_{Rate\ Nx9.6\ Or\ Nx14.4}\ (Forward) = 1 - (TDSO\_ENx\_RNx_m + TDSO\_EB\_RB_m)/(TDSO\_ENx\_TNx_b + TDSO\_EB\_TB_b)$$

where counters in the mobile station are denoted by a subscript m, and counters in the base station are denoted by a subscript b.

The FERs of Nx9.6 or Nx14.4 frames on the Reverse Fundicated Traffic Channel are given by the following calculation:

$$FER_{Rate\ Nx9.6\ or\ Nx14.4}\ (Reverse) = 1 - (TDSO\_ENx\_RNx_b + TDSO\_EB\_RB_b)/(TDSO\_ENx\_TNx_m + TDSO\_EB\_TB_m)$$

where counters in the mobile station are denoted by a subscript m, and counters in the base station are denoted by a subscript b.

The values of the base station transmit counter $TDSO\_ENx\_TNx_b$, $TDSO\_EB\_TB_b$ can be estimated by summing the values of the corresponding mobile station counters for received frames as follows:

$$TDSO\_ENx\_TNx_b \approx TDSO\_ENx\_RNx_m + TDSO\_ENx\_RE_m + TDSO\_ENx\_RERR_m,$$

$$TDSO\_EB\_TB_b \approx TDSO\_EB\_RB_m + TDSO\_EB\_RO_m$$

The values of the mobile station transmit counter $TDSO\_ENx\_TNx_m$, $TDSO\_EB\_TB_m$ can be estimated at the base station by summing the values of the corresponding base station counters for received frames as follows:

$$TDSO\_ENx\_TNx_m \approx TDSO\_ENx\_RNx_b + TDSO\_ENx\_RE_b + TDSO\_ENx\_RERR_b,$$

[PA000107]

151

$TDSO\_EB\_TB_m = TDSO\_EB\_RB_b + TDSO\_EB\_RO_b$

C.4 PER computation on SCH

The PER of Rate 1a, Rate 1b, Rate 2, and Rate 3 frames on the Forward
Supplemental Traffic Channel is given by the following calculation:

$PER_{Rate\ 1a}$ (Forward) = $1 - TDSO\_E1a\_R1a_m/TDSO\_E1a\_T1a_b$
$PER_{Rate\ 1b}$ (Forward) = $1 - TDSO\_E1b\_R1b_m/TDSO\_E1b\_T1b_b$
$PER_{Rate\ 2}$ (Forward) = $1 - TDSO\_E2\_R2_m/TDSO\_E2\_T2_b$
$PER_{Rate\ 3}$ (Forward) = $1 - TDSO\_E3\_R3_m/TDSO\_E3\_T3_b$ where counters in the mobile station are denoted by a subscript m, and
counters in the base station are denoted by a subscript b.

The PER of Rate 1a, Rate 1b, Rate 2, and Rate 3 frames on the Reverse
Supplemental Traffic Channel is given by the following calculation:

$PER_{Rate\ 1a}$ (Reverse) = $1 - TDSO\_E1a\_R1a_b/TDSO\_E1a\_T1a_m$
$PER_{Rate\ 1b}$ (Reverse) = $1 - TDSO\_E1b\_R1b_b/TDSO\_E1b\_T1b_m$
$PER_{Rate\ 2}$ (Reverse) = $1 - TDSO\_E2\_R2_b/TDSO\_E2\_T2_m$
$PER_{Rate\ 3}$ (Reverse) = $1 - TDSO\_E3\_R3_b/TDSO\_E2\_T2_m$ where counters in the mobile station are denoted by a subscript m, and
counters in the base station are denoted by a subscript b.

The values of the base station transmit counters $TDSO\_E1a\_T1a_b$, $TDSO\_E1b\_T1b_b$, $TDSO\_E2\_T2_b$, and $TDSO\_E3\_T3_b$ can be calculated by summing the values of the corresponding mobile station counters for received frames as follows:

$TDSO\_E1a\_T1a_b = TDSO\_E1a\_R1a_m + TDSO\_E1a\_RERR_m + TDSO\_E1a\_RE_m$,
$TDSO\_E1b\_T1b_b = TDSO\_E1b\_R1b_m + TDSO\_E1b\_RERR_m + TDSO\_E1b\_RE_m$,
$TDSO\_E2\_T2_b = TDSO\_E2\_R2_m + TDSO\_E2\_RERR_m + TDSO\_E2\_RE_m$,

[PA000107]

152

$TDSO\_E3\_T3_b = TDSO\_E3\_R3_m + TDSO\_E3\_RERR_m + TDSO\_E3\_RE_m$

The values of the mobile station transmit counters $TDSO\_E1a\_T1a_m$, $TDSO\_E1b\_T1b_m$, $TDSO\_E2\_T2_m$, and $TDSO\_E3\_T3_m$ can be calculated by summing the values of the corresponding base station counters for received frames as follows:

$TDSO\_E1a\_T1a_m = TDSO\_E1a\_R1a_b + TDSO\_E1a\_RERR_b + TDSO\_E1a\_RE_b$,
$TDSO\_E1b\_T1b_m = TDSO\_E1b\_R1b_b + TDSO\_E1b\_RERR_b + TDSO\_E1b\_RE_b$,
$TDSO\_E2\_T2_m = TDSO\_E2\_R2_b + TDSO\_E2\_RERR_b + TDSO\_E2\_RE_b$,
$TDSO\_E3\_T3_m = TDSO\_E3\_R3_b + TDSO\_E3\_RERR_b + TDSO\_E3\_RE_b$

C.5 FER computation on the FCH and DCCH with 5 ms frame length

The FER on the Forward Fundicated Traffic Channel is given by the following calculation:

Let $R_m$ be the number of good 5 ms frames received in the mobile station and $T_b$ be the total number of 5 ms frames transmitted by the base station during the test period, then $FER_{Rate\,1}$ (Forward) $= 1 - (R_m/T_b)$ where counters in the mobile station are denoted by a subscript m, and counters in the base station are denoted by a subscript b.

The FER on the Reverse Fundicated Traffic Channel is given by the following calculation:

Let $R_b$ be the number of good 5 ms frames received in the base station and $T_m$ be the total number of 5 ms frames transmitted by the mobile station during the test period, then $FER_{Rate\,1}$ (Reverse) $= 1 - (R_b/T_m)$ where counters in the mobile station are denoted by a subscript m, and counters in the base station are denoted by a subscript b.

Both $R_m$ and $T_m$ can be derived from the values of the mobile station counters (e.g., MUX1_FOR_FCH_5_ms) retrieved in the *5 ms Frame Received Counters Response* and *5 ms Frame Transmitted Counters Response*, respectively. For

[PA000107]

153 example, for a 5 ms DCCH using Multiplex Option 0x01, $R_m$ can be calculated as the difference of the values of TDSO_MUX1_5ms_R1 at the beginning of the first TDSO frame and at the end of the last TDSO frame during the test. Similarly, both $R_b$ and $T_b$ can be derived from the values of the base station counters. For example, $R_b$ can be calculated as the difference of the values of the corresponding counter in the base station at the beginning of the first TDSO frame and at the end of the last TDSO frame during the test.
No text.

Calculating p and q Based on D and B

Given the transition probabilities p and q, the average frame activity (D) and the average burst length (B) can be calculated based on the following equations:

$$D = q/(p+q) \qquad \text{(Equation 1)}$$
$$B = 1/p \qquad \text{(Equation 2)}$$

However, to inversely calculate p and q based on the desired D and B, cautions have to be taken since D and B are dependent on each other and some combinations cannot be achieved as explained below:
From Equation 1 and Equation 2, $$D = Bq/(1+Bq) \qquad \text{(Equation 3)}$$
$$B = D/((1-D)q) \qquad \text{(Equation 4)}$$

Equation 3 shows that given a fixed B, D varies from 0 to B/(1+B), when q varies from 0 to 1. Similarly, Equation 4 shows that given a fixed value of D, B varies from D/(1-D) to infinity.
For example, if B is set to 2, D has to be smaller than 2/3. As a result, the frame activity (D) can never get higher than 2/3 when B is set to 2. Similarly, if D is set to 7/10, B has to be greater than 7/3.

[PA000107]

154

The corresponding valid values of p and q can be calculated from Equation 1 and Equation 2 given a valid pair of D and B.

What is claimed is:

1. A method for generating test data for testing a particular channel under flexible operating conditions in a wireless communication system, comprising:

generating a sequence of data bits based on a pseudorandom number generator; and forming a plurality of data blocks for transmission under the flexible operating conditions, and over a plurality of time intervals on the particular channel, wherein each data block includes at least a portion of the generated sequence of data bits.

2. The method of claim 1, wherein each time interval corresponds to a frame on the particular traffic channel, and wherein the sequence of data bits includes at least N times a maximum number of bits expected to be transmitted for one frame on the particular channel, where N is two or greater.

3. The method of claim 1, further comprising:

storing the generated sequence of data bits to a buffer.

4. The method of claim 3, wherein the buffer is operated as a circular buffer, the method further comprising:

retrieving data bits for each data block from a particular section of the circular buffer.

5. The method of claim 4, wherein a starting location in the circular buffer from which to retrieve data bits for a particular data block is determined based in part on a value obtained from the pseudo-random number generator.

6. The method of claim 5, further comprising:

formatting the value obtained from the pseudo-random number generator; and advancing a pointer for the circular buffer by a number of positions determined based on the formatted number.

7. The method of claim 6, wherein a 31-bit value is obtained from the pseudo-random number generator, and wherein the formatting includes generating a 24-bit number with 24 most significant bits of the 31-bit value, and generating the formatted number with six least significant bits of the 24-bit number.

8. The method of claim 1, wherein the generating the sequence of data bits includes obtaining a value corresponding to a current state of the pseudo-random number generator, forming a set of data bits based on the obtained value, and updating the pseudo-random number generator.

9. The method of claim 8, wherein the generating the sequence of data bits further includes repeating the obtaining, forming, and updating a plurality of times, and concatenating a plurality of sets of data bits formed based on a plurality of values obtained from the pseudo-random number generator to generate the sequence of data bits.

10. The method of claim 8, wherein the forming includes extracting a most significant portion of the obtained value, and rearranging bytes in the extracted most significant portion to form the set of data bits.

11. The method of claim 10, wherein a 31-bit value is obtained from the pseudo-random number generator, a 24-bit value is extracted from the most significant portion of the obtained value, and the bytes of the 24-bit value are rearranged in little-endian order.

12. The method of claim 1, further comprising:

reinitializing the pseudo-random number generator at each synchronization time corresponding to a start of a new test interval.

13. The method of claim 12, wherein each test interval has a duration of 10.24 seconds.

14. The method of claim 12, wherein the synchronization time is determined based in part on a system frame number for a frame on the particular traffic channel.

15. The method of claim 14, wherein the synchronization time is further determined based on a public long code mask (PLCM) assigned to a remote terminal designated to receive the data blocks.

16. The method of claim 1, wherein a plurality of channels are concurrently tested, and wherein a plurality of pseudo-random number generators are used to generate test data for testing the plurality of channels.

17. The method of claim 16, wherein each channel has a corresponding pseudo-random number generator for generating test data.

18. The method of claim 17, wherein the test data generated for each channel is stored to a respective buffer.

19. A method for generating test data for testing a particular channel under flexible operating conditions in a wireless communication system, comprising:

selecting a particular one of a plurality of available test data types;

generating a sequence of data bits of the selected test data type; and forming a plurality of data blocks for transmission under the flexible operating conditions, and over a plurality of time intervals on the particular channel, wherein each data block includes at least a portion of the generated sequence of data bits.

20. The method of claim 19, wherein the available test data types include test data generated based on a defined data pattern and test data pseudo-randomly generated.

21. The method of claim 20, wherein the sequence of data bits generated based on the defined data pattern includes a plurality of bytes of a particular value.

22. The method of claim 21, wherein the defined data pattern is a sequence of a particular number of ones.

23. A method for testing a particular channel under flexible operating conditions in a wireless communication system, comprising:

determining a transmission state of a current frame for the particular channel, wherein transmission on the particular channel occurs over frames, and wherein each frame corresponds to a particular time interval;

generating one or more blocks of test data for the current frame if the determined transmission state indicates that test data is to be transmitted; and transmitting, under the flexible operating conditions, the one or more generated blocks of test data on the particular channel.

24. The method of claim 23, further comprising:

maintaining a two-state Markov chain to represent the transmission state for the particular channel.

25. The method of claim 24, wherein the two-state Markov chain includes an ON state signifying transmission of test data on the particular channel and an OFF state signifying no transmission of test data on the particular channel.

26. The method of claim 25, further comprising:

maintaining a pseudo-random number generator to determine transitions between the ON and OFF states of the Markov chain.

27. The method of claim 26, further comprising:

initializing the pseudo-random number generator prior to start of testing the particular channel.

28. The method of claim 26, further comprising:
obtaining a value based on a current state of the pseudo-random number generator; and
transitioning from the ON state to the OFF state if a current state of the Markov chain is the ON state and the obtained value is below a first threshold value.

29. The method of claim 28, further comprising:
transitioning from the OFF state to the ON state if the current state of the Markov chain is the OFF state and the obtained value is below a second threshold value.

30. The method of claim 29, wherein the first and second threshold values are configurable test parameters.

31. The method of claim 26, wherein a plurality of channels are concurrently tested, and wherein a two-state Markov chain is maintained for each channel being tested.

32. The method of claim 31, wherein one pseudo-random number generator is maintained to determine transitions between Markov states for each set of one or more channels having a frame interval that is different from frame intervals of other channels being tested.

33. The method of claim 31, wherein a first pseudo-random number generator is maintained to determine transitions between Markov states for a first set of one or more channels having a first frame interval, and wherein a second pseudo-random number generator is maintained to determine transitions between Markov states for a second set of one or more channels having a second frame interval.

34. The method of claim 33, wherein the first frame interval is 20 msec and the second frame interval is 40 msec or 80 msec.

35. The method of claim 25, wherein transition between the ON state and the OFF state is based on a first probability and transition between the OFF state and the ON state is based on a second probability.

36. The method of claim 35, wherein the first and second probabilities are selected to achieve a particular average frame activity on the particular channel indicative of an average duty cycle for transmissions on the channel.

37. The method of claim 36, wherein the average frame activity is a selectable test parameter.

38. The method of claim 35, wherein the first and second probabilities are selected to achieve a particular average burst length on the particular channel indicative of an average duration for transmissions on the channel.

39. The method of claim 23, wherein transmission of test data occurs on the particular channel for a particular ON duration followed by no transmission of test data for a particular OFF duration.

40. The method of claim 39, wherein the ON and OFF durations are configurable test parameters.

41. A method for testing a plurality of channels under flexible operating conditions in a wireless communication system, comprising:
defining values for a set of test parameters for each of the plurality of channels to be tested; and
testing each of the plurality of channels, operating under the flexible conditions, in accordance with respective values defined for the set of test parameters.

42. The method of claim 41, wherein the plurality of channels have two or more different frame lengths.

43. The method of claim 41, wherein the plurality of channels have frame lengths selected from the group consisting of 5 msec, 20 msec, 40 msec, and 80 msec.

44. The method of claim 41, wherein the plurality of channels include at least one forward traffic channel and at least one reverse traffic channel.

45. The method of claim 41, further comprising:
generating data blocks for transmission over a plurality of frames on the plurality of channels, wherein each data block includes a header that identifies the particular channel on which the data block is transmitted.

46. The method of claim 41, wherein each traffic channel to be tested is associate with a respective sequence of test data bits.

47. The method of claim 41, wherein each traffic channel to be tested is associate with a respective average frame activity.

48. The method of claim 41, wherein each traffic channel to be tested is associate with a respective average burst length.

49. The method of claim 41, further comprising:
maintaining a two-state Markov chain to represent a transmission state for each of the plurality of channels, wherein the two-state Markov chain for each channel includes an ON state signifying transmission of test data on the channel and an OFF state signifying no transmission of test data on the channel.

50. The method of claim 49, further comprising:
maintaining one or more pseudo-random number generators to determine transitions between the ON and OFF states of Markov chains for the plurality of channels.

51. The method of claim 50, wherein one pseudo-random number generator is maintained for each set of one or more channels having same frame length.

52. The method of claim 51, wherein a first pseudo-random number generator is maintained for one or more channels having frame length of 20 msec and a second pseudo-random number generator is maintained for one or more channels having frame length of 40 msec or 80 msec.

53. A method for testing a particular channel in a wireless communication system, comprising:
sending from a first entity to a second entity a first message having included therein one or more proposed values for one or more parameters for testing the particular channel; and
receiving from the second entity a response message rejecting or accepting the one or more proposed values sent in the first message.

54. The method of claim 53, wherein the response message includes one or more alternative values for one or more parameters rejected by the second entity.

55. The method of claim 53, further comprising:
sending to the second entity a second message having included therein one or more values for one or more parameters rejected by the second entity.

56. The method of claim 53, wherein the first entity is a remote terminal and the second entity is a base station in the communication system.

at least one buffer operatively coupled to the at least one generator, each buffer configured to store a respective generated sequence of data bits, and
wherein a plurality of data blocks are formed for transmission over a plurality of time intervals on a particular channel, and wherein each data block includes at least a portion of a particular sequence of data bits from a particular buffer.

57. A transmitting entity for testing at least one channel under flexible operating conditions in a wireless communication system, comprising:. at least one pseudo-random number generator, each generator configured to generate pseudorandom numbers used to generate a sequence of data bits; and at least one buffer operatively coupled to the at least one generator, each buffer configured to store a respective generated sequence of data bits, and wherein a plurality of data blocks are formed for transmission under the flexible operating conditions, and wherein the plurality of data blocks are formed over a plurality of time intervals on a particular channel, and wherein each data block includes at least a portion of a particular sequence of data bits from a particular buffer.

58. The transmitting entity claim 57, further comprising:

a controller configured to select one of a plurality of available test data types, wherein the available test data types include test data generated based on a defined data pattern and test data pseudo-randomly generated.

59. The transmitting entity claim 58, wherein the controller is further configured to determine a transmission state of a current frame for the particular channel, and wherein the transmission state is either an ON state signifying transmission of test data on the particular channel in the current frame or an OFF state signifying no transmission of test data on the particular channel in the current frame.

60. The transmitting entity claim 57, wherein a plurality of channels are concurrently tested, and wherein one pseudo-random number generator and one buffer are associate with each channel to be tested.

61. In a wireless communication system in which a plurality of frames are transmitted, a method for attaining a long-term average value on a duty cycle using a two-state Markov chain, the method comprising:

driving on/off transitions of a test data service option (TDSO) process with a first pseudo-random number generator during a frame period if the frame period is a first length in time; and driving the on/off transitions with a second pseudo-random number generator during the frame period if the frame period is either a second length in time or a third length in time.

62. The method of claim 61, wherein the first and second pseudo-random number generators provide 24-bit pseudo-random numbers.

63. The method of claim 61, wherein the first length in time is 20 msec.

64. The method of claim 61, wherein the second length in time is 40 msec and the third length in time is 80 msec.

65. The method of claim 61, wherein if the frame period is equal to either the second length in time or the third length in time, the frame is a supplemental channel.

66. The method of claim 61, wherein the long-term average value is configurable.

67. A method of exchanging test parameter values between a remote terminal and a base station in a wireless communication system, the method comprising:

sending proposed test parameter values from the remote terminal to the base station; and receiving a service option control message from the base station rejecting or negatively acknowledging the proposed test parameter values.

68. A method of constructing a circular buffer storing a plurality of maximum-rate frames transmitted on a particular channel under flexible operating conditions In a wireless communication system, the method comprising:

constructing data for the circular buffer from iterations of a pseudo-random number generator a plurality of times for each test interval, wherein the data is to be transmitted under flexible operating conditions; and using a set of bits from a number generated by the pseudorandom number generator to indicate a byte offset to determine a starting position in the circular buffer from which to build one or more data blocks for a particular frame period.

69. The method of claim 68, wherein the pseudo-random number generator is a 31-bit pseudo-random number generator.

70. The method of claim 68, wherein the set of bits is obtained by extracting 24 most significant bits of number generated by the pseudo-random number generator, and extracting six least significant bits of the 24 most significant bits.

71. The method of claim 68, wherein the test interval is defined to coincide with a synchronization frame of the channel.

72. The method of claim 71, wherein the test interval has a duration of 10.24 seconds.

* * * * *